(12) United States Patent
Nusbaum

(10) Patent No.: US 8,033,594 B2
(45) Date of Patent: *Oct. 11, 2011

(54) RETRACTABLE AIR DEFLECTION APPARATUS FOR REDUCTION OF VEHICULAR AIR DRAG

(76) Inventor: Howard G. Nusbaum, Stamford, CT (US)

( * ) Notice: Subject to any disclaimer, the term of this patent is extended or adjusted under 35 U.S.C. 154(b) by 160 days.

This patent is subject to a terminal disclaimer.

(21) Appl. No.: 12/621,762

(22) Filed: Nov. 19, 2009

(65) Prior Publication Data

US 2010/0164249 A1     Jul. 1, 2010

Related U.S. Application Data

(63) Continuation of application No. 11/707,700, filed on Feb. 16, 2007, now Pat. No. 7,641,262.

(60) Provisional application No. 60/852,736, filed on Oct. 19, 2006.

(51) Int. Cl.
B62D 35/00         (2006.01)

(52) U.S. Cl. .................................. 296/180.4; 296/180.5

(58) Field of Classification Search ............... 296/180.1, 296/180.4, 180.5
See application file for complete search history.

(56) References Cited

U.S. PATENT DOCUMENTS

| | | | |
|---|---|---|---|
| 3,697,120 A | 10/1972 | Saunders | |
| 3,854,769 A | 12/1974 | Saunders | |
| 3,960,402 A | 6/1976 | Keck | |
| 4,174,863 A | 11/1979 | Gotz | |
| 4,214,787 A * | 7/1980 | Chain | 296/180.4 |
| 4,236,745 A | 12/1980 | Davis | |

(Continued)

FOREIGN PATENT DOCUMENTS

CA     1079772    *  6/1980   ................. 296/180.4

(Continued)

OTHER PUBLICATIONS

Saltzman, E. and Meyer, R., A Reassessment of Heavy-Duty Truck Aerodynamic Design Features and Priorities, NASA Technical Paper TP-1999-206574, Jun. 1999.

(Continued)

*Primary Examiner* — Dennis Pedder
(74) *Attorney, Agent, or Firm* — Gottlieb, Rackman & Reisman, PC

(57) ABSTRACT

An air deflection apparatus for reduction of vehicular air drag comprises at least one air deflection element coupled to a rear portion of the vehicle but not to the rear-facing surface of the vehicle or, in other embodiments, at least one air deflection element coupled to a rear portion of the vehicle but not to any rear door which the vehicle may have. The air deflection elements are displaceable, preferably in unison, between a retracted position and at least one deployed position in which the air deflection elements intersect with the air flowing around the top and sides, and preferably also the bottom, of the vehicle, and in which they divert that airflow in a manner that enhances the aerodynamic characteristics of the vehicle and thereby improves its fuel economy, resulting in a reduction in fuel cost. The air deflection elements may be deployed and retracted manually, or remotely with powered assistance, or under microprocessor control, with the latter allowing for optimal positioning of the air deflection elements based either on pre-stored values, or on values derived, utilizing an optional feedback mechanism, from real-time vehicular speed and fuel consumption data. Vehicles equipped with the apparatus, and methods of reducing vehicular air drag using the apparatus, are also disclosed.

19 Claims, 36 Drawing Sheets

U.S. PATENT DOCUMENTS

| | | | |
|---|---|---|---|
| 4,257,641 | A | 3/1981 | Keedy |
| 4,421,354 | A | 12/1983 | Lemaster |
| 4,451,074 | A | 5/1984 | Scanlon |
| 4,458,936 | A | 7/1984 | Malholland |
| 4,508,380 | A | 4/1985 | Sankrithi |
| 4,607,874 | A | 8/1986 | Peairs |
| 4,741,569 | A | 5/1988 | Sutphen |
| 4,818,015 | A | 4/1989 | Scanlon |
| 4,919,472 | A | 4/1990 | Wiley, Jr. |
| 5,069,498 | A | 12/1991 | Benchoff |
| 5,141,281 | A | 8/1992 | Eger et al. |
| 5,280,990 | A | 1/1994 | Rinard |
| 5,435,617 | A | 7/1995 | Stanesic |
| 5,522,637 | A | 6/1996 | Spears |
| 5,755,485 | A | 5/1998 | Christie et al. |
| 5,765,779 | A * | 6/1998 | Hancock et al. .......... 244/134 D |
| 5,823,610 | A | 10/1998 | Ryan et al. |
| 6,012,762 | A | 1/2000 | Burg |
| 6,257,654 | B1 | 7/2001 | Boivin et al. |
| 6,286,894 | B1 | 9/2001 | Kingham |
| 6,309,010 | B1 | 10/2001 | Whitten |
| 6,378,932 | B1 | 4/2002 | Fasel et al. |
| 6,485,087 | B1 | 11/2002 | Roberge et al. |
| 6,666,498 | B1 | 12/2003 | Whitten |
| 6,729,680 | B2 | 5/2004 | Lehmann |
| 6,846,084 | B2 | 1/2005 | Wong et al. |
| 6,854,788 | B1 * | 2/2005 | Graham ..................... 296/180.4 |
| 7,121,614 | B2 | 10/2006 | Kawai |
| 7,240,958 | B2 | 7/2007 | Skopic |
| 2002/0030384 | A1 | 3/2002 | Basford |
| 2003/0205913 | A1 | 11/2003 | Leonard |

FOREIGN PATENT DOCUMENTS

CA     1079772 A     6/1980

OTHER PUBLICATIONS

Roy, S. and Srinivasan, P., External Flow Analysis of a Truck for Drag Reduction, SAE Paper No. 2000-01-3500, 2000.

Wood, R. and Bauer, S., Simple and Low-Cost Aerodynamic Drag Reduction Devices for Tractor-Tailer Trucks, SAE Paper No. 2003-01-3377, 2003.

McCallen, R., et al., DOE's Effort to Reduce Truck Aerodynamic Drag—Joint Experiments and Computations Lead to Smart Design, Proceedings of AIAA Fluid Dynamics Conference Jun. 28-Jul. 1, 2004 Portland Oregon, Pub. Date Jun. 14, 2004, U.S. Department of Energy—Lawrence Livermore Laboratory.

\* cited by examiner

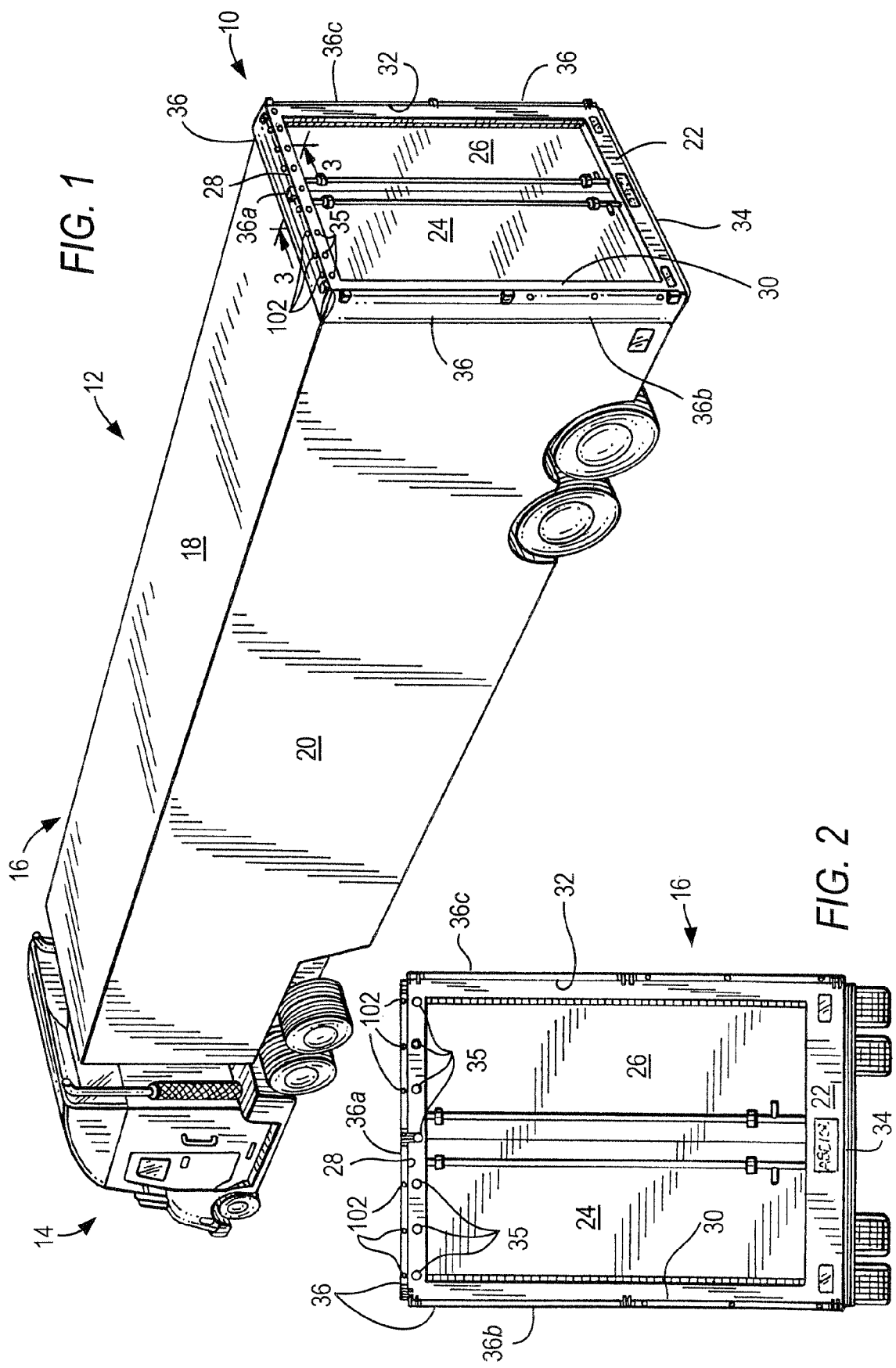

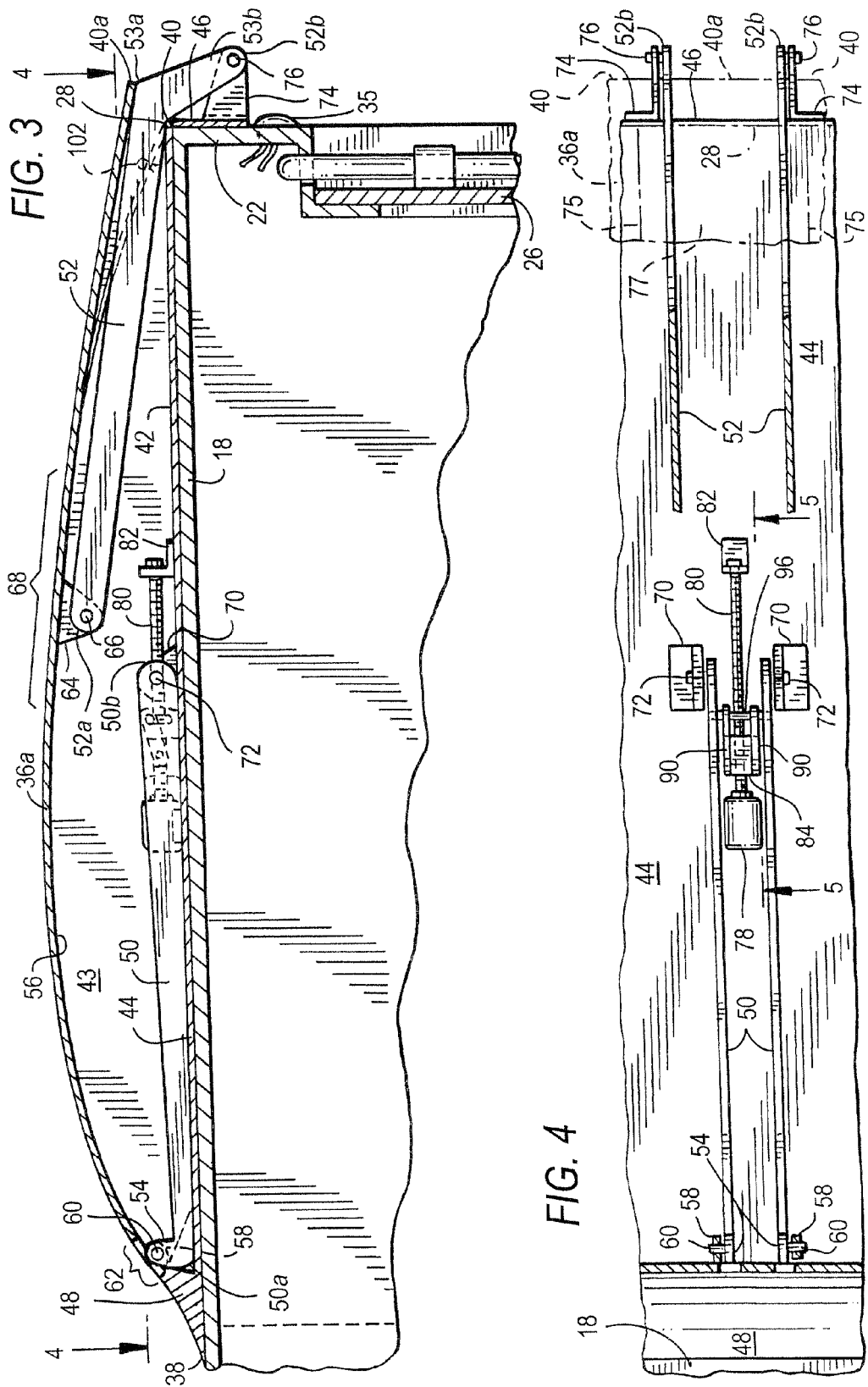

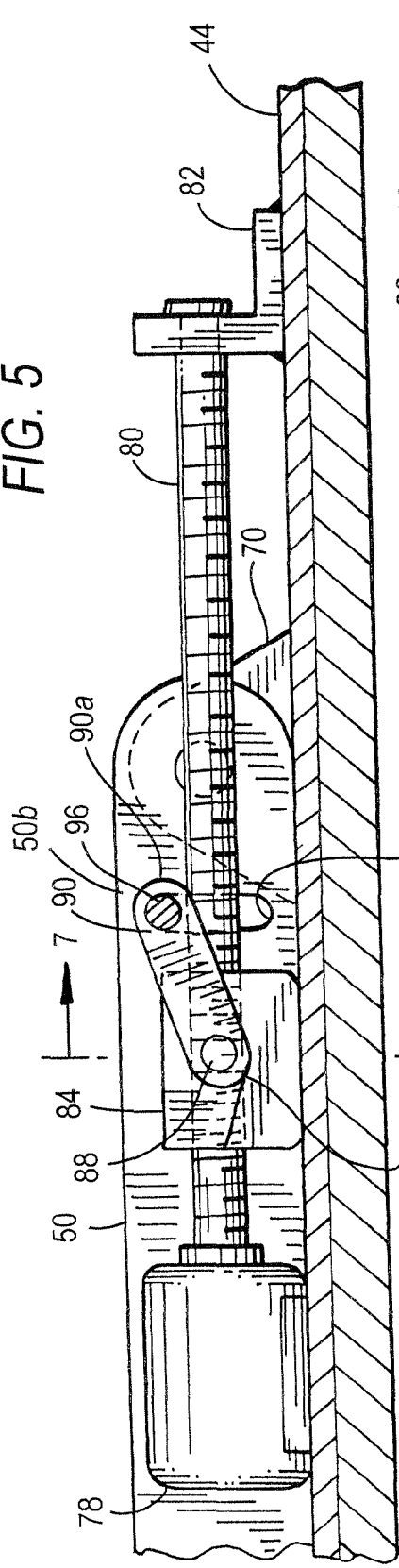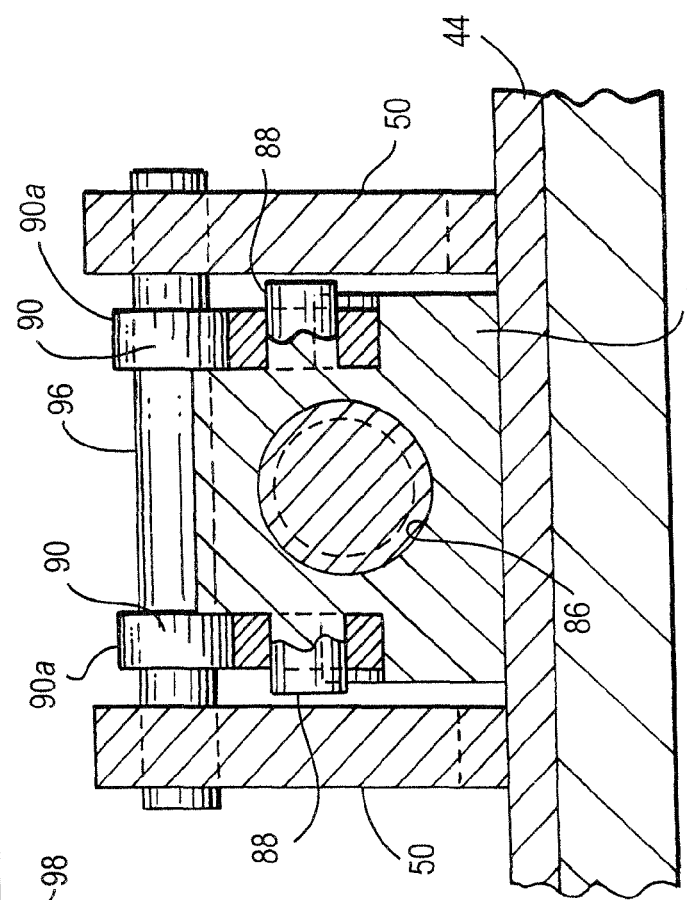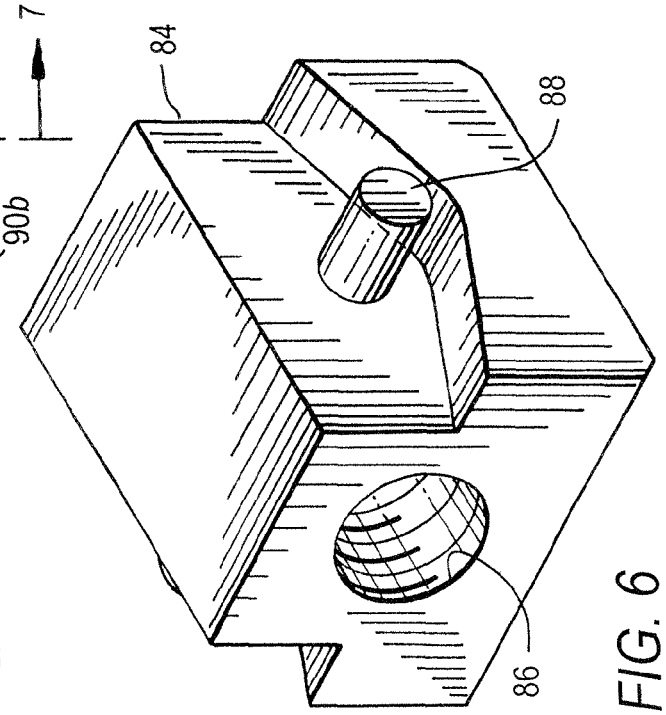

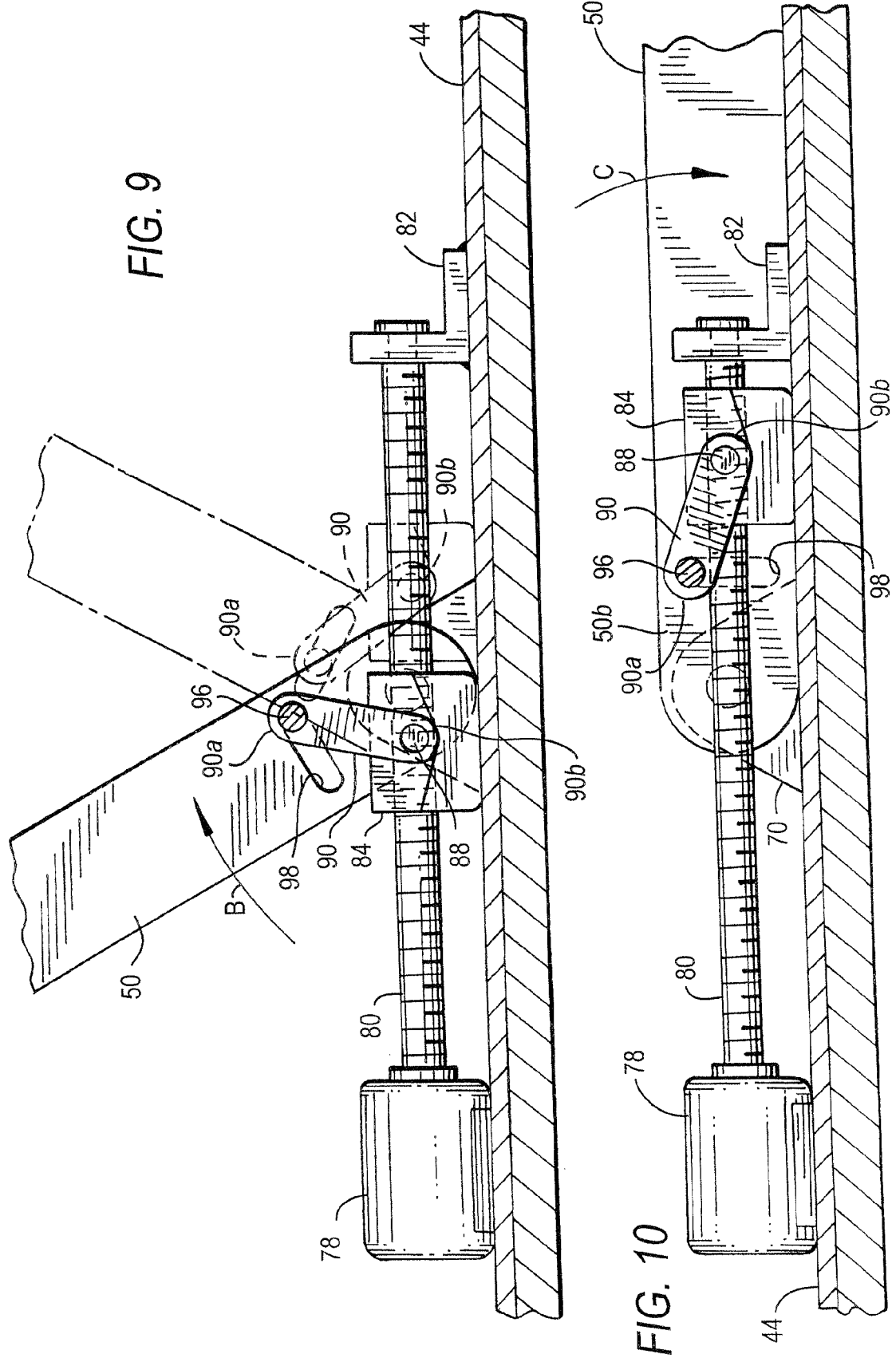

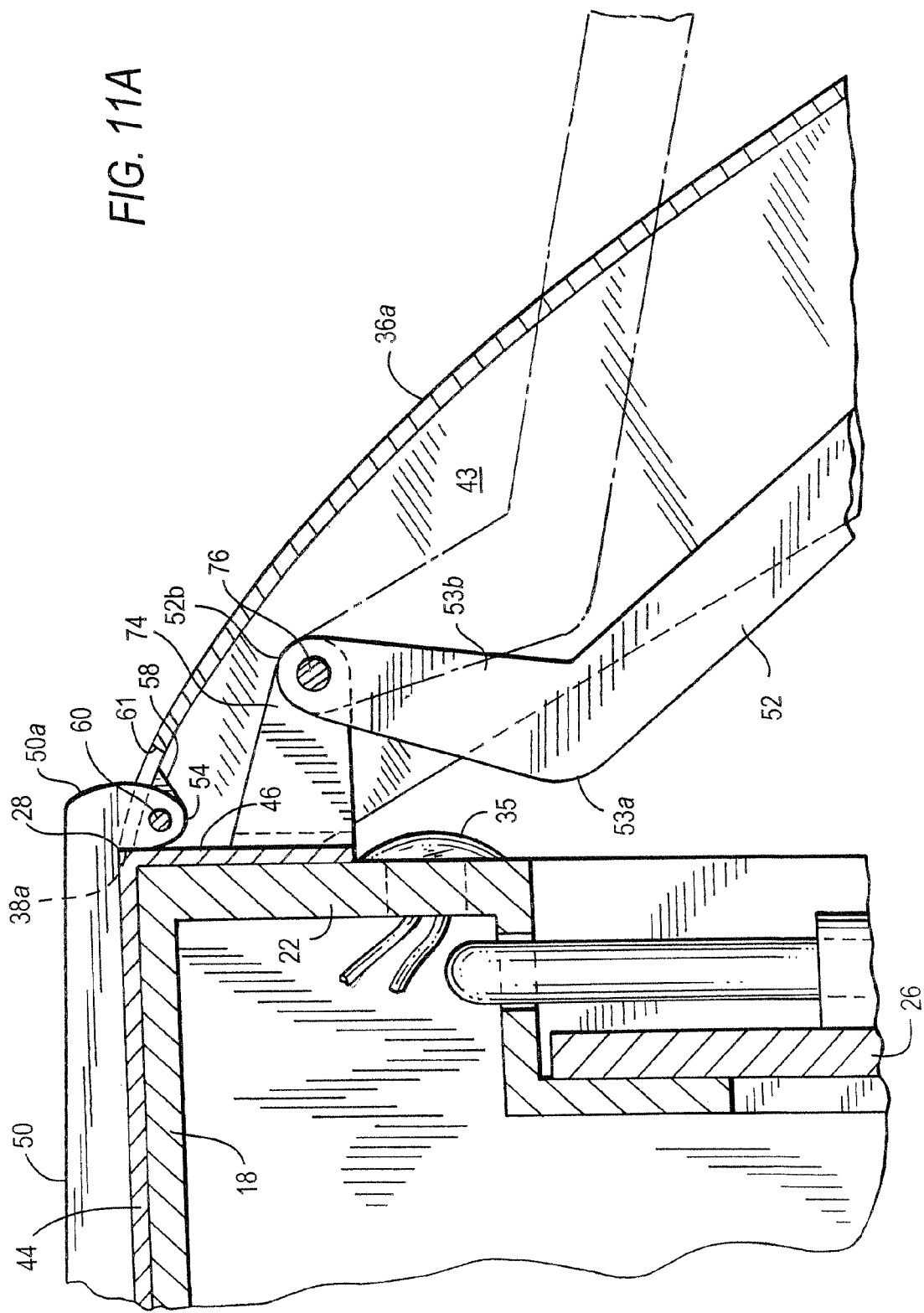

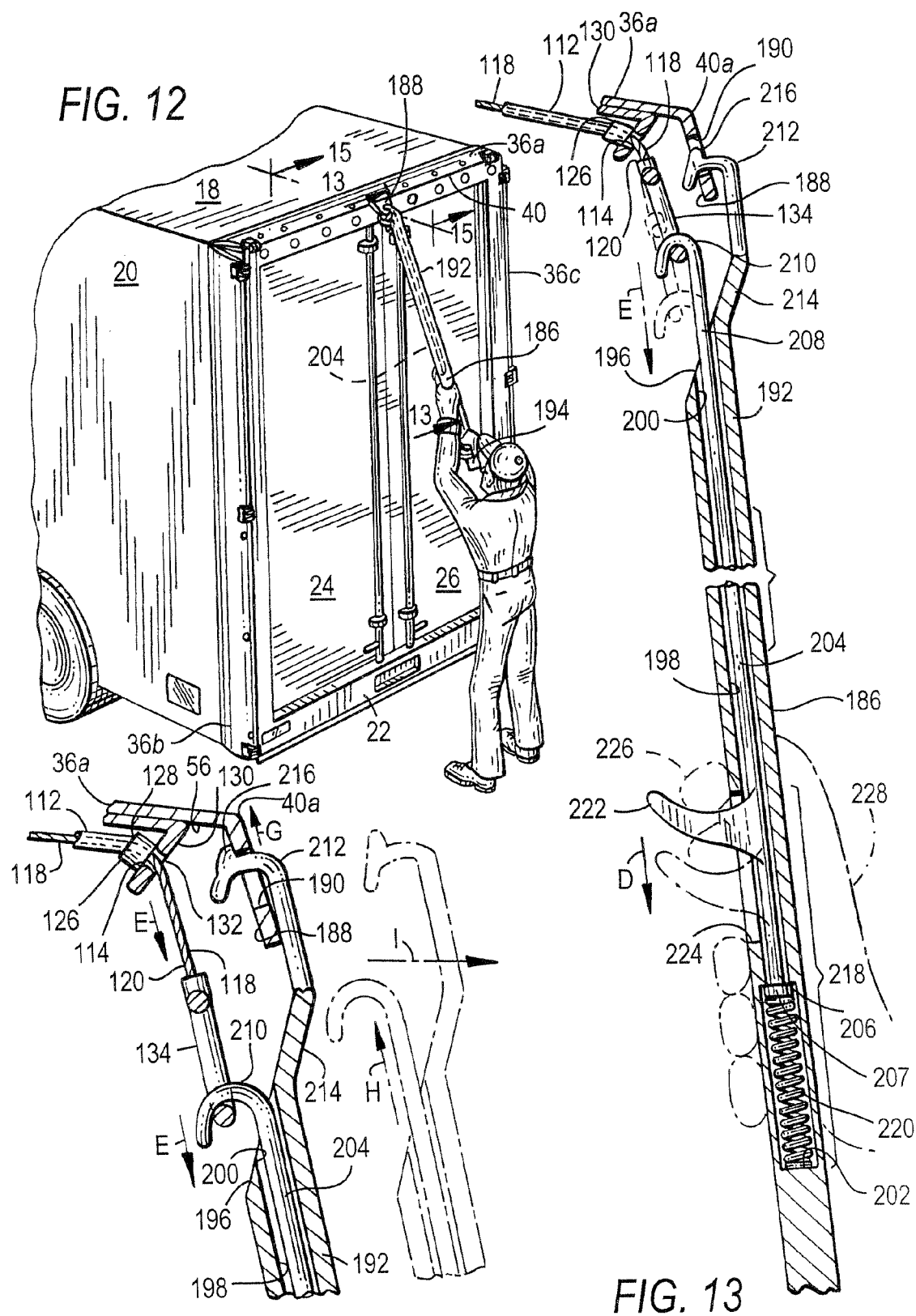

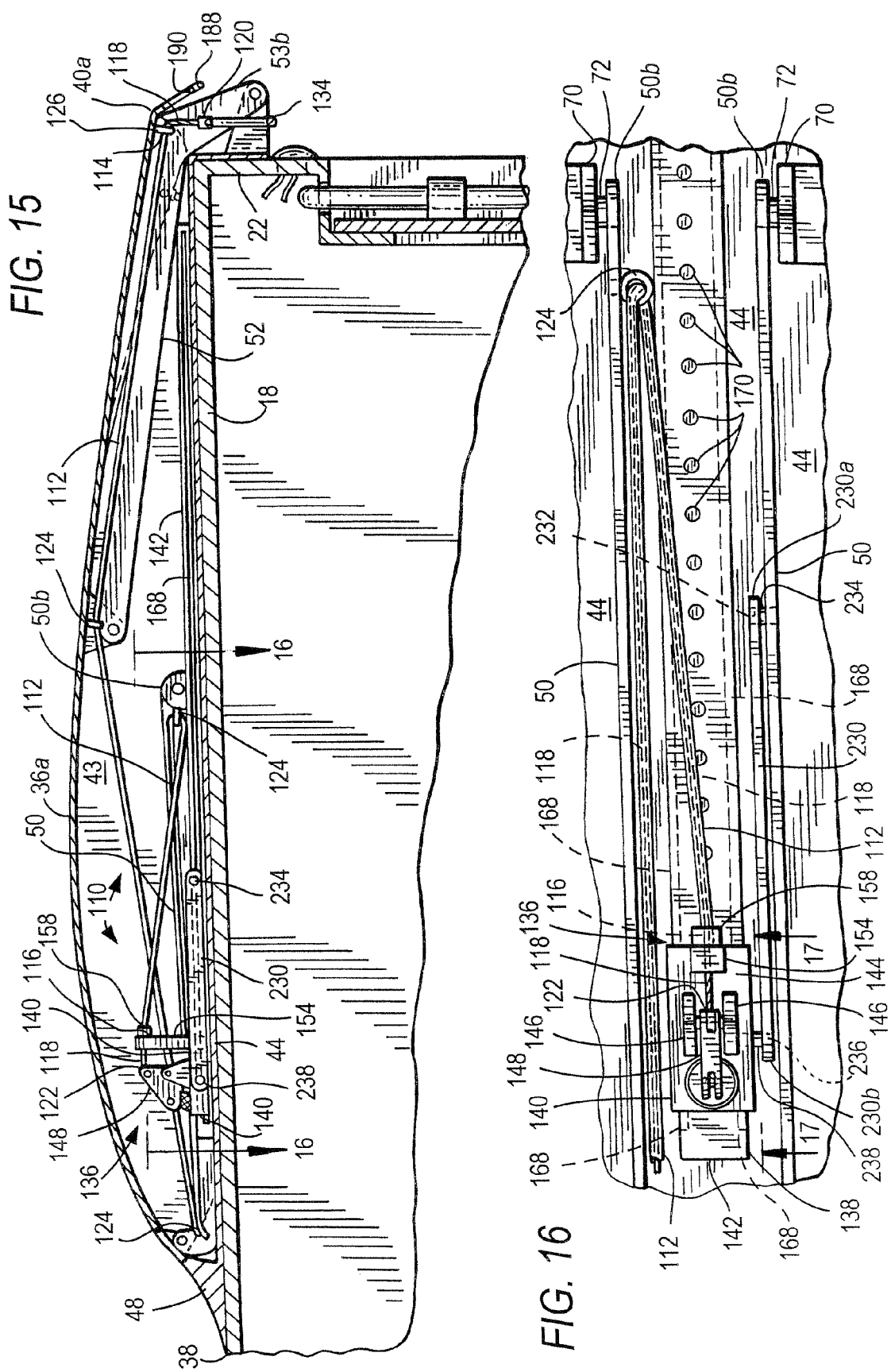

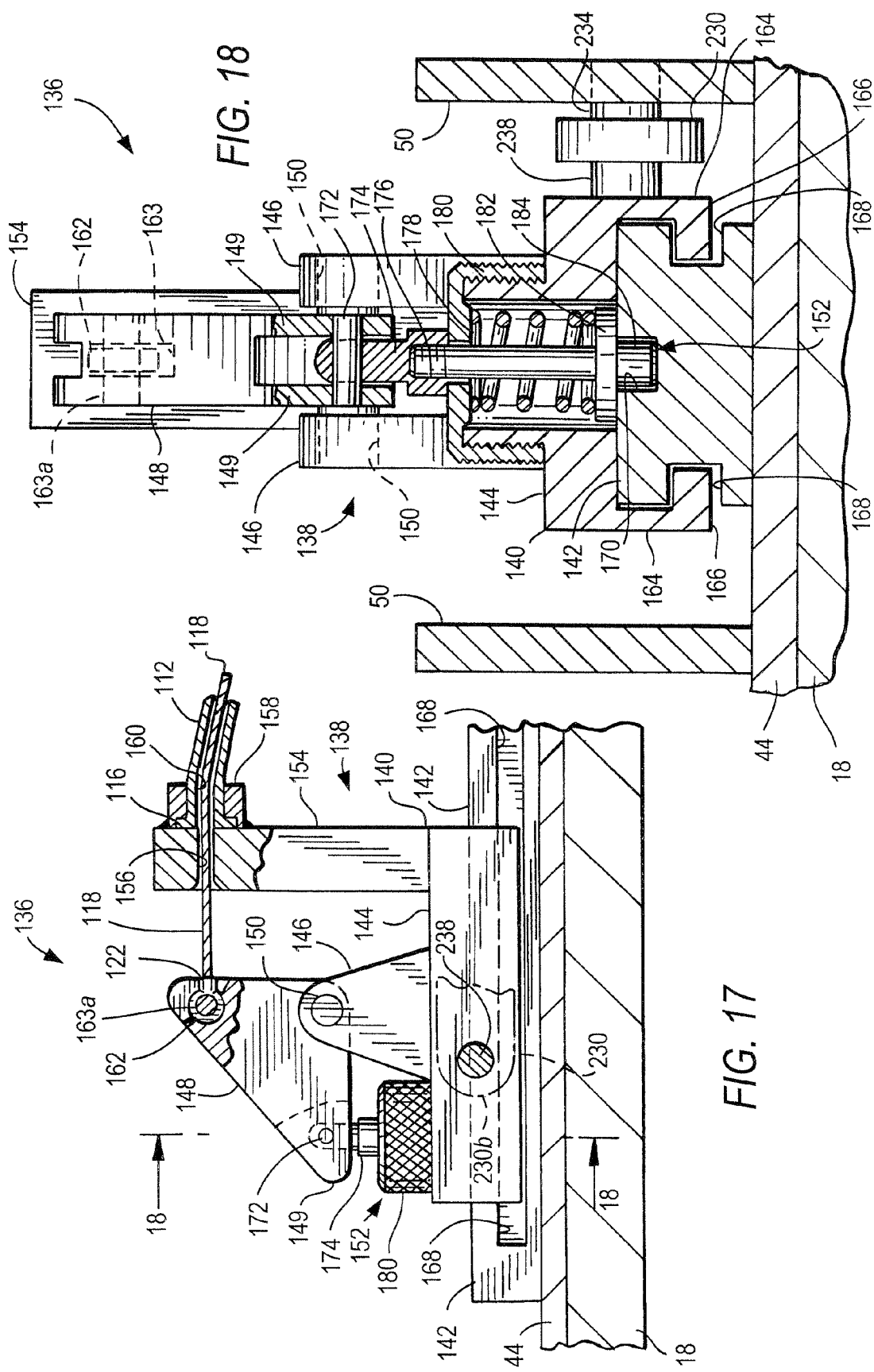

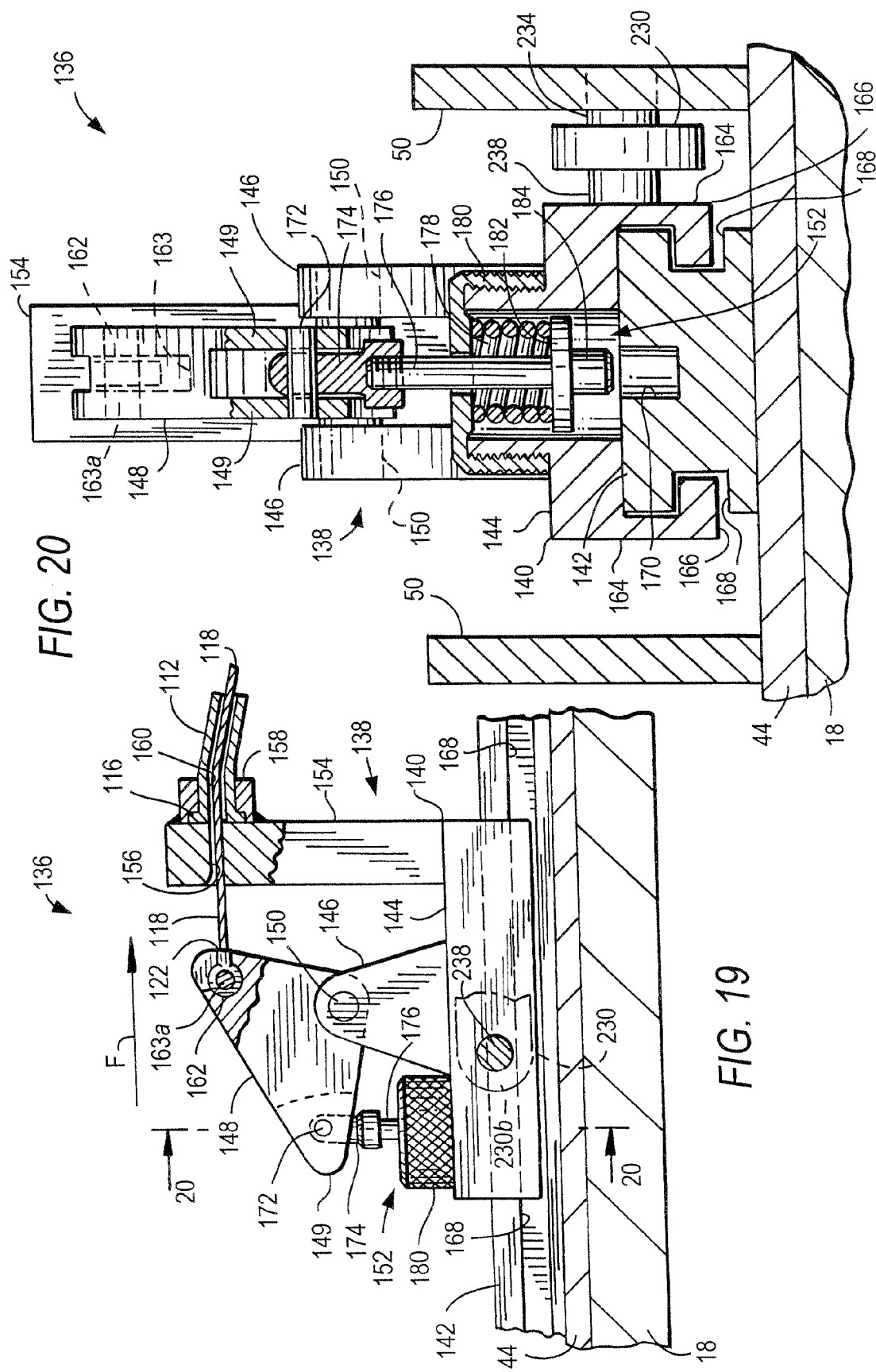

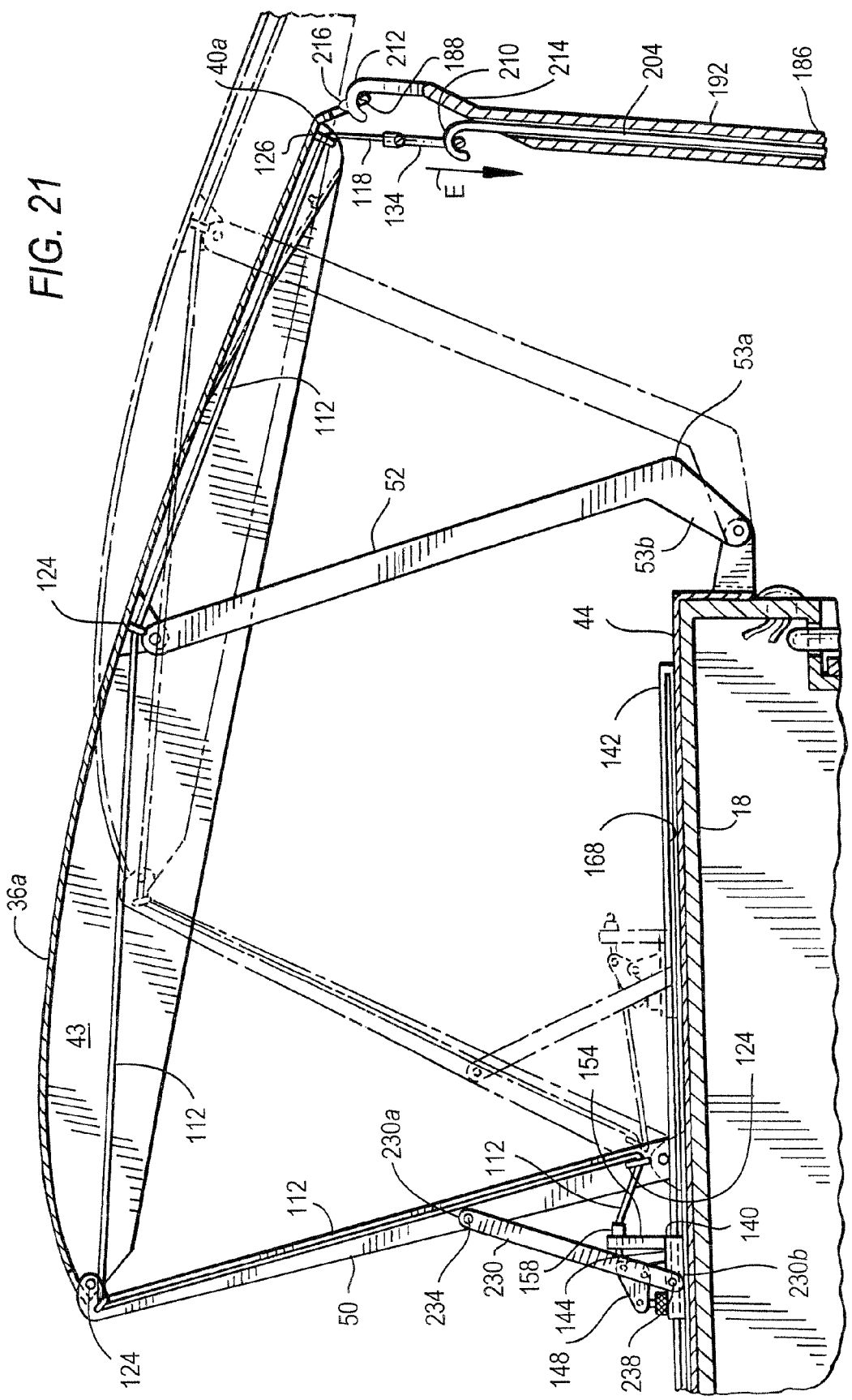

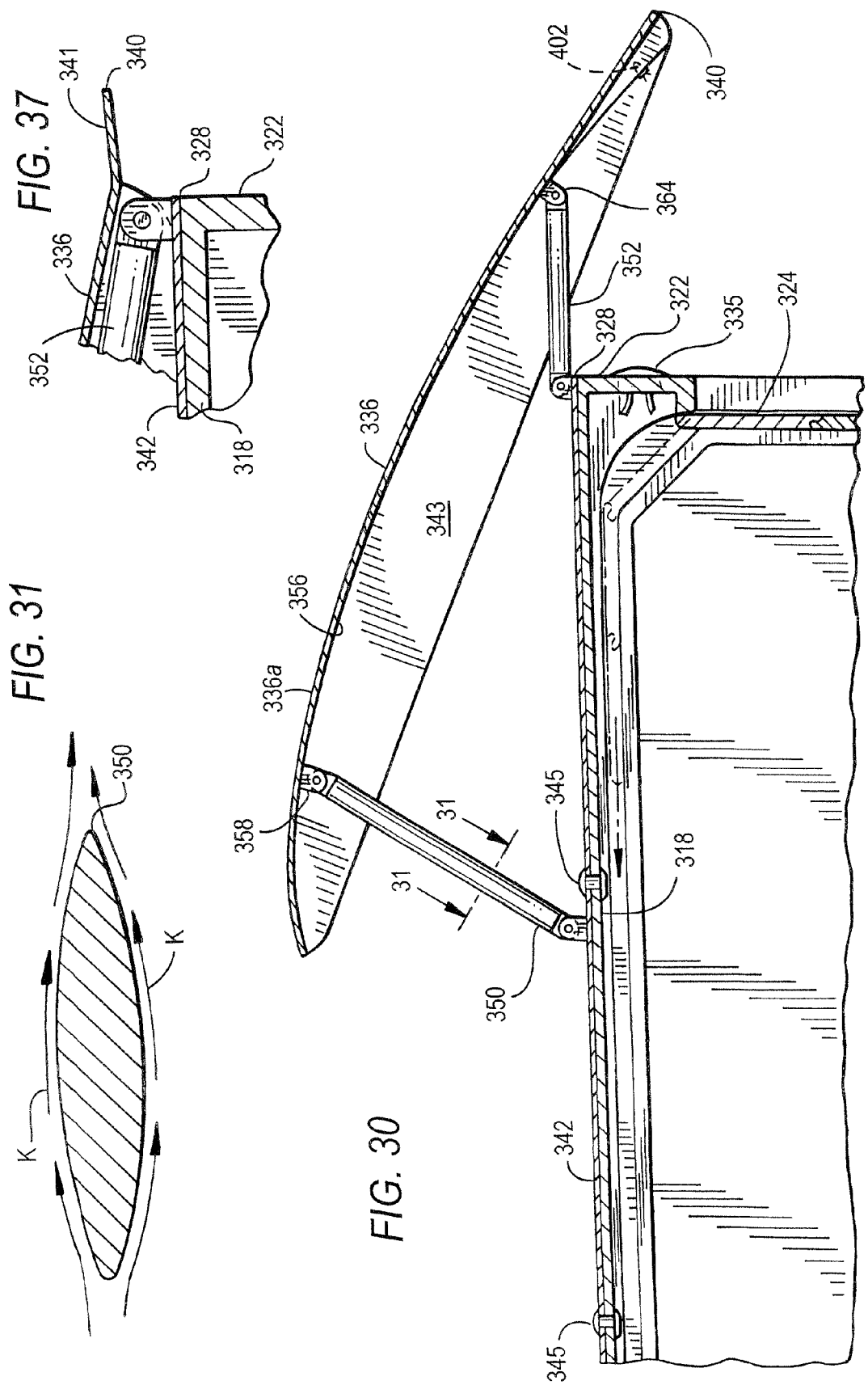

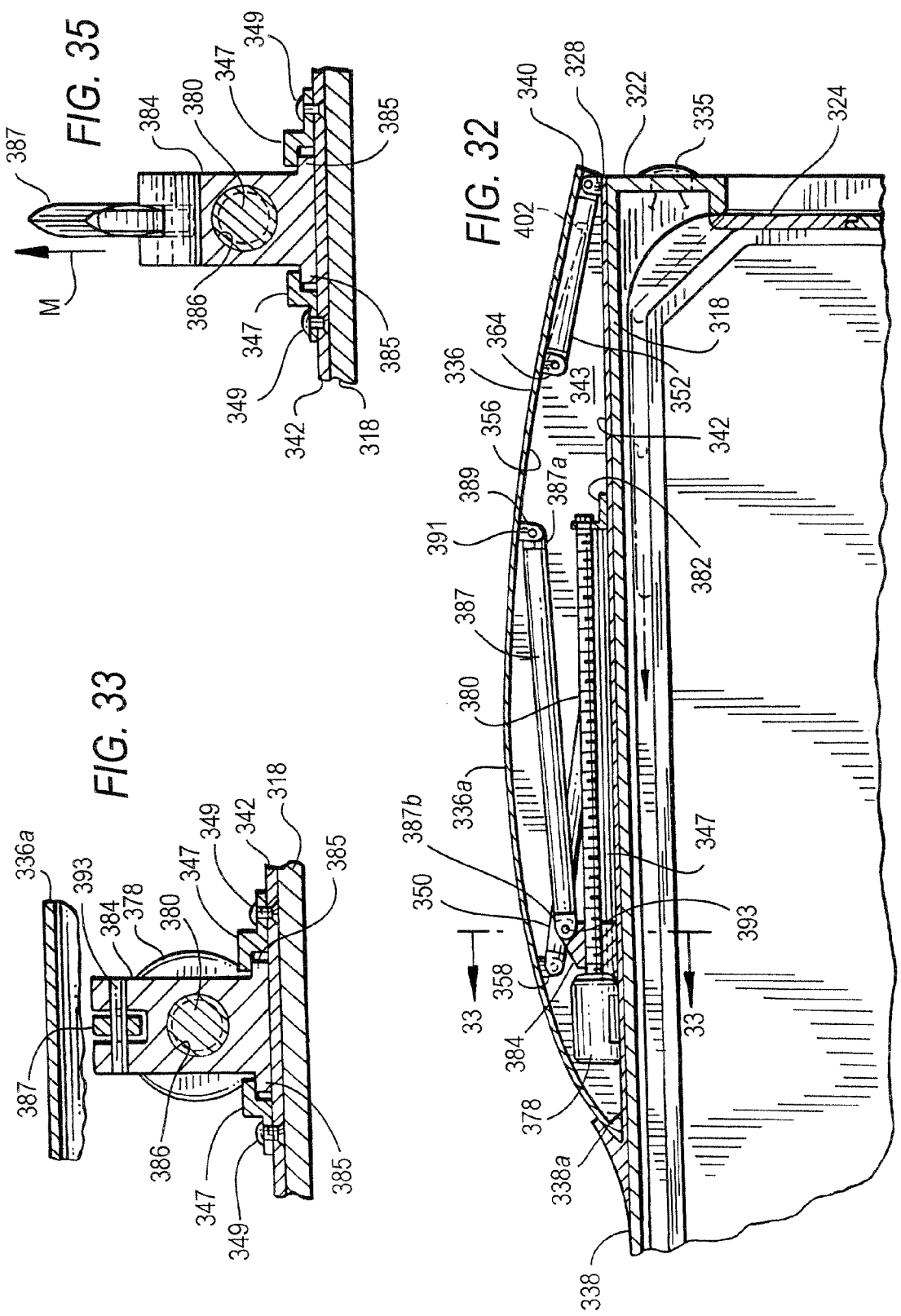

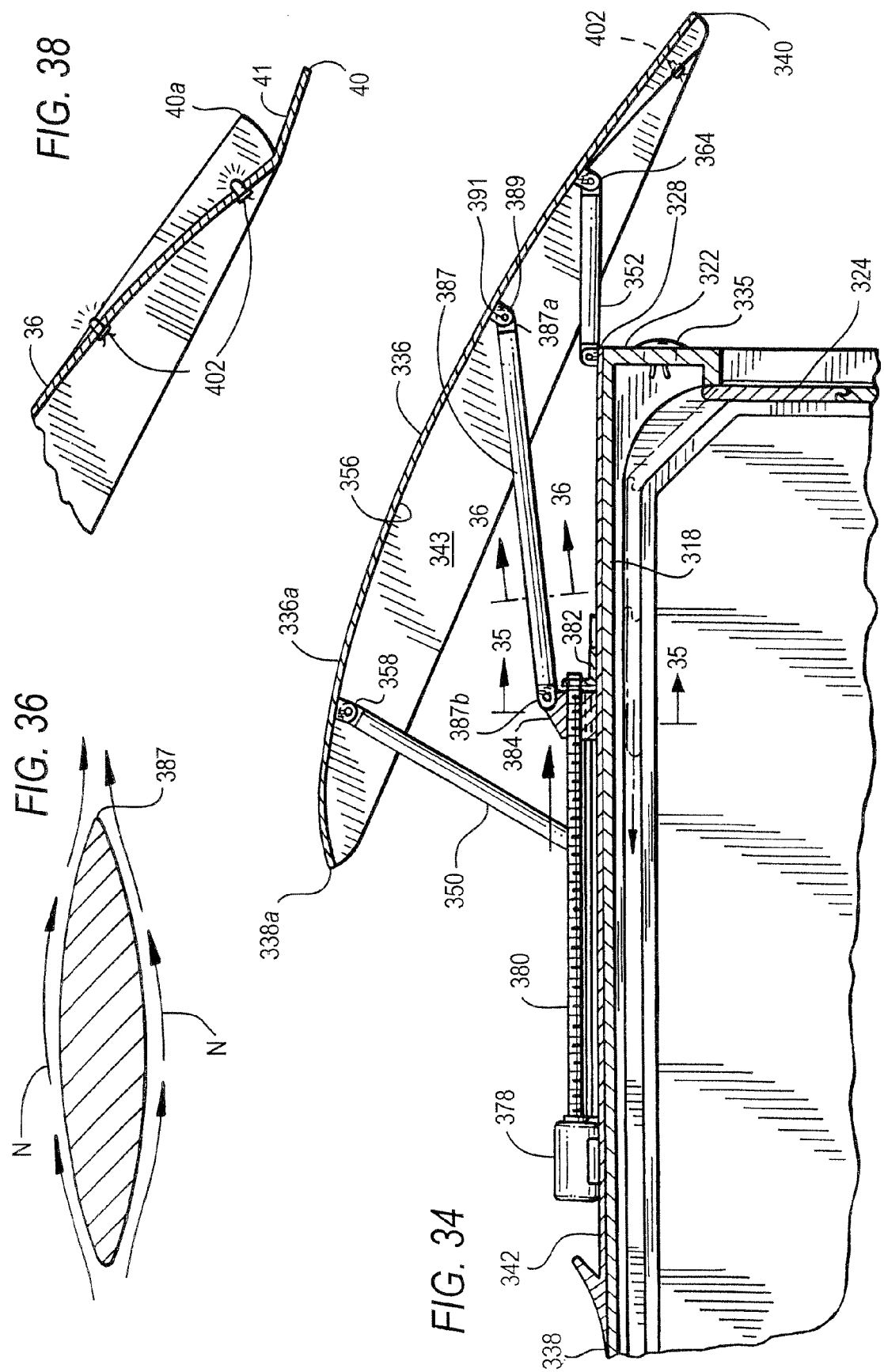

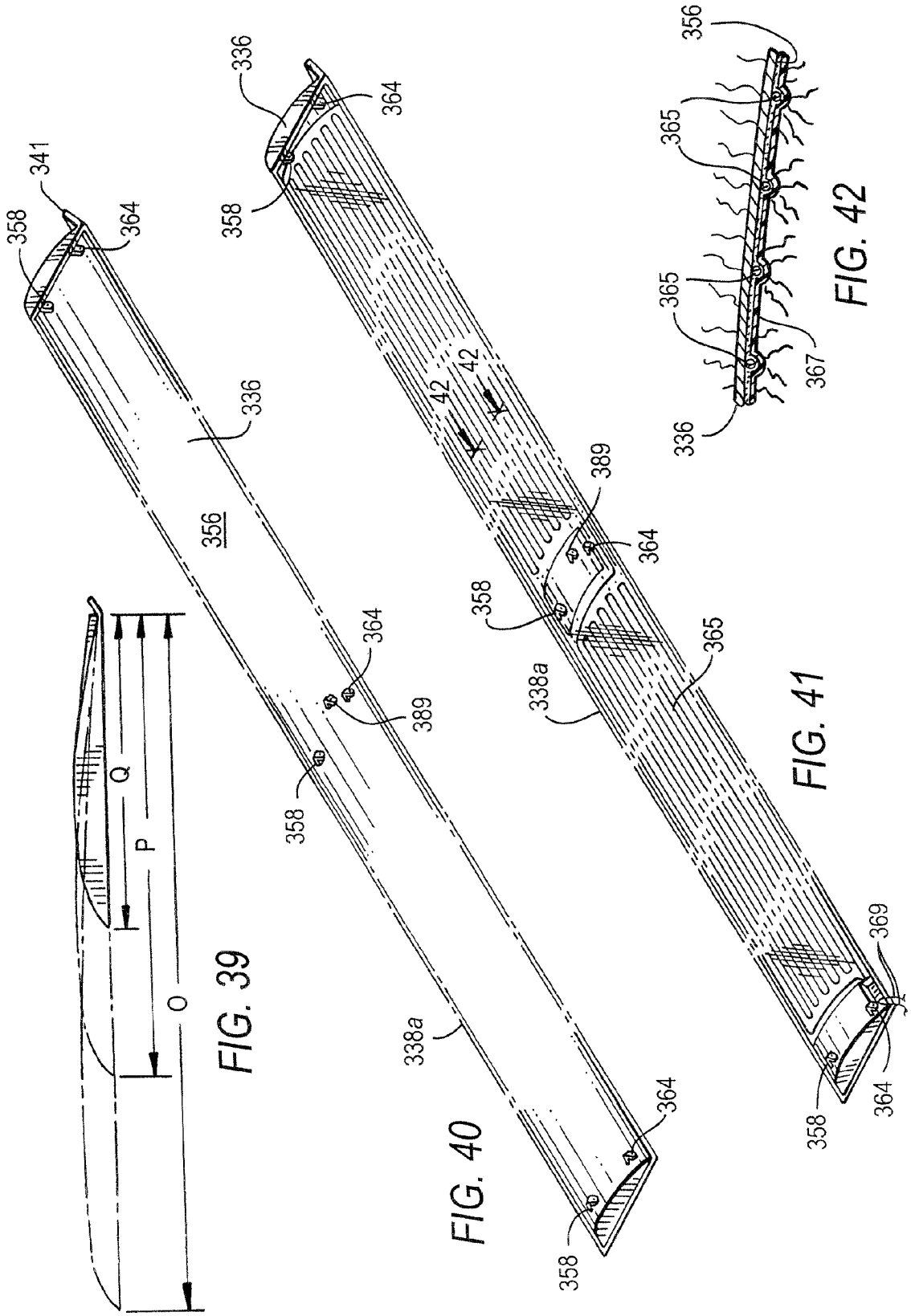

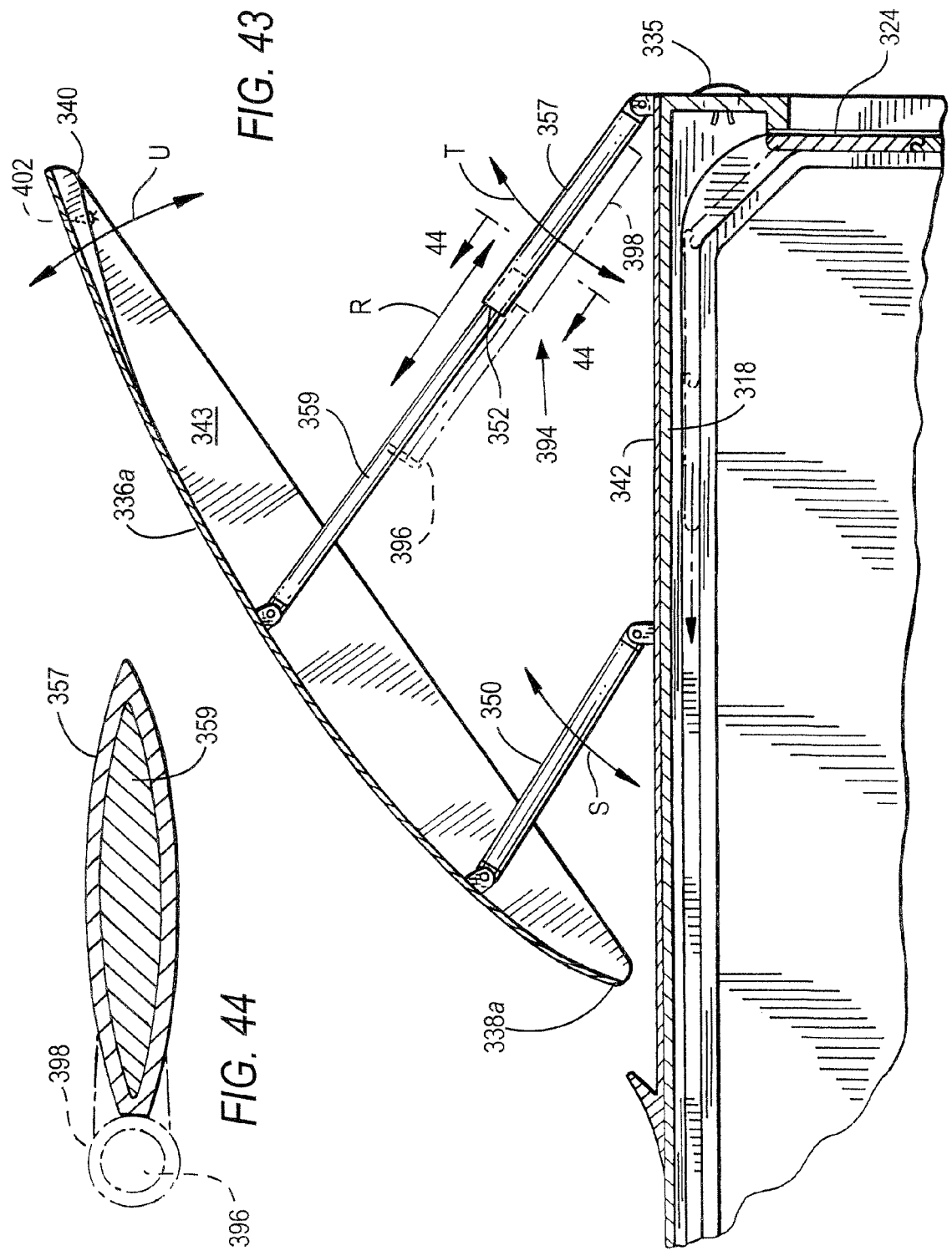

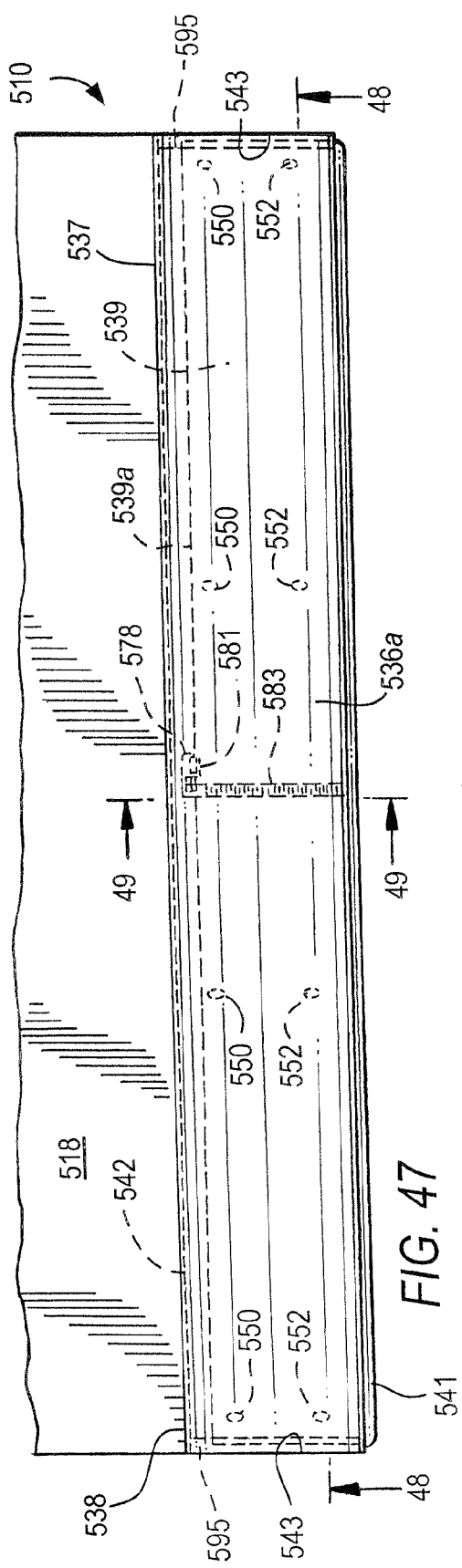
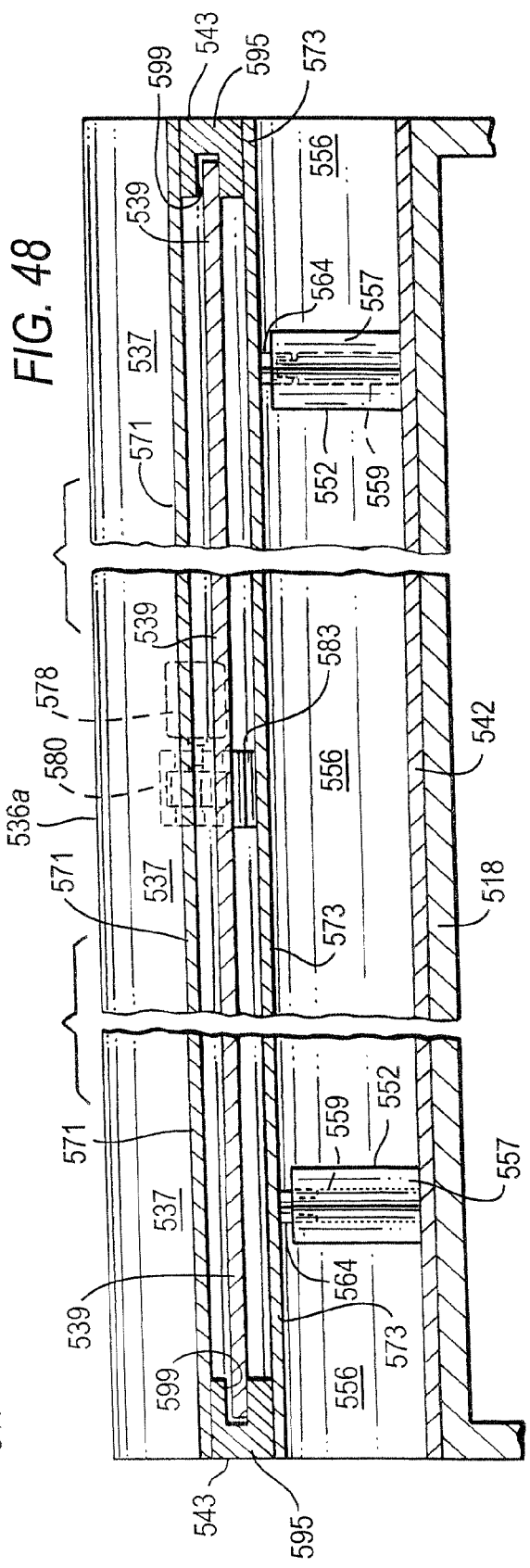
FIG. 47
FIG. 48

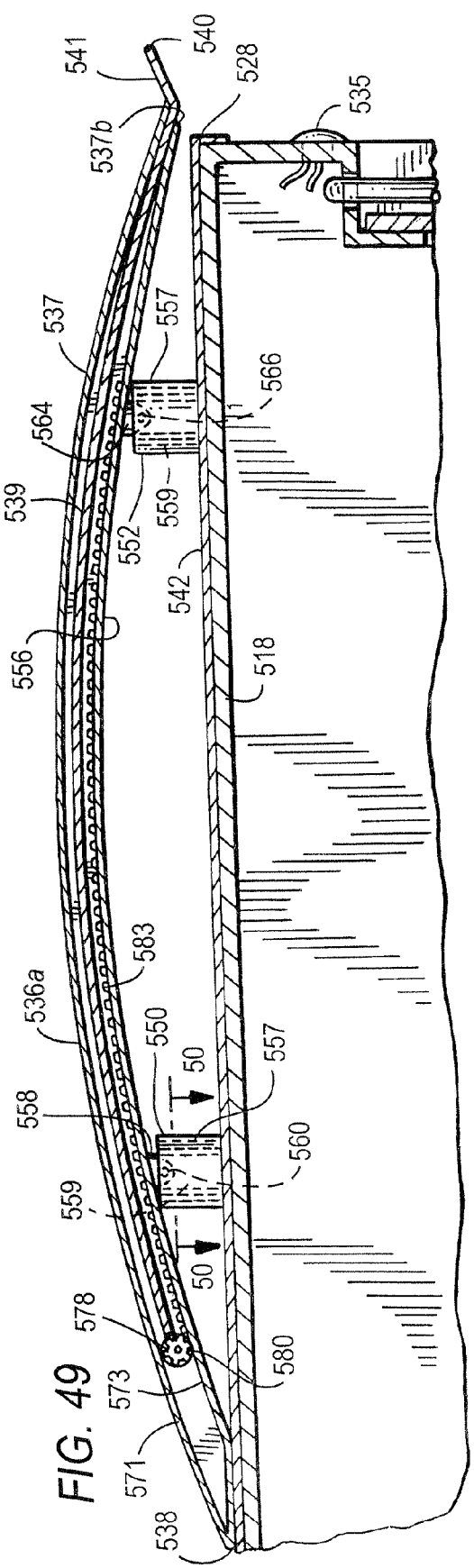
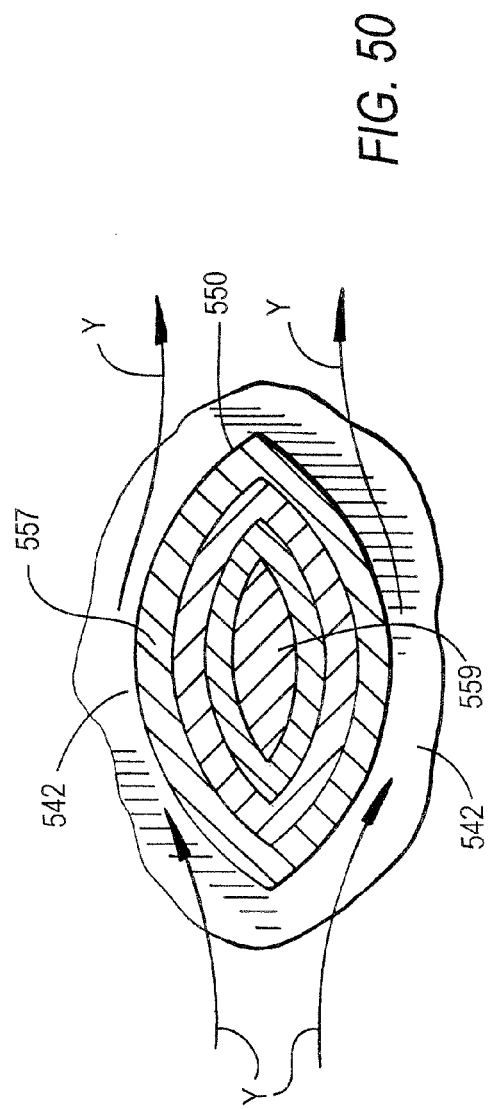

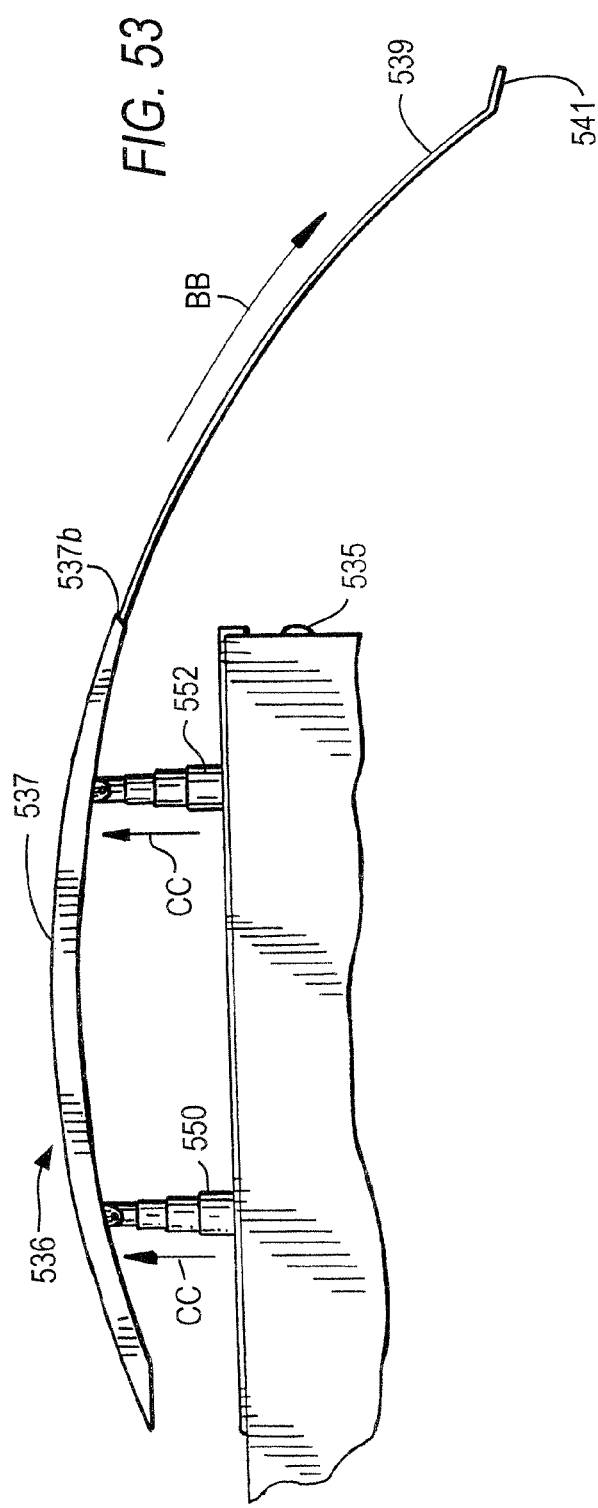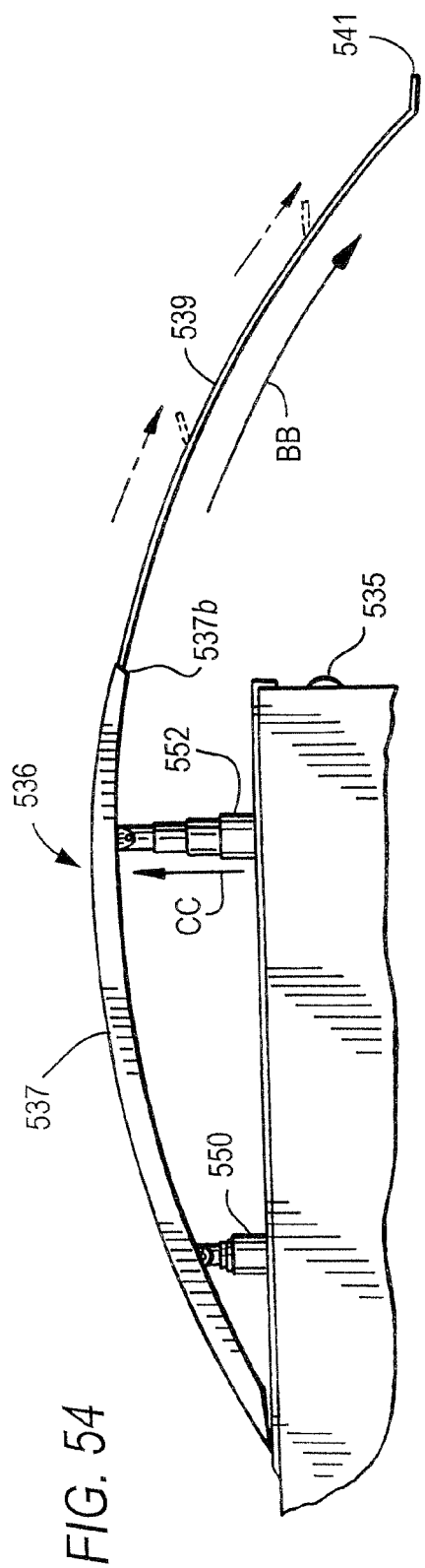

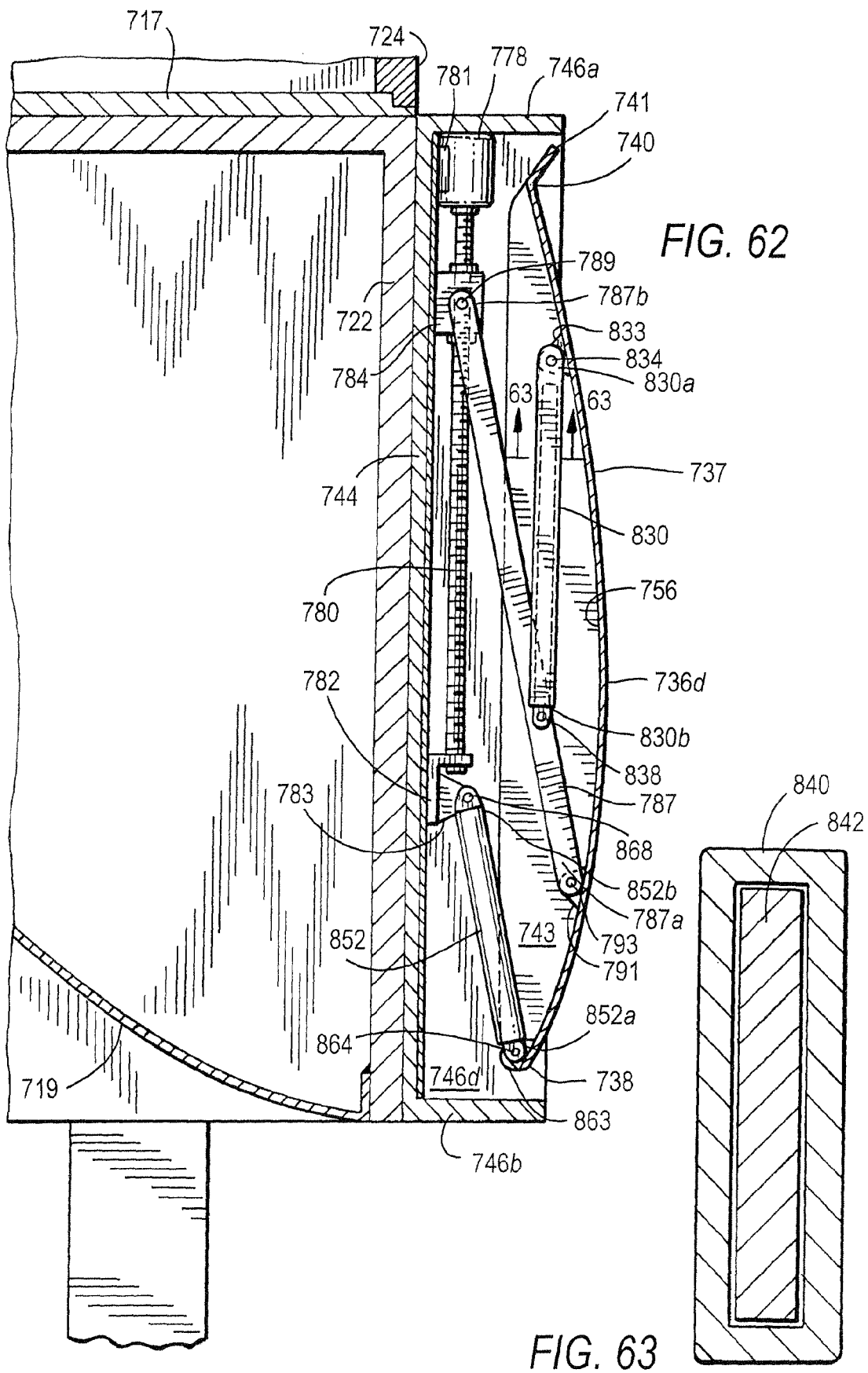

RETRACTABLE AIR DEFLECTION APPARATUS FOR REDUCTION OF VEHICULAR AIR DRAG

REFERENCE TO RELATED APPLICATIONS

This application is a continuation of prior application Ser. No. 11/707,700, filed Feb. 16, 2007, now U.S. Pat. No. 7,641,262, which claims the benefit of prior co-pending U.S. Provisional Patent Application Ser. No. 60/852,736, filed Oct. 19, 2006.

TECHNICAL FIELD

This invention relates to an improvement in the aerodynamic characteristics of vehicles. More specifically, this invention relates to an air deflection apparatus for box-shaped land transportation vehicles, such as trucks and the like, which provides a reduction in the aerodynamic drag that normally results from the movement of such vehicles through the air at various speeds. Even more specifically, this invention relates to at least one retractable air deflection element, which may be disposed adjacent the angular trailing corner edge(s) of a box-shaped vehicle body, and which, in the preferred embodiment, can assume at least three positions: a closed or retracted position, which provides a modicum of aerodynamic drag reduction, a deployed position providing additional aerodynamic drag reduction for travel at low and moderate speeds, and an extended deployed position providing aerodynamic drag reduction for travel at high speeds.

BACKGROUND OF THE INVENTION

Fuel consumption is a major operating cost for trucking and other forms of transportation. As fuel costs have risen, the expense of fuel has become an increasingly important component in the operating expenses associated with transportation, and as such it has become a factor that affects the profitability of individual transportation companies and of the transportation industry generally.

Most trucks and other heavy land-based transport vehicles have boxy shapes which are inefficient aerodynamically, and therefore, when such a vehicle travels over a route at normal operating speeds, airflow resistance at the front of the vehicle, which tends to increase headwind or frontal pressure, and drag-producing air flow phenomena at the rear and along the sides of the vehicle, which tend to decrease trailing air pressure and to increase friction, combine to retard the forward movement of the vehicle and have always been major factors in wasted fuel economy. Specifically, in order to maintain a chosen speed, additional engine power is required to overcome the air flow resistance and drag produced by these phenomena, which in turn leads to the consumption of more fuel. As the speed of the vehicle increases, the effects produced by these phenomena can increase geometrically, such that at high operating speeds, most of the energy expended by the vehicle is consumed in overcoming these phenomena.

Several solutions to the problem of air flow resistance at the front of such a vehicle have been proposed, most of which alter the configuration and thereby "streamline" the front of the vehicle in some way so as to reduce the air flow resistance, and some of these proposals have even been implemented commercially. This frontal streamlining reduces the headwind, or front end pressure, but does nothing to address the similar but distinct problems caused by the air flow phenomena which produce drag, and which originate behind, or at or near the rear of such a vehicle, along its top and sides, to which the prior art has paid little attention.

This drag results from two distinct factors, one of which is an area of low pressure or partial vacuum that develops behind the vehicle as it travels forward, and into which surrounding air is drawn. This area of low pressure further retards the forward movement of the vehicle, because it amplifies the effect of the air flow resistance at the front of the vehicle (mentioned above) by increasing still further the pressure differential or pressure gradient between the front and rear of the vehicle. For a conventional box-shaped, tractor-trailer type of vehicle, a substantial counteracting force is required to overcome the increase in the pressure gradient caused by the trailing area of low pressure. This counteracting force, which can only be provided via the expenditure of additional fuel by the vehicle's engine, is a major component of the total fuel consumed by such a tractor-trailer operating at highway speeds.

The other factor that results in drag is due to an increase in friction arising from the disruption in laminar air flow longitudinally along the sides and along the top of a box-shaped vehicle as it progresses through the air along its forward path. This disruption is characterized by eddies and turbulence that develop behind and along the top and sides of the vehicle as the laminar flow breaks down. When traveling at slower speeds, the breakdown "boundary," i.e., the point at which this effect is manifested, is located towards the rear of the vehicle, but as the speed increases, the breakdown boundary generally migrates forward, thus increasing the amount of friction experienced by the vehicle. The precise location of the breakdown boundary will vary not only with the speed of the vehicle, but also with variations in the shape of the vehicle body, as well as with ambient wind speed and direction, and other weather conditions. However, the first areas of such a vehicle that are affected by the breakdown in laminar flow are the top and sides, at or near the respective trailing edges.

A few solutions to the problems associated with drag have been proposed, but some of them have been directed primarily toward the breakdown in laminar flow along the top and sides of the vehicle, while others have been directed primarily toward reducing the area of low pressure at the rear of a vehicle. For example, it is known to provide hinged side and roof extenders at the trailing edges of a truck body, or at the trailing edges of the trailer of a tractor-trailer, which can reduce drag to some degree.

Such solutions are exemplified by U.S. Pat. No. 6,485,087 to Roberge et al. However, the hinged panels of Roberge et al. are flat or planar, rather than curved, and they are attached to the hinged pair of rear cargo doors which form a portion of the rear-facing surface of the vehicle; thus, they are caused to retract only when those cargo doors are opened, and they cannot be used with vehicles that employ a single, "roll-up" rear cargo door (rather than a pair of swinging cargo doors), since no means to access such a unitary door (or the cargo inside) is provided. Moreover, these panels, which primarily provide for an improved laminar flow by altering the shape, i.e., by streamlining, the rear side and upper rear edges of the trailer, do not directly address the problem of reduced trailing pressure, and therefore do not divert the air sufficiently to alleviate the area of low pressure behind the vehicle (although a modest diversion or deflection of the airstream does occur as the air is "bent" slightly around the panels). As a result, the solution proposed by Roberge et al. functions best only at higher operating speeds, since it does not provide for "scooping" or "ducting" of the air, which is desirable at lower operating speeds in order to reduce the trailing low pressure behind the vehicle as well as to improve the laminar flow along the top and sides of the vehicle.

On the other hand, while U.S. Pat. No. 5,280,990 to Rinard does provide curved, vertically-oriented side deflection vanes (as well as horizontally-oriented transverse upper and lower deflection ducts, which act to "scoop" or divert at right angles the air flow above, below and along the sides of the vehicle, and which are therefore primarily directed towards reducing the area of low pressure behind the vehicle), Rinard's air diversion elements do not directly address the additional drag caused by the breakdown in laminar flow along the top and sides of the vehicle (although a slight improvement in the laminar flow does occur simply by virtue of the reduction in the trailing low pressure that these elements do provide). Nevertheless, and in contrast to Roberge et al., the solution proposed by Rinard works well to reduce drag only at lower operating speeds, but does not work well at higher operating speeds, when there is more of a need for the airstream to be diverted from the trailing top and side surfaces by flowing over the air diversion elements, rather than being "ducted" under and/or through them. In fact, at higher speeds Rinard's solution not only becomes less effective, it actually becomes counter-effective as the vehicle speed increases, because as the airflow that is "ducted" through these elements increases, they eventually become aerodynamically resistive.

In addition, Rinard's side deflector vanes, like the planar panels of Roberge et al., are attached to the hinged pair of rear cargo doors which form a portion of the rear-facing surface of the vehicle, and although they can be displaced from their deployed position, this can be done only when the cargo doors of the trailer are opened, and even then, Rinard's side deflector vanes cannot be retracted to a fully flush position. Moreover, Rinard's deflector vanes are mounted with spring-biased means that act to return the deflector vanes to their deployed positions automatically (as soon as the cargo doors have been closed). Thus, while these deflector vanes need not be directly deployed and retracted manually in order to provide access to the cargo doors, they nevertheless remain deployed unless and until the cargo doors are actually opened, and accordingly, they are susceptible to damage when the vehicle is being maneuvered into a narrow loading dock, and/or they can interfere with the driver's ability to monitor road conditions behind the vehicle, especially when it is being operated on local streets or otherwise at slow (i.e., non-highway) speeds, or when it is being backed into a loading dock, or when it is being parked.

Furthermore, during high speed travel the instabilities resulting from the breakdown in the laminar airflow along the top and sides of the vehicle are likely to cause rapid oscillation of Rinard's side deflector vanes (despite their spring-biased mounting means), possibly resulting in those deflector vanes being damaged or, more likely, being forced by the unstable airflow into a "closed" position flush with the trailing edges of the vehicle body (completely overcoming the bias of the springs), and thereby making the vanes utterly ineffective to perform their intended air diversion or "scooping" function. Finally, Rinard's side deflector vanes, although arcuate in shape, are not contoured so as to optimize aerodynamic performance, and they can assume only one deployed position, which cannot be varied dynamically while the vehicle is traveling.

Thus, although the prior art appears to have recognized that the trailing upper (and, to a smaller degree, lower) edge of a box-shaped vehicle would create low pressure behind the rear of the vehicle when it is in motion, the prior art has failed to address that low pressure problem while also addressing the problems that arise from the simultaneous disruption of laminar flow along the top and sides of a vehicle. The prior art has also failed to recognize that the magnitude of each of these problems, both absolutely and relative to one other, and the nature of their most effective solutions, will vary according to the speed of the vehicle, and the prior art has failed address these problems in a manner that can not only dynamically adjust, but can also optimize, those solutions as the speed changes.

While the drag problems resulting from the trailing low pressure and disruption of laminar flow described above are particularly acute for cargo-carrying vehicles which travel over highways and other paved or unpaved roads, such as conventional tractor-trailers and other box-shaped trucks, and even squared-off passenger-carrying vehicles such as buses and sport-utility vehicles, they can also afflict other large land-based conveyances, particularly combination or "tandem" tractor-trailer assemblies comprising two or even three box-shaped trailers, and even a succession of adjacent, squared-off railroad cars (regardless of whether those rail cars are used for carrying passengers or freight).

In the latter cases, in which there are multiple box-shaped container units, additional airflow inefficiencies are created, due to the breakdown in laminar flow in between the units caused by the gaps between the adjacent container bodies, which the prior art has also failed to address. In fact, the prior art solutions, as exemplified by the Rinard and Roberge et al. patents mentioned above, even if attached to the rear-facing surfaces of the leading (and/or an intermediate) trailer of a "tandem" tractor-trailer assembly, or to the rear-facing surfaces of the leading (or one of the intermediate) cars of a succession of box-shaped railroad cars, would have no effect, since any attempt to divert air into the relatively confined space between the adjacent container bodies, where the air pressure is not reduced to any significant degree in any event, will be ineffective because of back pressure. Moreover, Rinard's deflectors might actually have an undesirable, negative effect in this "tandem" context, since they will actually foster a breakdown in laminar flow at lower speeds than would otherwise be the case if those deflectors were not present, thus actually reducing, rather than improving, aerodynamic efficiency at any given speed.

Another related factor which can affect vehicle performance, and therefore fuel consumption, is the airflow both over and under the vehicle, as it moves along its route at high speeds. Since the air moving over the top of the vehicle often has to travel further than the air moving underneath the vehicle, a lift component is exerted on the vehicle body in accordance with Bernoulli's Principle, which tends to destabilize the vehicle. Moreover, for road vehicles such as tractor-trailers traveling at highway speeds, certain weather-related road conditions, such as those created by rain, can enhance this instability and increase the potential for "jack-knifing" when braking is needed. The prior art, as exemplified by the Rinard and Roberge et al. patents mentioned above, has failed to address the lift problem attributable to the Bernoulli effect in the same context as the problems created by the air flow phenomena which produce drag.

In summary, the prior art has failed to provide a solution that satisfactorily ameliorates all of the components of trailing drag which develop at or near the rear of a box-shaped vehicle, both behind it and along its top and sides, as it moves forward at normal operating speeds. Moreover, and particularly for road vehicles, the prior art has failed to provide such a solution which at the same time does not hinder or obstruct the driver's view of the area surrounding the rear of such a vehicle when it is being operated at slower and maneuvering speeds, and does not interfere with access to, or with the opening and closing of, the rear cargo door(s) which could unduly prolong loading and/or unloading operations at a conventional loading dock. Furthermore, and again particularly for road vehicles such as tractor-trailers and other box-shaped trucks, the prior art has failed to provide such a solution which also helps to overcome the lifting force encountered at highway speeds. Finally, the prior art has failed to appreciate that any measures used to counteract the aerodynamic inefficiencies that plague box-shaped vehicles must account for the fact that these aerodynamic instabilities, as well as the effectiveness of the countermeasures, will vary as the speed of the vehicle changes.

Accordingly, it is a principal object of the present invention to provide an air deflection apparatus for box-shaped land transportation vehicles which can reduce both the drag associated with the area of low pressure which develops behind such a vehicle, and the drag associated with the breakdown of the laminar air flow along the top and sides of such a vehicle, as it moves forward at normal operating speeds.

Another object of the present invention is to provide an air deflection apparatus for box-shaped land transportation vehicles which can reduce both of the major components of drag which develop along the top and sides and behind the rear of such a vehicle when it is being operated at high speeds, and which is adjustable in a dynamic fashion so as to vary the aerodynamic effects and thereby optimize the economic benefits thereof, depending upon the speed at which the vehicle is traveling.

An additional object of the present invention is to provide an air deflection apparatus for box-shaped land transportation vehicles which can reduce both of the major components of drag which develop along the top and sides and behind the rear of such a vehicle when it is being operated at high speeds, but which does not interfere with the opening and closing of the rear cargo door(s) or with cargo loading and/or unloading operations, at a conventional loading dock or otherwise, when the vehicle is stationary.

It is also an object of the present invention to provide an air deflection apparatus for box-shaped land transportation vehicles which can reduce both of the major components of drag which develop along the top and sides and behind the rear of such a vehicle when it is being operated at high speeds, but which does not obstruct the driver's view of the area surrounding the rear of such a vehicle when it is being operated at slower and maneuvering speeds, or when it is stationary.

Yet another object of the present invention is to provide an air deflection apparatus for box-shaped land transportation vehicles which can reduce both of the major components of drag which develop along the top and sides and behind the rear of such a vehicle when it is being operated at high speeds, and which can also reduce the additional airflow inefficiencies that are caused by the gaps between the adjacent container bodies in vehicles having multiple successive box-shaped container units.

It is an added object of the present invention to provide an air deflection apparatus for box-shaped land transportation vehicles which can reduce both of the major components of drag which develop along the top and sides and behind the rear of such a vehicle when it is being operated at high speeds, and which can be used to the same advantage regardless of whether the vehicle employs a pair of hinged swinging rear cargo doors, or a unitary, roll-up rear cargo door.

A further object of the present invention is to provide an air deflection apparatus for box-shaped land transportation vehicles which can reduce both of the major components of drag which develop along the top and sides and behind the rear of such a vehicle when it is being operated at high speeds, and which can also counteract the lifting force normally encountered by such vehicles at such speeds.

A still further object of the present invention is to provide an air deflection apparatus for box-shaped land transportation vehicles which can reduce both of the major components of drag which develop along the top and sides and behind the rear of such a vehicle when it is being operated at high speeds, which can easily be retro-fitted to existing vehicles or which can be included as original equipment in newly-manufactured vehicles.

SUMMARY OF THE INVENTION

These and other objects of the present invention are achieved by providing a drag-reducing apparatus for a box-shaped land transportation vehicle comprising, in certain embodiments, at least one air deflection element which is preferably curved (i.e., non-planar) and which is coupled to the outer surface of the vehicle but not necessarily to the rear-facing surface of that vehicle; more preferably, the apparatus comprises at least three air deflection elements, each of which is contoured in a wing-like shape, and each of which is disposed adjacent one of the angular trailing corner edges of the vehicle, most preferably with one disposed transversely across the upper trailing corner edge of the vehicle, and two disposed vertically, one along each of the side trailing corner edges of the vehicle.

Each of the air deflection elements is displaceable, and preferably all of the air deflection elements are displaceable in unison, between a retracted position and at least one air flow diverting, deployed position, but more preferably, the position of each of the air deflection elements is variable over a continuous range of positions, from a fully retracted position, through one or more deployed positions, to a fully extended deployed position, and most preferably, these movements of the air deflection elements are power-assisted and can be controlled remotely. The air deflection elements are coupled to the vehicle body in such a manner as to allow them to be moved to any position within the range of positions described above, and optionally in at least two embodiments, also to allow the trailing edge of the air deflection element mounted transversely across the upper rear corner edge of the vehicle to be extended upward, relative to its leading edge.

For vehicles in which the rear-facing surface comprises one or more doors allowing access to the interior of the vehicle for, e.g., loading or unloading of cargo, the air deflection elements are not coupled to these cargo doors, and therefore the deployment and retraction of the air deflection elements is independent of the position or movement of these cargo doors. As a result, the air deflection elements are capable of assuming a fully retracted position when these cargo doors need to be opened, but they do not automatically assume a deployed position once (i.e., they can remain in or assume the retracted position even when) the cargo doors of the vehicle are closed. Preferably, the air deflection elements are deployed only when the vehicle is in motion, and only to the extent necessary to optimize the aerodynamic drag reduction for the speed at which the vehicle is traveling, with the fully extended deployed position being utilized when the vehicle is moving at or close to its normally high operating speed. However, due to their aerodynamic shape, the air deflection elements can be effective, in certain embodiments, to counteract the breakdown in laminar flow along the top and sides of the vehicle, even when in their fully retracted position.

It is therefore one aspect of the present invention that when the vehicle is moving and the air deflection elements are deployed, both the drag associated with the area of low pressure which develops behind the vehicle, and the drag associated with the breakdown of the laminar air flow along the top and sides of the vehicle, are reduced as the air deflection elements divert the airflow from the trailing top and side surfaces of the vehicle.

It is another aspect of the present invention that when the vehicle is moving and the air deflection elements are not deployed, the air deflection elements may in certain configurations still provide some aerodynamic benefit, since the drag associated with the breakdown of the laminar air flow along the top and sides of the vehicle will be at least moderately reduced by the partial diversion of the airflow from the trailing top and side surfaces of the vehicle, thereby reducing turbulence by helping to at least partially re-establish laminar flow.

It is a feature of the present invention that the positions assumed by the air deflection elements can be changed dynamically, as the speed of the vehicle changes, in order to optimize their aerodynamic benefits in reducing drag.

It is another feature of the present invention that, depending upon the extent of deployment or the air deflection elements, the airflow along the top and sides of the vehicle can sometimes be diverted by being "ducted" or "scooped" by the inner surface of each air deflection element, and in other instances the airflow along the top and sides of the vehicle can be diverted by being "bent" over and around the outer surface of each air deflection element, while in still other instances the airflow can be diverted in both of these ways, thus utilizing both the inner and outer surfaces of each air deflection element simultaneously, so as to divert the airflow into the area behind the vehicle and thereby reduce in all cases the drag associated with the area of low pressure which develops behind the vehicle.

It is yet another feature of the present invention that the air deflection elements, when in their fully retracted positions, do not interfere with the opening and closing of the rear cargo door(s) of the vehicle or with cargo loading and/or unloading operations, regardless of whether the vehicle employs a pair of hinged swinging rear cargo doors or a unitary roll-up rear cargo door, nor do they impede the driver's view of the area surrounding the rear of the vehicle when it is being operated at slower and maneuvering speeds, or when it is stationary.

It is a further feature of the present invention that it can be used for aerodynamic benefit to reduce the airflow inefficiencies that result from the turbulence introduced by the gaps between the adjacent container bodies in vehicles having multiple successive box-shaped container units.

It is still another feature of the present invention that at least one of the air deflection elements can optionally also be used to counteract lift.

BRIEF DESCRIPTION OF THE DRAWINGS

These and other aspects, features, objects and advantages of the present invention will become more apparent to those skilled in the art from the following detailed description of the presently most preferred embodiments thereof (which are given for the purposes of disclosure), when read in conjunction with the accompanying drawings (which form a part of the specification, but which are not to be considered as limiting its scope), wherein:

FIG. 1 is a perspective view of a typical 18-wheel tractor-trailer vehicle, having a pair of hinged swinging rear cargo doors, and equipped with a retractable air deflection apparatus in accordance with the most preferred embodiment of the present invention;

FIG. 2 is a rear elevational view of the vehicle and apparatus of FIG. 1;

FIG. 3 is an enlarged cross-sectional view, taken substantially along the lines 3-3 of FIG. 1, depicting the upper air deflection element of FIG. 1 in the fully retracted position;

FIG. 4 is a cross-sectional view, taken substantially along the lines 4-4 of FIG. 3;

FIG. 5 is a further enlarged cross-sectional view, taken substantially along the lines 5-5 of FIG. 4, showing the configuration of the some of the drive components of the embodiment of FIG. 1 when the upper air deflection element is in the fully retracted position of FIG. 3;

FIG. 6 is a still further enlarged, perspective view of the one of the drive components shown in FIGS. 4 and 5;

FIG. 7 is a cross-sectional view of the component of FIG. 6, taken substantially along the lines 7-7 of FIG. 5;

FIG. 9 is a further-enlarged cross-sectional view similar to that of FIG. 5, but showing the configuration of the drive components of FIG. 5 when the upper air deflection element is in the deployed position of FIG. 8;

FIG. 10 is a further-enlarged cross-sectional view similar to that of FIGS. 5 and 9, but showing the configuration of the drive components of FIG. 5 when the upper air deflection element is in the fully extended deployed position;

FIG. 11A is further enlarged cross-sectional view of the leading edge portion of the air deflection element of FIG. 11;

FIG. 12 is an perspective view similar to FIG. 1, but enlarged and partially broken away, showing the preferred embodiment of the present invention with alternative drive components;

FIG. 13 is a further enlarged cross-sectional view, taken substantially along the lines 13-13 of FIG. 12, and showing the preferred structure for a tool for use with those alternative drive components;

FIG. 14 is a still further enlarged view of one end of the tool of FIG. 13;

FIG. 15 is a further enlarged cross-sectional view, taken substantially along the lines 15-15 of FIG. 12, depicting some of the alternative drive components, and showing the upper air deflection element in the fully retracted position;

FIG. 16 is an enlarged cross-sectional view, taken substantially along the lines 16-16 of FIG. 15;

FIG. 17 is a further enlarged side view, partially in cross-section, taken substantially along the lines 17-17 of FIG. 16, of some of the alternative drive components of FIGS. 15 and 16, shown in an engaged position;

FIG. 18 is cross-sectional view, taken substantially along the lines 18-18 of FIG. 17;

FIG. 19 is a view similar to that of FIG. 17, showing the same alternative drive components in a disengaged position;

FIG. 20 is a cross-sectional view, taken substantially along the lines 20-20 of FIG. 19;

FIG. 21 is an enlarged cross-sectional view similar to that of FIG. 15, showing the upper air deflection element of FIG. 12 being moved into a deployed position using the tool to manipulate the alternate drive components;

FIG. 30 is an enlarged cross-sectional view similar to that of FIG. 29, showing the upper air deflection element of FIGS. 26-28 in a deployed position;

FIG. 31 is a still further enlarged cross-sectional view, taken substantially along the lines 31-31 of FIG. 30;

FIG. 32 is an enlarged cross-sectional view similar to FIG. 29, showing the embodiment of FIGS. 26-31 with alternative drive components, and showing the upper air deflection element in the fully retracted position;

FIG. 33 is a further enlarged cross-sectional view, taken substantially along the lines 33-33 of FIG. 32, showing some of the drive components of the embodiment of FIG. 32 when the air deflection element is in the retracted position of FIG. 32;

FIG. 34 is an enlarged cross-sectional view similar to that of FIG. 32, showing the upper air deflection element in a deployed position;

FIG. 35 is a further enlarged cross-sectional view, taken substantially along the lines 35-35 of FIG. 34, showing the configuration of some of the drive components of the embodiment of FIG. 32 when the air deflection element is in the deployed position of FIG. 34;

FIG. 36 is a still further enlarged cross-sectional view similar to FIG. 31, but taken substantially along the lines 36-36 of FIG. 35;

FIG. 37 is further enlarged cross-sectional view of a portion of the air deflection element of FIGS. 29 and 32, showing an alternate structure for the trailing edge thereof;

FIG. 38 is a further enlarged cross-sectional view similar to FIG. 37, showing a portion of the air deflection element of FIGS. 30 and 34, and showing yet another alternate structure for the trailing edge thereof;

FIG. 39 is a diagrammatic view, illustrating different dimensions for the air deflection elements of the present invention;

FIG. 40 is a perspective view, showing the underside of a typical air deflection element of the present invention;

FIG. 41 is a perspective view similar to FIG. 40, showing the underside of the air deflection element carrying optional electrical heating elements;

FIG. 42 is an enlarged cross-sectional view, taken substantially along the lines 42-42 of FIG. 41;

FIG. 43 is an enlarged cross-sectional view showing an optional variation of the embodiment of FIG. 30, allowing a "reverse angle" deployment of the upper air deflection element;

FIG. 44 is a further enlarged cross-sectional view similar to FIGS. 31 and 36, but taken substantially along the lines 44-44 of FIG. 43;

FIG. 47 is a plan view, showing a third preferred embodiment of the retractable air deflection apparatus of the present invention, depicting the elongating member of the upper air deflection element in its fully retracted position;

FIG. 48 is a cross-sectional view, taken substantially along the lines 48-48 of FIG. 47;

FIG. 49 is a cross-sectional view, taken substantially along the lines 49-49 of FIG. 47;

FIG. 50 is an enlarged cross-sectional view, taken substantially along the lines 50-50 of FIG. 49;

FIG. 53 is a schematic view, showing the elongating member of the air deflection element of FIG. 49 in a deployed position;

FIG. 54 is a schematic view similar to FIG. 53, showing the elongating member of the air deflection element of FIG. 49 in another deployed position;

FIG. 62 is a further enlarged cross-sectional view, taken substantially along the lines 62-62 of FIG. 60, showing the configuration of the drive components for the lower air deflection element of FIG. 60 when that element is in the fully retracted position;

FIG. 63 is a still further enlarged cross-sectional view, taken substantially along the lines 63-63 of FIG. 62;

DETAILED DESCRIPTION OF THE PREFERRED EMBODIMENTS

Figure 3A:
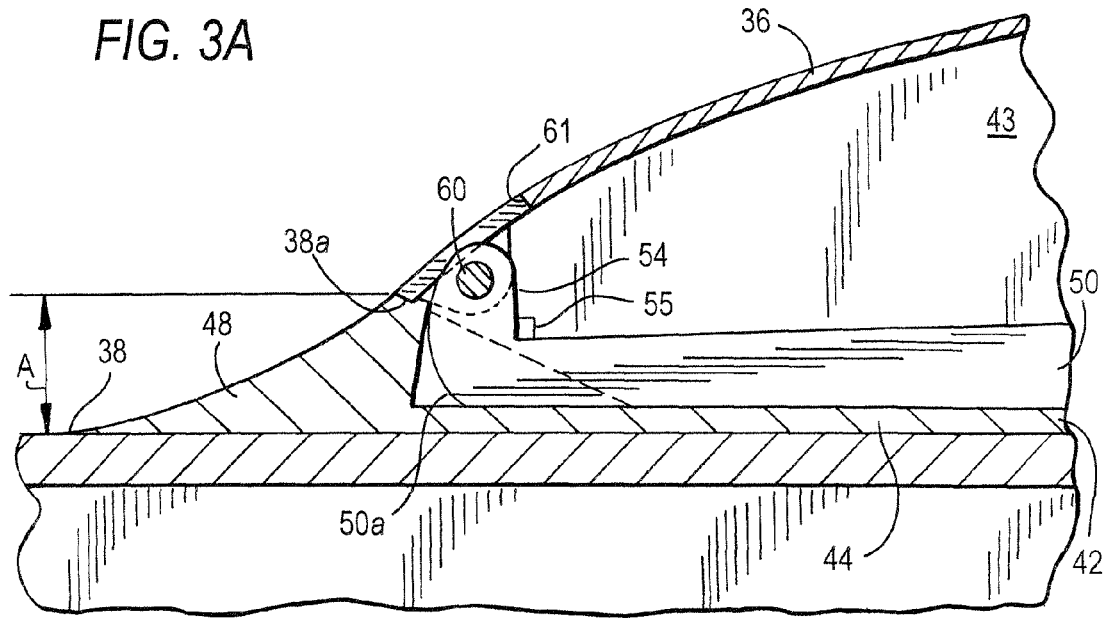
FIG. 3A is further enlarged cross-sectional view of the leading edge portion of the air deflection element of FIG. 3.

The preferred embodiments of the present invention will now be further described with reference to the accompanying drawings, wherein like reference numerals designate like or corresponding parts throughout the several views. The most preferred embodiment of the invention is illustrated in FIGS. 1-11A, and referring initially to FIGS. 1 and 2, which depict a representative vehicular environment in which the apparatus of the invention might be used, a retractable air deflection apparatus in accordance with the present invention is generally designated 10.

The illustrative vehicular environment for the invention comprises a typical 5-axle, 18-wheel tractor-trailer 12, having a tractor or cab 14 and an attached trailer 16. As is conventional in the transportation industry, trailer 16 encloses a volume that is fundamentally a rectangular parallelopiped, and trailer 16 is therefore similarly shaped (that shape may also be characterized herein as "box-shaped" or "squared off"), having an upper surface 18, a left side surface 20, a right side surface (not shown in the drawings), a front-facing surface (also not shown in the drawings), a rear-facing surface 22 having an opening that is closed by a pair of slightly recessed, hinged, swinging rear cargo doors 24, 26 for access to the interior of trailer 16, an upper trailing corner edge 28, a left side trailing corner edge 30, a right side trailing corner edge 32, a lower trailing corner edge 34. Trailer 16 also has a plurality of electrically-energized marker lights 35 located at various positions on rear-facing surface 22, several of which are customarily aligned transversely across the upper portion of rear-facing surface 22, substantially parallel to and just below the upper trailing corner edge 28 of trailer 16, and above the cargo doors 24, 26, as shown illustratively in FIGS. 1 and 2.

Air deflection apparatus 10 comprises at least one, preferably a plurality, and most preferably at least three, air deflection elements 36, each of which is preferably fabricated of aircraft grade aluminum ranging in thickness from $\frac{1}{8}$" to $\frac{3}{16}$", although other materials which are also opaque, such as other metals, plastics, composites and/or materials fabricated from or with the synthetic fibers marketed by E. I. du Pont de Nemours and Company, of Wilmington, Del., U.S.A. under the trademark KEVLAR, may be appropriate as well. However, if it is desired to fabricate the air deflection elements of a transparent material, then any appropriate transparent material including an acrylic plastic material or a UV-stabilized, synthetic polycarbonate resinous sheet material, such as that marketed by General Electric Company of Schenectady, N.Y., U.S.A. and/or Pittsfield, Mass., U.S.A. under the trademark LEXAN, may be used instead, although in such case the polycarbonate sheet material will preferably be no less than $\frac{3}{16}$" thick and no greater than $\frac{1}{4}$" thick.

FIGS. 1 and 2 illustrate the most preferred embodiment of the invention, in which one air deflection element 36a is installed transversely across the upper surface 18 of trailer 16, adjacent and substantially parallel to the upper trailing corner edge 28 and preferably extending horizontally across the entire width of trailer 16, substantially from corner to corner, and two air deflection elements 36b and 36c are installed vertically, on the left side surface 20 of trailer 16, adjacent and substantially parallel to the left side trailing corner edge 30, and on the right side surface, adjacent and substantially parallel to the opposite, right side trailing corner edge 32, respectively, with these two air deflection elements extending vertically and preferably spanning the overall height of the vehicle, also substantially from corner to corner.

Thus, for a typical long-haul vehicle such as the tractor-trailer 12 depicted in FIGS. 1 and 2, having a trailer 16 that ranges in width from about eight feet to about nine feet and ranges in internal height from about seven feet, six inches to about ten feet, air deflection element 36a will preferably have a transverse or lengthwise dimension ranging from about eight feet to about nine feet, while air deflection elements 36b and 36c will both preferably have a lengthwise dimension (vertical, in these cases) ranging from about seven feet, six inches to about ten feet. However, it is to be understood that the two side air deflection elements 36b and 36c will not only be substantially identical to one another but except for their lengths will be substantially identical to upper air deflection element 36a as well. Thus, it will be evident to those skilled in the art that much of what is described hereinafter with respect to upper air deflection element 36a will apply as well, mutatis mutandis, to left side air deflection element 36b and to right side air deflection element 36c.

Since the air deflection elements of the present invention are not intended to provide lift (as with an aircraft wing) or thrust (as with a propeller, the blades of which often have wing-like shapes in cross-section), but are intended instead to divert and vector the airflow along the top and sides of a box-shaped, moving body with which they are in very close proximity, much of the conventional research and analysis that has contributed to the well-developed compendium of knowledge constituting the modern art of wing and/or "airfoil" design is irrelevant to the design of the air deflection elements for use with this invention. Nevertheless, some of the terminology normally associated with simple wing geometry is also useful in describing the shape of the air deflection elements preferred for use with the invention.

Figure 8:
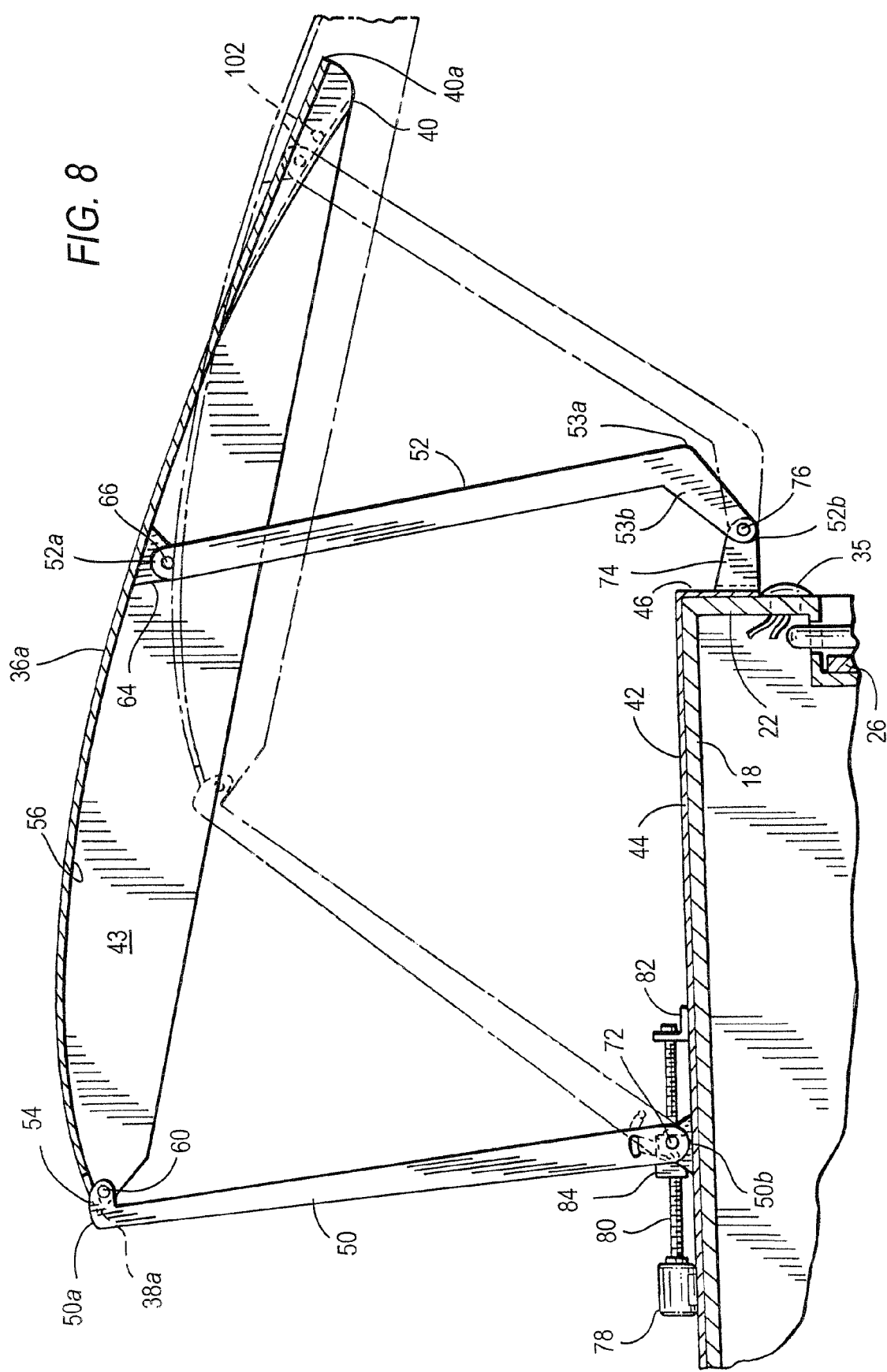
FIG. 8 is an enlarged cross-sectional view similar to that of FIG. 3, showing the upper air deflection element of FIG. 1 in a deployed position.
Figure 11:
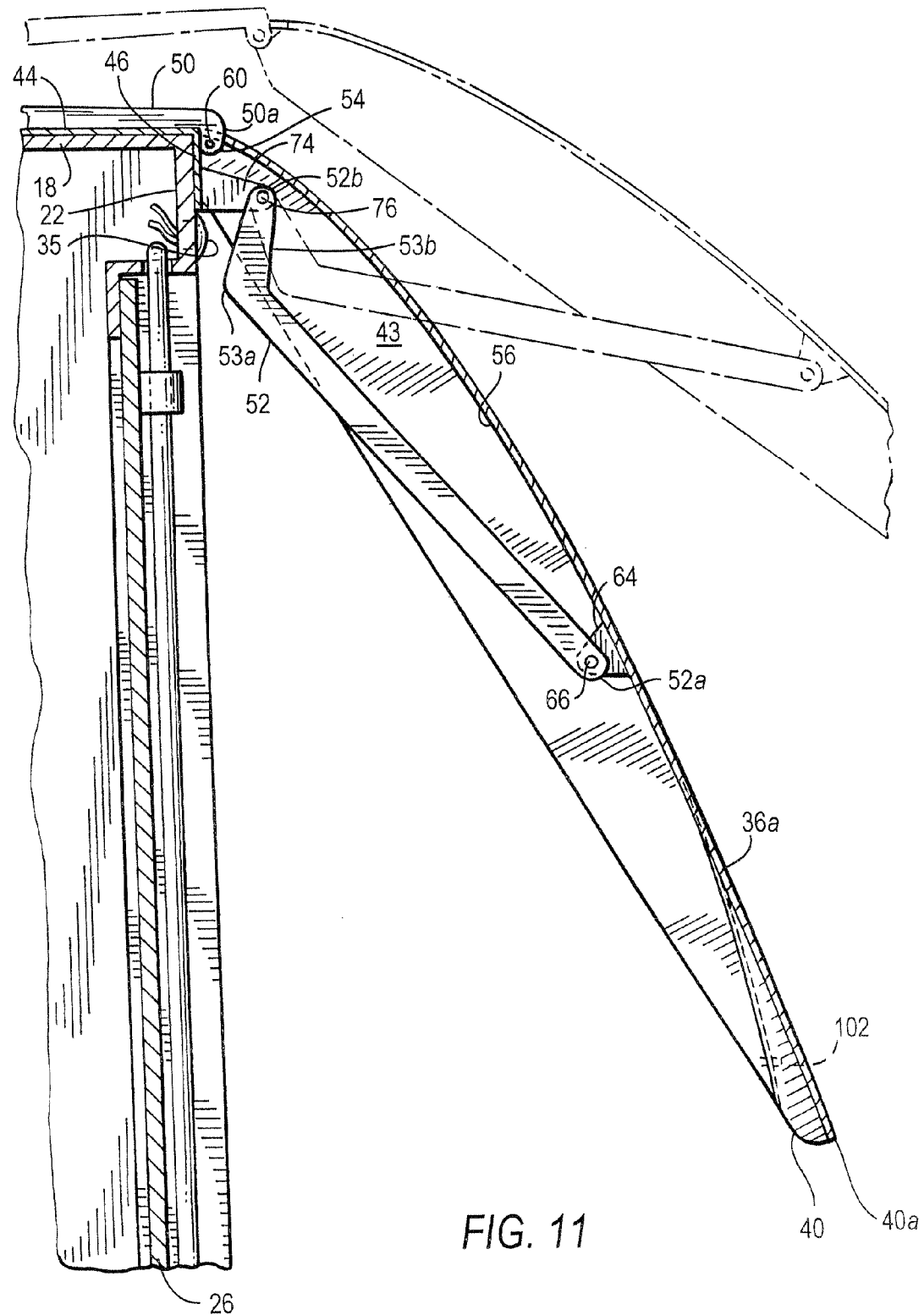
FIG. 11 is an enlarged cross-sectional view similar to that of FIGS. 3 and 8, showing the upper air deflection element of FIG. 1 in the fully extended deployed position.

Referring now to FIGS. 3-11A in addition to the aforementioned FIGS. 1 and 2, each air deflection element 36 has a shape that is "non-symmetric" as that term is understood in the airfoil art, in that the upper and lower surfaces are not identical "mirror-images" of one another; in fact, when the air deflection elements of the present invention are considered as airfoils, the lower surface of the airfoil is preferably located above, rather than below, the chord of the airfoil, and the lower surface may sometimes even share the same curvature as the upper surface, as is illustrated in the drawings with respect to upper air deflection element 36a in the cross-sectional views of FIGS. 3, 8 and 11.

The optimum shape, i.e., the exact mathematical specifications for the optimum geometry, of an air deflection element that may be utilized in the present invention will vary depending upon the size and shape of the vehicle on which it is mounted, and therefore, wind tunnel testing may be required in order to determine a range of those specifications with precision for each different class of vehicle with which the invention will be used (the optimum shape will vary depending on environmental factors as well, but since the latter generally do not remain constant for long periods of time, and can change rapidly, and since it would be time-consuming, cumbersome and impractical, once air deflection elements having a particular shape are installed on a particular vehicle, to interchange them with air deflection elements having a different shape, so as to utilize the optimum shape as each different set of environmental conditions is encountered, these environmental factors must essentially be ignored when determining the optimum air deflection element shapes for different classes of vehicles).

Nevertheless, the air deflection elements of the present invention will have a number of common characteristics which can be described here, regardless of the class of vehicle with which they are used. For example, each air deflection element 36 comprises a leading edge 38 and a trailing edge 40, and each air deflection element is dimensioned to extend widthwise, from its leading edge to its trailing edge (i.e., along its chord, when considered as an airfoil), for a distance which is dependent on the length of the box-shaped portion of the vehicle on which it is mounted, and which typically ranges from approximately one percent to approximately five percent thereof, more preferably from approximately two percent to approximately four percent thereof, and most preferably approximately three percent, thereof. Thus, for a typical long-haul vehicle such as tractor-trailer 12, having a trailer with an overall length of approximately fifty-three feet (as measured from its front-facing surface to its rear-facing surface 22), each air deflection element 36 will preferably measure between one and two feet, from its leading edge 38 to its trailing edge 40; most preferably, each air deflection element 36 will be approximately eighteen inches wide.

Aside from their non-symmetric design and their chord lengths, the air deflection elements for use with the present invention will have other characteristics in common, although these characteristics are not illustrated in the drawings. For example, unless the air deflection element has a constant thickness, the curvature of the upper surface will typically be somewhat greater than the curvature of the lower surface, and therefore, although the thickness of each air deflection element (the distance between its upper surface and its lower surface) will normally be relatively small, that thickness will not be constant at all points along the air deflection element (from its leading edge to its trailing edge). In addition, the maximum camber (expressed as a percentage of the chord length) will typically range from approximately four percent to approximately ten percent, while the position of the maximum camber (also expressed as a percentage of the chord length) will typically range from approximately twenty-five percent to approximately fifty percent. Furthermore, the maximum thickness (again expressed as a percentage of the chord length) will typically range from approximately three-tenths of one percent to approximately six percent, while the position of the maximum thickness (expressed yet again as a percentage of the chord length) will typically range from approximately twenty-five percent to approximately ninety percent. Moreover, rather than a conventional curved leading edge that can be mathematically defined by a radius of curvature, each air deflection element will have a relatively "flat" or "smooth" leading edge that is flush with the vehicle body when the air deflection element is completely retracted; this structure minimizes the disruption of the airflow and reduces turbulence at the leading edge. Finally, the trailing edge of the air deflection element may also optionally have a reflex extension (which will be described in further detail hereinafter).

The foregoing common characteristics will, when taken together, define a group or "family" of air deflection element shapes that will be acceptable for use with this most preferred embodiment of the present invention. The shape of the air deflection element illustrated in FIGS. 3-11A of the drawings falls within that family, but it is to be understood that many other shapes would satisfy the criteria expressed above and would also be acceptable for use with the present invention. In general, airfoil shapes are often symbolized by "NACA" numbers (which were devised during the twentieth century by the National Advisory Committee for Aeronautics, a precursor of the National Aeronautics and Space Administration, in order to represent aircraft wing shapes), and the "modified" four-digit NACA numbers (also known as the $NACA_{4\text{-}2}$ numbers) which correspond to the shape illustrated in FIGS. 3-11A (when the air deflection element is considered as an airfoil) are 9401-01 and/or 9401-11, although it is to be understood that due to their inherent imprecision, each such NACA number actually corresponds to a range or "sub-family" of airfoil shapes. Those of ordinary skill in the art will also appreciate that since, as set forth above, the preferred width (from leading edge to trailing edge) of each air deflection element for use with the present invention will vary depending on the length of the box-shaped portion of the vehicle on which it is mounted, the NACA number (the various components of which are expressed as percentages of the chord length) therefore may not remain constant from one vehicular environment to another, even if essentially the same geometry is being utilized in both of those vehicular environments.

The following modified four-digit NACA numbers correspond to other exemplary air deflection element shapes that will be acceptable for use in this most preferred embodiment of the present invention: 4402-08, 4402-18, 5404-04, 5404-14, 7404-04, 7404-14, 8403-04, 8403-14, 8405-04 and 8405-14. It will be understood by those skilled in the art, however, that unlike the shape illustrated in FIGS. 3-11A, which is formed from, and the thickness of which corresponds to the thickness of, a single sheet or "skin" of the fabricating material (aircraft aluminum or one of the synthetic materials mentioned above), with the thickness remaining constant from just behind its leading edge all the way to its trailing edge, the NACA numbers set forth in the previous sentence represent airfoil shapes in which that thickness does not remain constant, i.e., the inner surface has a curvature that is different from the curvature of the outer surface. In such cases, the air deflection element may either be manufactured from two separate segments or "skins" of the fabricating material, which are independently shaped and are then joined to form an air deflection element that has an inner wall, an outer wall, and a generally hollow interior, an example of which will be described hereinafter, or it may be manufactured from a single piece of the fabricating material which is shaped so as to form surfaces with differing curvatures, resulting an air deflection element of varying thickness but with a solid interior (not shown in the drawings).

Referring once again to the drawings, each air deflection element 36 preferably also comprises end walls 43, and although the air deflection elements 36 may be coupled directly to the vehicle body, via a plurality of pivotable, arm-like support struts (as will be described in further detail hereinafter), each air deflection element 36 is preferably associated with a stationary mounting plate 42 (as shown best in FIG. 3) to which those struts are coupled. Mounting plate 42 is also preferably fabricated of aircraft grade aluminum, and comprises a flat base portion 44, a tail portion 46 disposed at a right angle to the base portion 44, and as shown best in FIG. 3A, a curved nose portion 48.

The span of nose portion 48, as represented by the double-headed arrow A in FIG. 3A, is preferably chosen so that its rear edge is disposed adjacent to and meets with the forward edge 38a of air deflection element 36, when the latter is in the fully retracted position shown in FIGS. 3 and 3A, such that nose portion 48 essentially becomes an integral part of air deflection element 36, with nose portion 48 forming the leading edge 38 of air deflection element 36 and "completing" its shape. However, when air deflection element 36 is deployed, nose portion 48 of mounting plate 42 does not deploy with it, and instead remains in place as an extension of the vehicle body, functioning as an air-deflecting wind dam.

Figure 3C:
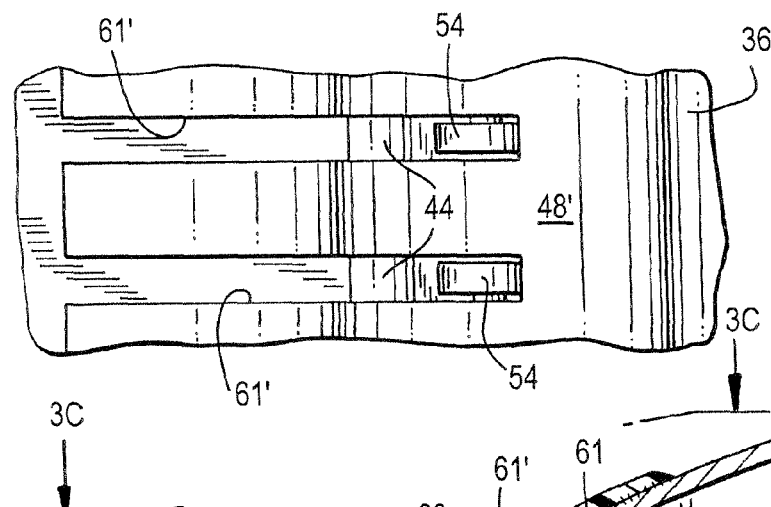
FIG. 3C is a cross-sectional view, taken substantially along the lines 3C-3C of FIG. 3B.
Figure 3B:
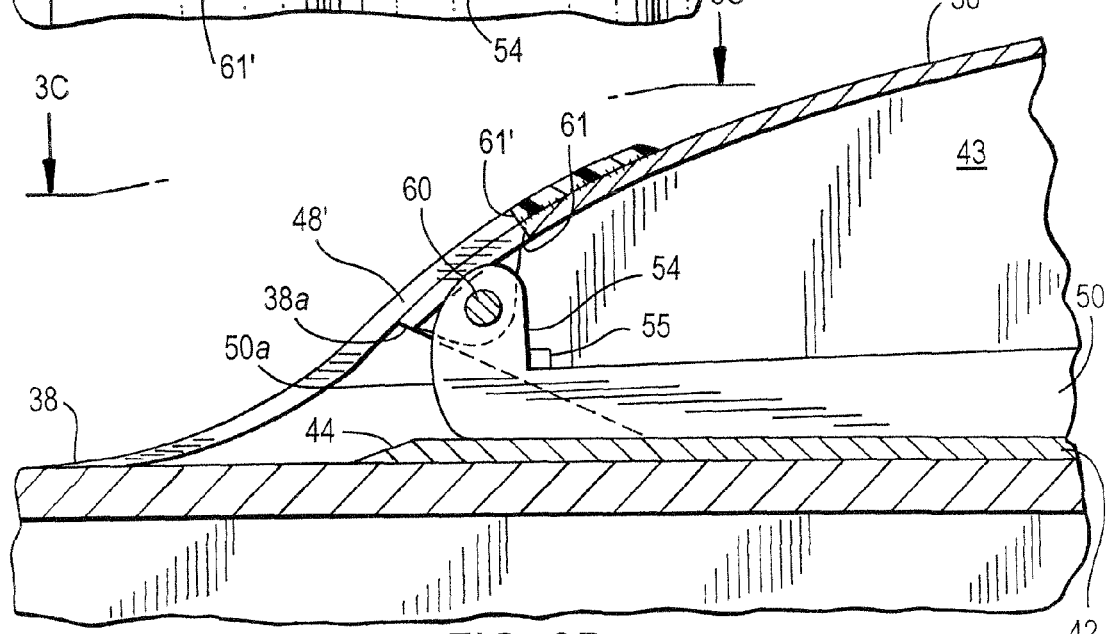
FIG. 3B is a cross-sectional view similar to that of FIG. 3A, but showing an alternate structure for the leading edge portion of the air deflection element of FIG. 3.

Alternatively, however, as shown in FIGS. 3B and 3C, mounting plate 42 may be formed without a nose portion 48, and air deflection element 36 may instead be provided with an flexible, tapering extension 48'. Preferably, extension 48' is fabricated of the synthetic fibers marketed by E.I. du Pont de Nemours and Company of Wilmington, Del., U.S.A. under the trademark KEVLAR, although other materials having similar characteristics may be used instead. Extension 48' preferably overlaps, and is attached in a permanent fashion to, the forward portion of air deflection element 36 and thereby forms its leading edge 38. As shown in FIG. 3B, extension 48' may be affixed to air deflection element 36 via adhesive, and as will be apparent to those skilled in the art, extension 48' remains a part of air deflection element 36, and deploys with it.

Base portion 44 and tail portion 46 of mounting plate 42 are disposed adjacent and flush to the vehicle body, and may be affixed to the vehicle body in any secure fashion (not shown) that is well known to those skilled in the art. Although the mounting plate 42 may be affixed to the vehicle body in a permanent fashion, more preferably it will be removable, either so as to allow air deflection apparatus 10 to be "shared" among different active vehicles of the same size (e.g., in a "drop and swap" trailer environment), or so as to allow air deflection apparatus 10 to continue to be used on a newer vehicle when the older vehicle on which it was initially installed goes out of service, in either case thereby maximizing the useful life of air deflection apparatus 10.

For purposes of illustration, FIG. 3 shows the mounting plate 42 associated with upper air deflection element 36a. There, the base portion 44 of mounting plate 42 is shown flush with, and as affixed to, the upper surface 18 of trailer 16. However, it is to be understood that the two side air deflection elements 36b and 36c may each be associated with a similar mounting plate 42, which comprises a flat base portion 44, a tail portion 46 disposed at a right angle to the base portion 44 and a curved nose portion 48, and that the base portions 44 of the mounting plates 42 associated with the left side air deflection element 36b and associated with the right side air deflection element 36c are positioned flush with, and are affixed respectively to, the left side surface 20 of trailer 16 and the right side surface of trailer 16, in a similar secure, but preferably removable, fashion.

Each air deflection element 36 preferably is supported, and is also coupled, either to the vehicle body itself, or to a mounting plate 42 (and thereby to the vehicle body), but in any event not to the vehicle's rear cargo doors, by a plurality of pivotable, arm-like struts, referred to hereinafter as "pivot arms," which preferably are also fabricated of aircraft grade aluminum, and which preferably allow air deflection element 36 to be displaced (as will be described hereinafter) between a retracted position and at least one air flow diverting, deployed position, but which most preferably allow the position of air deflection element 36 to vary over a continuous range of positions, from a fully retracted position (as shown in FIG. 3), through a number of deployed positions (an illustrative two of which are shown in FIG. 8, one in solid lines and one in phantom lines, and an illustrative one of which is shown in phantom lines in FIG. 11), to a fully-extended deployed position (as shown in solid lines in FIG. 11).

Each air deflection element 36 is supported by a plurality of leading or front pivot arms 50, as well as by a plurality of trailing or rear pivot arms 52, each front pivot arm 50 having a distal end 50a and a proximal end 50b, and each rear pivot arm 52 having a distal end 52a and a proximal end 52b. The number of front pivot arms 50 will vary depending upon the stresses to which the air deflection element is expected to be subjected, although for almost all situations, a total of four front pivot arms 50, preferably disposed along the longitudinal extent of each air deflection element 36, symmetrically on either side of the imaginary center line (not shown in the drawings) of that air deflection element, will be sufficient to provide the necessary stability, and most preferably with an inner pair of those front pivot arms 50 being clustered more closely together, adjacent to and on either side of that center line, for linkage with drive components (to be described hereinafter) that are positioned substantially along that center line, in between that pair of front pivot arms, as shown most clearly in FIG. 4; that inner pair of front pivot arms will hereinafter sometimes be referred to as the driven pair of front pivot arms.

The number of rear pivot arms 52, will vary depending upon the size of the vehicle body on which the air deflection elements are mounted. For larger and/or taller vehicles, of which the long-haul tractor-trailer 12 depicted in FIG. 1 is representative, preferably there are a total of four rear pivot arms 52 which are substantially equally spaced along the longitudinal extent of each air deflection element 36, and most preferably with an inner pair of those rear pivot arms 52 being clustered more closely together, adjacent to and on either side of the imaginary center line of that air deflection element, as shown most clearly in FIG. 4; that inner pair of rear pivot arms will hereinafter sometimes be referred to as the central pair of rear pivot arms. For smaller or shorter vehicles, such as medium-haul box trucks, a total of only three rear pivot arms will normally suffice to provide the needed support, and for even smaller and/or shorter vehicles, such as short-haul vans and panel trucks, a total of only two rear pivot arms 52 will typically suffice, but in all of these cases the rear pivot arms will similarly be disposed along the longitudinal extent of each air deflection element 36, symmetrically on either side of the imaginary center line of the air deflection element.

Each front pivot arm 50 may be coupled by any suitable means to air deflection element 36 at a point near its forward edge 38a. Illustratively, as shown best in FIG. 8, at distal end 50a each front pivot arm 50 carries a projection 54, while the under surface 56 of air deflection element 36 carries an associated leading projection, preferably comprising an angle bracket 58; the projection 54 and the angle bracket 58 are pierced, and each projection 54 is rotatably coupled to an associated angle bracket 58 in a conventional fashion via a hinge pin 60. As shown best in FIGS. 3A and 3B, each projection 54 is oriented orthogonally to the longitudinal axis of its respective front pivot arm 50, such that substantially a right or ninety-degree angle 55 is formed, and as shown most clearly in FIG. 8, each front pivot arm also 50 tapers, i.e., narrows slightly in height, along its longitudinal axis, from proximal end 50b towards distal end 50a and projection 54. In addition, as shown in FIG. 3A, each air deflection element 36 is provided, near its forward edge 38a, with a plurality of slot-like openings 61, each opening 61 accommodating the projection 54 on one of the front pivot arms 50 when the air deflection element 36 is in the fully retracted position, as depicted in FIG. 3 for upper air deflection element 36a; similarly, in the alternative structure depicted in FIGS. 3B and 3C, the extension 48' on each air deflection element 36 is provided with a plurality of slot-like openings 61', each opening 61' accommodating the projection 54 on one of the front pivot arms 50 when the air deflection element 36 is in the fully retracted position, as depicted in FIG. 3 for upper air deflection element 36a.

Preferably, in order to resist lateral (long axis) flexure of air deflection element 36 between the points of attachment of all of the front pivot arms 50, a portion 62 of air deflection element 36 that surrounds each point of attachment, and that extends longitudinally along the air deflection element so as to encompass all of those points of attachment, will be reinforced. The reinforcement must be strong enough to allow the moving force transmitted to air deflection element 36 by the driven front pivot arms, via their points of attachment, in the manner to be described hereinafter, to be distributed longitudinally to the other (non-driven) front pivot arms via their respective points of attachment, especially when the air deflection element 36 is being displaced from a deployed position towards the fully retracted position while the vehicle is moving. Most preferably, this reinforcement will comprise a stiffening ridge of aircraft aluminum (not shown), positioned on the under surface 56 of air deflection element 36.

Each rear pivot arm 52 may be coupled by any suitable means to air deflection element 36 at a point approximately midway between the forward edge 38a and the trailing edge 40 of the air deflection element. Illustratively, as shown best in FIG. 3, each rear pivot arm 52 is pierced adjacent its distal end 52a, while the under surface 56 of air deflection element 36 carries an associated trailing projection, preferably comprising an angle bracket 64, which is also pierced and which is rotatably coupled to rear pivot arm 52 adjacent distal end 52a in a conventional fashion via a hinge pin 66.

Preferably, in order to resist lateral (long axis) flexure of air deflection element 36 between the points of attachment of all of the rear pivot arms 52, a portion 68 of air deflection element 36 that surrounds each point of attachment, and that extends longitudinally along the air deflection element so as to encompass all of those points of attachment, will be reinforced as well. Most preferably, this reinforcement will comprise a plurality of stiffening ridges of aircraft aluminum (not shown), positioned on the under surface 56 of air deflection element 36, and will extend laterally (i.e., toward the leading edge 38 and toward the trailing edge 40) for several inches surrounding each point of attachment.

The front pivot arms 50 and the rear pivot arms 52 may also be coupled, at their respective proximal ends, to mounting plate 42 (and thereby to the vehicle body) by any suitable means. Illustratively, as shown best in FIGS. 3-5 and 8, at proximal end 50b each front pivot arm 50 is pierced, while the base portion 44 of mounting plate 42 is provided with a plurality of projecting angle brackets 70, each of which is also pierced and is rotatably coupled in a conventional fashion via a hinge pin 72 to an associated front pivot arm 50 adjacent its proximal end 50b. Similarly, at proximal end 52b each rear pivot arm 52 is pierced, while the tail portion 46 of mounting plate 42 is provided with a plurality of rearwardly projecting angle brackets 74, each of which is also pierced and is rotatably coupled in a conventional fashion via a hinge pin 76 to an associated rear pivot arm 52 adjacent its proximal end 52b. However, the trailing portion of each rear pivot arm 52 preferably forms an elbow 53a resulting in an angled tail segment 53b which, as shown best in FIGS. 3, 8 and 11, and particularly in FIG. 11A, encompasses proximal end 52b; pivot arm 52 tapers, i.e., narrows in height, along tail segment 53b towards proximal end 52b.

When the air deflection elements 36 are in the fully retracted position, the trailing edge 40 of each air deflection element 36 is located adjacent to, and abuts, the associated trailing edge of the vehicle; thus, as shown best in FIG. 3 for upper air deflection element 36a, the trailing edge 40 is adjacent to and abuts upper trailing corner edge 28 of trailer 16. However, as shown best in FIG. 4 for upper air deflection element 36a, in order to accommodate the rear pivot arms 52 when the air deflection elements 36 are in their fully retracted positions, each air deflection element 36 is illustratively provided along its trailing edge 40 with a plurality of pairs of slits 75 in the vicinity of the rear pivot arms 52, the pair of slits 75 shown in FIG. 4 defining therebetween an elevated portion 77 along the trailing edge 40 of air deflection element 36 that will overlie the trailing portions of the central pair of rear pivot arms 52 when the air deflection element 36 is in the fully retracted position, each elevated portion 77 having a trailing edge 40a which is parallel to, but which is displaced outwardly a small distance from, the trailing edge 40, as shown in FIGS. 3, 8 and 11. It is to be understood, however, that in the case of a larger, long-haul vehicle with more than two rear pivot arms 52, each air deflection element 36 will be provided with a similar pair of slits in the vicinity of each outer rear pivot arm, on either side thereof, that each such other pair of such slits will define therebetween a similar but narrower elevated portion along the trailing edge of each air deflection element, and that such elevated portion will similarly overlie each such outer rear pivot arm.

Air deflection apparatus 10 further comprises drive components with which the air deflection elements may be deployed and retracted, and caused to assume differing positions of deployment; the drive components may be operated either manually or with powered assistance, and in the latter case, the drive components may even be remotely controlled, e.g., by the driver from the cab 14 of the vehicle, as will be described in further detail hereinafter, and the drive components can be hydraulically, pneumatically or electro-mechanically driven. The most preferred embodiment of the invention is illustrated in FIGS. 1-11A as including electro-mechanical drive components that are remotely controlled, although it should be understood that alternative implementations utilizing drive components that are hydraulically or pneumatically driven are well within the skill of the art.

As shown best in FIG. 4, the illustrative electro-mechanical drive components are preferably situated on the base portion 44 of each mounting plate 42, and as mentioned hereinbefore, are preferably positioned substantially along the imaginary center line of each air deflection element 36, oriented along the direction of travel of the vehicle, and situated in between the driven pair of front pivot arms 50. As shown best in FIGS. 3 and 5-10, the illustrative electro-mechanical drive components preferably comprise, for each air deflection element 36, a reversible drive motor 78 adapted to impart rotational motion to a threaded spindle 80, which extends from the drive shaft (not shown) of drive motor 78, and which, at its other end distal from drive motor 78, is journaled for rotation in an angle bracket 82. The drive components also comprise a drive block 84, adapted for movement along spindle 80 via an internally threaded bore 86 adapted to accept and to allow rotation of spindle 80, with the drive block 84 also carrying a pair of drive pegs 88, oriented orthogonally to bore 84, and which may be formed integrally with drive block 84.

The drive components further comprise a pair of elongated cam links 90, each having a distal end 90*a* and a proximal end 90*b*, and in each of which a first aperture 92 is formed adjacent the proximal end 90*b* thereof, the first aperture 92 being adapted to receive, and to allow the cam link 90 to rotate about, one of the drive pegs 88 of drive block 84; a second aperture 94 is formed adjacent the distal end 90*a* of each cam link 90, the second aperture 94 being adapted to receive and to bear on a drive post 96 (shown best in FIG. 7). Drive post 96 extends along its longitudinal axis through the apertures 94 and towards the driven pair of front pivot arms 50, with the ends of post 96 adapted to engage elongated slots 98 located in each one of the pair of driven front pivot arms 50, in the vicinity of their respective proximal ends 50*b*.

FIG. 5 depicts the configuration of the aforementioned drive components when the associated air deflection element is in the fully retracted position, which position is illustrated, for upper air deflection element 36*a*, in FIG. 3. When drive motor 78 is energized by a control unit (not shown in the drawings), the spindle 80 rotates, which causes drive block 84 to begin moving towards the rear of the vehicle (to the right as shown in the drawings), sliding along base portion 44 of mounting plate 42. As shown best by comparing the positions of the drive components as depicted in FIG. 5 with their positions as depicted in solid lines in FIG. 9, this motion causes pegs 88 to exert a force on cam links 90, such that the latter begin to rotate about the former (in a counterclockwise fashion, from the perspective shown in the drawings), thus constraining the distal end 90*a* of each cam link 90 to describe an arc (initially moving away from the vehicle body), and through the action of drive post 96, compelling the associated driven front pivot arm 50 in turn to move in the direction shown by the arrow B in FIG. 9. This motion of the driven front pivot arms 50 causes the associated air deflection element 36 to begin to move away from the vehicle body and towards the rear of the vehicle, illustratively to a first deployed position as depicted in solid lines in FIG. 8 for upper air deflection element 36*a*.

As drive motor 78 is caused to continue to impart rotational motion to spindle 80, drive block 84 is caused to move further towards the rear of the vehicle, illustratively to the position shown in phantom lines in FIG. 9, constraining the other electro-mechanical drive components to continue to move as well, each in the manner described above, except that the continued movement of the distal ends 90*a* of cam links 90 in the same arc-like fashion begins to draw those distal ends back towards the vehicle body, compelling drive post 96 to slide from one end of slot 98 towards the other, and thereby causing the associated driven front pivot arms 50 to continue to move in the direction indicated by arrow B in FIG. 9. This motion, in turn, causes the associated air deflection element 36 to move further towards the rear of the vehicle, illustratively to a second deployed position, as depicted in phantom lines in FIG. 8 for upper air deflection element 36*a*, and illustratively beyond to yet a third deployed position, as depicted in phantom lines in FIGS. 11 and 11A for upper air deflection element 36*a*.

As the movements described above are caused to continue even further, the electro-mechanical drive components ultimately reach the positions shown in FIG. 10, constraining the associated driven pair of front pivot arms 50 to move in the direction indicated by arrow C in FIG. 10 and ultimately to positions that abut the vehicle body. FIG. 10 depicts the configuration of the aforementioned drive components when the associated air deflection element is in the fully extended deployed position, which position is illustrated, for upper air deflection element 36*a*, in solid lines in FIGS. 11 and 11A. In this fully extended deployed position, the forward edge 38*a* of air deflection element 36 is located adjacent to, and abuts, the associated trailing edge of the vehicle; as shown best in FIG. 11A for upper air deflection element 36*a*, the forward edge 38*a* of which is adjacent to and abuts upper trailing corner edge 28 of trailer 16, with front pivot arms 50 facilitating this position by virtue of the substantially right angle 55 formed between each projection 54 and its associated front pivot arm 50 (mentioned hereinbefore in connection with FIGS. 3A and 3B), which allows each front pivot arm 50 to extend over and to "nest" against the upper trailing corner edge 28 of trailer 16.

As will be evident to those skilled in the art, the movements of the drive components as described above will be reversed when the motor is energized with the opposite rotation, thus ultimately causing the associated air deflection element 36 to begin to move towards the front of the vehicle and towards the vehicle body, i.e., causing retraction of the air deflection element 36 from the fully extended deployed position, illustrated for upper air deflection element 36*a* in solid lines in FIGS. 11 and 11A, through the three deployed positions illustrated for upper air deflection element 36*a* in phantom lines in FIG. 11 and in both phantom and solid lines in FIG. 8, eventually to the fully retracted position, illustrated for upper air deflection element 36*a* in FIG. 3.

While only five discrete positions, i.e., a fully retracted position, three deployed positions, and a fully extended deployed position, have been described thus far (and are depicted in the drawings) for each air deflection element 36, it is to be understood that in the most preferred embodiment, in which the drive components are controlled remotely and are either hydraulically, pneumatically or electro-mechanically driven, it will be possible to deploy the air deflection elements 36 in a multiplicity of positions, along a continuum ranging from the fully retracted position to the fully extended deployed position, and that the degree of deployment at any given time can be chosen as may be deemed advisable by the driver, depending on whether the vehicle is moving, and if so, on the speed at which it is moving, as well as other factors such as ambient wind speed and direction and other weather conditions, in order to optimize the aerodynamic drag reduction that those air deflection elements can provide.

It will be evident from the foregoing description and from the drawings of this most preferred embodiment of the invention that when the vehicle is moving at low speeds, then it is possible, by deploying the air deflection elements 36 only part way (e.g., as shown in solid lines in FIG. 8), to cause most of the airflow originating along the top and sides of the vehicle to be diverted into the area behind the vehicle, by being "ducted" or "scooped" between the air deflection elements 36 and the vehicle body, thus utilizing primarily the inner surface of each air deflection element. On the other hand, when the vehicle is moving at high speeds, then it is possible, by deploying the air deflection elements 36 to their fully extended deployed positions (as shown in solid lines in FIG. 11), to cause most of the airflow originating along the top and sides of the vehicle to be diverted into the area behind the vehicle, by being "bent" over and around the air deflection elements 36, thus utilizing primarily the outer surface of each air deflection element. However, when the vehicle is moving at moderate speeds, then it is possible, by deploying the air deflection elements 36 to intermediate positions (e.g., as shown in phantom lines in FIG. 8, or as shown in phantom lines in FIG. 11), to cause the airflow originating along the top and sides of the vehicle to be diverted into the area behind the vehicle in both ways, thus utilizing both the inner and outer surfaces of each air deflection element 36 simultaneously, with the contribution of each component of the diversion varying, depending upon the extent of deployment. Nevertheless, in all cases, the drag associated with the area of low pressure which develops behind the vehicle is reduced, while at the same time, the drag associated with the breakdown of the laminar air flow along the top and sides of the vehicle is also reduced, and the latter component of the drag is reduced whether the air deflection elements 36 are deployed or remain fully retracted (as shown in FIG. 3).

As mentioned hereinbefore, all of the air deflection elements that comprise air deflection apparatus 10 are preferably displaceable in unison. Thus, in cases in which the apparatus comprises three air deflection elements (as illustrated in the drawings), there will be three reversible drive motors, all of which preferably may be energized simultaneously by a single control unit (not shown), and as will be evident to those skilled in the art, appropriate gears may be built into the drive motors themselves, or appropriate circuitry may be built into the control unit, so as to facilitate actuation of the drive motors for rotation in either direction, i.e., either clockwise or counterclockwise.

The control unit may be connected to any convenient energy source, e.g., the energy may be "tapped" from the existing wiring for the vehicle's electrically-energized marker lights 35. The control unit circuitry also preferably includes an actuator switch (not shown), such as a manual toggle switch which well known in the art and is available commercially from many sources, that is connected to control unit either with hard wiring or wirelessly, and that enables the drive motors to be energized and/or de-energized, for rotation in one direction or the other; such a switch could be situated conveniently on the outside of the vehicle body, at or near the rear of the vehicle, allowing direct visual observation by the vehicle driver (or other user of the apparatus) of the extent to which the air deflection elements have been deployed or retracted as a result of operation of the actuator switch, but more preferably the actuator switch (or even more preferably, a second, identical actuator switch) may be located in the cab of the vehicle for remote actuation of the drive motors by the driver of the vehicle, e.g., in inclement weather, even without direct visual confirmation of the resulting deployment or retraction of the air deflection elements. However, optionally, and still more preferably, sensors are used, as will be described in further detail hereinafter, to provide a remote indication in the cab of the vehicle, of the current positions of each of the air deflection elements, so as to facilitate remote deployment and retraction thereof.

Preferably, the control unit circuitry also includes at least two stop/safety limit switches (not shown in the drawings) adapted to de-energize the drive motors automatically once the fully extended deployed position and/or the fully retracted position is reached, thereby preventing possible damage due to "over-deployment" and/or "over-retraction" of each air deflection element. Such limit switches are available commercially, in a variety of sizes and body styles, with a broad selection of operator types, actuator arms, circuit arrangements and connection options, from a number of manufacturers, such as Rockwell Automation, Inc. of Milwaukee, Wis., U.S.A., which markets a series of such switches under the Allen-Bradley trademark, using the model or grade designation 440P. Although not shown in the drawings, one such limit switch is preferably positioned or mounted on the underside 56 of each air deflection element 36, adjacent the forward edge 38a, and another limit switch is preferably situated on mounting plate 42, disposed over upper trailing corner edge 28 of the vehicle body.

As will be apparent from the drawings, if the air deflection elements 36 are fabricated of an opaque material, then when they are deployed they will sometimes cover or obscure marker lights 35, especially when they are in their fully extended deployed positions, shown illustratively for upper air deflection element 36a in solid lines in FIG. 11. Since travel with such marker lights obscured is prohibited in most jurisdictions for safety reasons, the preferred embodiment of the invention includes, for each air deflection element 36, a plurality of light sources such as light-emitting diodes (or "LEDs") 102, which are positioned adjacent the trailing edge 40 of each air deflection element 36, in an array which preferably reproduces both the number and positions of the vehicle's native marker lights 35, and which may be illuminated, either automatically or manually by the driver of the vehicle, in the same manner in which the vehicle's native marker lights 35 are normally illuminated, thus enabling the air deflection elements 36 to be used under all driving conditions, including those which would ordinarily mandate the use of the vehicle's native marker lights 35 (such as after sundown or before sunrise, or in inclement weather), the LEDs 102 providing at least the same safety illumination for the rear of the vehicle when the air deflection elements 36 are maximally deployed as do the vehicle's native marker lights 35 when the air deflection elements 36 are retracted (or are absent).

Although this feature is illustrated in the drawings most clearly with respect to the LEDs 102 positioned on upper air deflection element 36a, duplicating the marker lights 35 aligned transversely across the upper portion of rear-facing surface 22 of trailer 16, it is to be understood that additional LEDs may be positioned on the trailing edges of both right side air deflection element 36b and left side air deflection element 36c, whether or not those LEDs are intended to duplicate any of the vehicle's native marker lights or other native taillights (e.g., brake lights, back-up lights, directional signal lights, etc.) that may be positioned (perhaps aligned vertically) along the side portions of rear-facing surface 22 of trailer 16, between the left rear cargo door 24 and the left side trailing corner edge 30 of trailer 16, and/or between the right rear cargo door 26 and the right side trailing corner edge 32 of trailer 16.

As mentioned hereinbefore, and turning next to FIGS. 12-22 in addition to the aforementioned FIGS. 1-11A, the preferred embodiment of the invention may, in the alternative, comprise drive components with which the air deflection elements 36 may be deployed and retracted (and caused to assume differing positions of deployment) through manual manipulation, using a tool that is specially designed for that purpose.

As shown best in FIGS. 12 and 16, the illustrative drive components for manual deployment are preferably situated on the base portion 44 of each mounting plate 42, and are preferably positioned substantially along the imaginary center line of each air deflection element 36, oriented along the direction of travel of the vehicle, situated in between, and linked to, the driven pair of front pivot arms 50, in a manner similar to the electro-mechanical drive components described hereinbefore. As best shown in FIGS. 15-21, the alternate drive components for manual deployment illustratively comprise, for each air deflection element 36, a pulley system 110 including a pulley cable 112, having a trailing end 114 and a leading end 116, and enclosing a release cable 118, having a trailing end 120 and a leading end 122. Release cable 118 is slidably disposed coaxially within pulley cable 112, with sufficient clearance therebetween to allow each cable to be moved longitudinally, independently of one another. Release cable 118 may be fabricated of a flexible metal wire or chain, or sturdy rope or twine, or of another natural or synthetic material, as is well known in the art.

Between its trailing end 114 and its leading end 116, pulley cable 112 passes through a plurality of intermediate directional guides 124, and at its trailing end 114, pulley cable 112 terminates at an end guide 126, having an aperture 128 and mounted on an angle bracket 130 having an aperture 132 that is coaxially aligned with aperture 128, so as to allow release cable 118 to pass therethrough and to emerge from pulley cable 112, extending beyond the trailing end 114 thereof. As shown best in FIG. 14, the angle bracket 130 is affixed to the under surface 56 of the associated air deflection element 36, slightly forward of the trailing edge 40a of the raised elevated portion 77 overlying the central pair of rear pivot arms 52, with end guide 126 preferably positioned substantially along the imaginary center line of that air deflection element, such that release cable 118 is accessible and manipulable from the rear of the vehicle, as will be described hereinafter; for this purpose, release cable 118 terminates at its trailing end 120 in an O-ring 134.

At its leading end 116, pulley cable 112 is tethered to an air deflection element position adjustment assembly, generally designated 136. The air deflection element position adjustment assembly 136 illustratively includes a slide unit, generally designated 138 and comprising a carriage 140 which is slidable along a slide bar 142, the carriage 140 including a base member 144 that carries a pair of bracket members 146, a cam 148 that is pivotally attached to the bracket members 146 via a hinge pin 150, and that has a split nose portion 149. The air deflection element position adjustment assembly 136 also includes a spring-loaded lock-pin mechanism, generally designated 152, which is adapted to reciprocate between a locked position, depicted most clearly in FIGS. 17 and 18, and a released or unlocked position, depicted most clearly in FIGS. 19 and 20, in a manner to be described in further detail hereinafter.

Carriage 140 also includes a shaft member 154 oriented orthogonally to the base member 144. At its leading end 116, pulley cable 112 terminates at an end guide 156, having an aperture 158 and mounted on shaft member 154, which has an aperture 160 that is coaxially aligned with aperture 158, so as to allow release cable 118 to pass therethrough and to emerge from pulley cable 112, extending beyond the leading end 116 thereof. Release cable 118, at its leading end 122, terminates at pivot cam 148, to which release cable 118 is attached, illustratively via an eyelet 162, situated in a recess 163, and a hinge pin 163a that is journaled for rotation in eyelet 162.

To facilitate engagement with slide bar 142, slide unit 138 illustratively further comprises extensions 164 depending from carriage 140, which terminate in a pair of feet 166 adapted to slidably engage within respective longitudinal recesses 168 which run along the sides of slide bar 142 for substantially its entire length, as shown best in FIGS. 17-20. Slide bar 142 illustratively further includes a plurality of illustratively circular locking apertures 170, all substantially of the same diameter, provided at regular intervals along the surface of slide bar 142 for substantially its entire length, and positioned substantially along its center line in an aligned fashion, as shown best in FIG. 16. The number of apertures 170 can be chosen to correspond to the number of discrete positions that are desired for manual deployment of the associated air deflection element 36; preferably, as shown in FIG. 16, there are between ten and twenty such apertures 170, although it is to be understood that preferably at least five such apertures should be provided, corresponding substantially to the fully retracted position, the three deployed positions, and the fully extended deployed position for air deflection elements 36 that have been described hereinbefore (and are depicted in the drawings).

As best shown in FIGS. 17-20, the lock-pin mechanism 152 comprises a cross-bar 172 spanning the gap between the sides of the split nose portion 149 of pivot cam 148, and a cap 174 suspended from cross-bar 172, the cap enclosing and being adapted to receive, in threaded engagement, one end of an illustratively cylindrical locking pin 176. The lock-pin mechanism 152 also comprises a spring 178 coiled around a portion of locking pin 176, and disposed between an anchor member 180, that may be formed integrally with cap 174 and through which locking pin 176 slidably extends, as well as a collar member 182 adapted for abutment with slide bar 142, with locking pin 176 extending through collar member 182 and beyond to form a tip 184, the diameter of which is chosen to be slightly greater than that of locking pin 176, but slightly less than the diameter of apertures 170 so that tip 184 can be received in any one of apertures 170. The bias of spring 178 urges locking pin 176 towards slide bar 142, such that tip 184 is urged into locking engagement with one of the apertures 170, as shown best in FIG. 18.

The special tool, that is designed for use with the manual drive components just described, comprises an adjusting pole 186, shown in FIGS. 12-14, which enables substantially simultaneous manipulation not only of the release cable 118, but also the associated air deflection element 36; for this purpose, an illustrative tail-like extension or tongue 188 is provided, which depends from the trailing edge 40a of the raised elevated portion 77 overlying the central pair of rear pivot arms 52 of each air deflection element 36, with an aperture 190 in tongue 188 that is preferably positioned substantially along the imaginary center line of the air deflection element 36. As shown best in FIGS. 13-14, adjusting pole 186 comprises an elongated outer tube 192, which is illustratively cylindrical in shape, having a proximal end 194 and a distal end 196, and a cylindrical cavity or shaft 198 disposed longitudinally within outer tube 192 and substantially coaxially therewith. Shaft 198 has a closed proximal end 200 situated intermediate of the proximal and distal ends 194, 196 of outer tube 192, and shaft 198 has an open distal end 202 situated near the distal end 196 of outer tube 192.

Shaft 198 is adapted to receive an elongated inner rod 204, which is sized so that it may be disposed within shaft 198 with sufficient clearance to allow it to slide longitudinally within outer tube 192. Inner rod 204 has a proximal end 206, at which an enlarged stop element 207 is disposed, and a distal end 208 at which a conventional curved hook element 210 is disposed so as to protrude from the open distal end 202 of shaft 198. A similar hook element 212, which is also curved but which is slightly more squared off than hook element 210, is disposed at the distal end 196 of outer tube 192, on an extension 214, and carries a knob 216. Curved hook element 210 is adapted for engagement with the O-ring 134 at the trailing end 120 of release cable 118, while knobbed hook element 212 is adapted for engagement with the aperture 190 in tongue 188 of air deflection element 36. Extension 216 is slightly offset from the longitudinal axis of outer tube 192, as a result of which curved hook element 210 and knobbed hook element 212 are positioned in a parallel but slightly offset relation, with knobbed hook element 212 disposed slightly above curved hook element 210, this orientation and spacing enabling curved hook element 210 to engage with O-ring 134 while knobbed hook element 212 simultaneously engages with aperture 190, as shown best in FIGS. 13 and 14.

The proximal end 206 of inner rod 204 is positioned adjacent a conventional spring return trigger assembly 218 situated at the proximal end 200 of shaft 198. The trigger assembly 218 comprises a coiled spring 220 disposed in the well of shaft 198 and abutting the enlarged stop element 207, as well as a trigger-shaped lever 222 which is attached to and extends substantially orthogonally from inner rod 204, through a slot-like aperture 224 in outer tube 192 along which lever 222 can be moved longitudinally, thus moving inner rod 204 longitudinally within outer tube 192 as well; to facilitate such movement, lever 222 is shaped for engagement by a finger 226 on the hand 228 of a user. The bias of spring 220 urges the inner rod 204, and therefore the lever 222 and the curved hook element 210 as well, towards the respective positions in which they are shown in solid lines in FIG. 13.

The use of adjusting pole 186 to actuate the manual drive components for deployment of the air deflection elements 36 is illustrated, primarily for upper air deflection element 36a, in FIGS. 12-14, and 17-22. The user first lifts the adjusting pole, as shown in FIG. 12, and manipulates it such that curved hook element 210 engages with O-ring 134 while knobbed hook element 212 simultaneously engages with aperture 190 in tongue extension 188, as shown best in FIGS. 13 and 14. The user then unlocks the air deflection element position adjustment assembly 136 by squeezing or otherwise moving the lever 222 in the direction of arrow D in FIG. 13, to the position shown therein in phantom lines, which causes curved hook element 210 to move in the direction of arrow E in FIG. 13, thus in turn causing displacement of O-ring 134 (also illustrated in phantom lines in FIG. 13) and imparting longitudinal movement to the trailing end 120 of release cable 118.

The displacement of release cable 118 at its trailing end 120 is transmitted to its leading end 122 as release cable 118 moves within pulley cable 112; this displacement is then transmitted to pivot cam 148, causing the latter to move from the position shown in FIG. 18 to the position shown in FIG. 20, and thus releasing lock-pin mechanism 152 by causing locking pin 176 to move from the position shown in FIG. 19 to the position shown in FIG. 20, and moving tip 184 out of engagement with aperture 170 in slide bar 142, as shown best in FIG. 20, to permit movement of slide unit 138 along slide bar 142.

Once lock-pin mechanism 152 has thus been released, the user may thereafter utilize adjusting pole 186 to affect the position of the air deflection element. Starting from the fully retracted position, as illustrated for upper air deflection element 36a in FIG. 12, appropriate manipulation of the adjusting pole by the user (downward and rearward as illustrated in FIG. 12 for upper air deflection element 36a), while maintaining pressure on lever 222 against the bias of spring 220 so as to keep lever 222 in the position shown in phantom lines in FIG. 13, and also while knobbed hook element 212 is still engaged with the aperture 190 in tongue extension 188 as shown in FIG. 13, will not only impart deploying movement to upper air deflection element 36a itself, but will also impart longitudinal motion to the trailing end 114 of pulley cable 112, through the linkage of bracket 130 and end guide 126. This longitudinal movement of pulley cable 112 at its trailing end 114 is then transmitted to its leading end 116 through the intermediate guides 124, and is thereafter transmitted, through the force that pulley cable 112 exerts on end guide 158 and shaft member 154, to slide unit 138, whereupon it is translated into travel of carriage 140, along slide bar 142, towards the rear of the vehicle, in the direction indicated by arrow F in FIG. 19, when the air deflection element 36 is being deployed.

Figure 22:
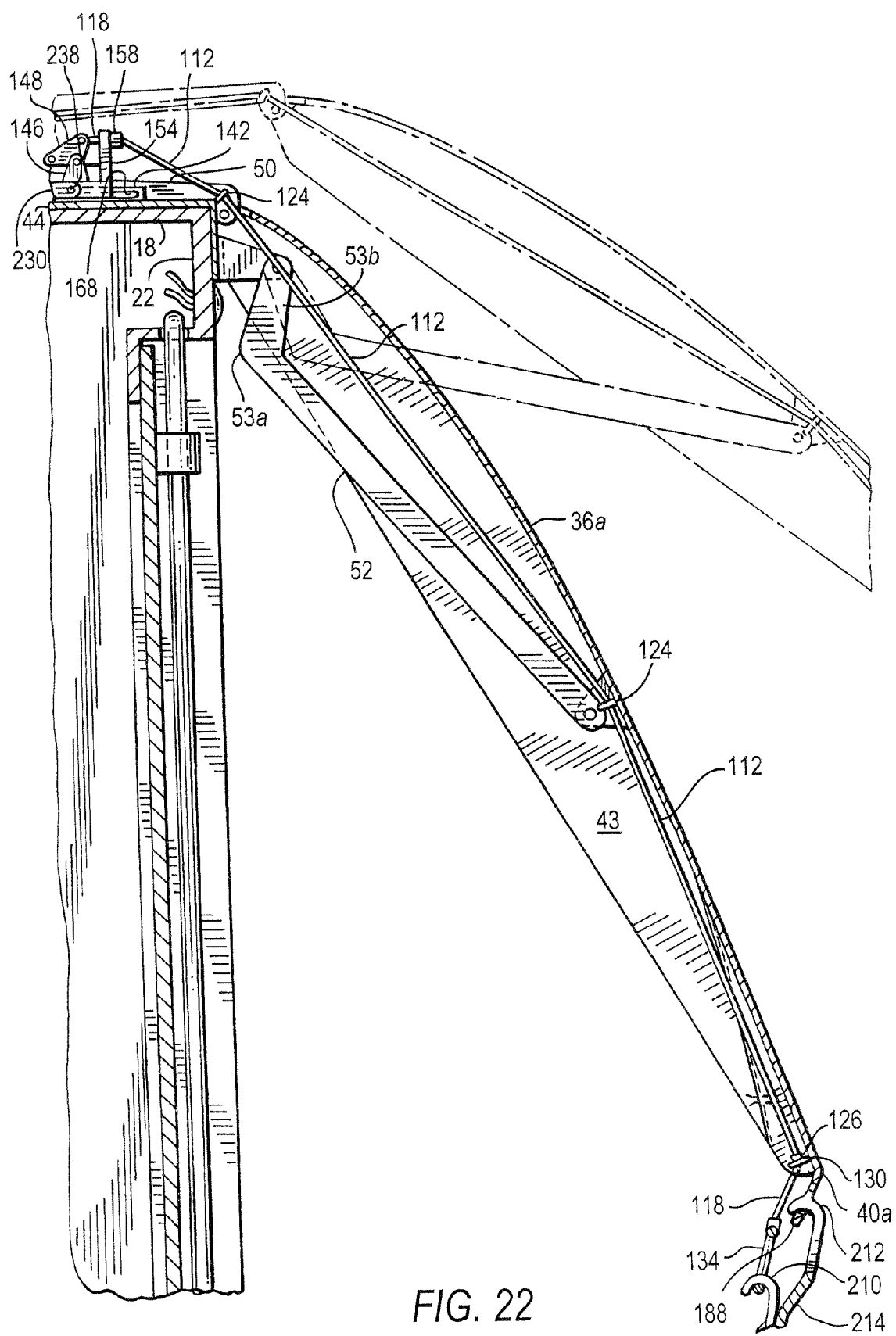
FIG. 22 is an enlarged cross-sectional view similar to that of FIGS. 15 and 21, showing the upper air deflection element of FIG. 12 being moved into the fully extended deployed position using the tool to manipulate the alternate drive components.

As a result of the force exerted by the user on the trailing edge of the air deflection element through the adjusting pole 186, the air deflection element may be caused to move away from the vehicle body and towards the rear of the vehicle, and then to range through a number of deployed positions (an illustrative pair of which are shown for upper air deflection element 36a in FIG. 21, one in solid lines and one in phantom lines, and an illustrative one of which is shown for upper air deflection element 36a in phantom lines in FIG. 22), to a fully extended deployed position (as shown for upper air deflection element 36a in solid lines in FIG. 22), with the front pivot arms 50 and rear pivot arms 52 moving in a manner which is virtually identical to that which occurs with the electro-mechanical drive components described hereinbefore.

When the desired degree of deployment is reached, the user releases lever 222 which, through the linkage of release cable 118 and the bias of springs 178 and 220, causes pivot cam 148 to move from the position shown in FIG. 20 back to the position shown in FIG. 18, and thus secures lock-pin mechanism 152 by causing locking pin 176 to move from the position shown in FIG. 20 back to the position shown in FIG. 19, allowing the tip 184 of locking pin 176 to engage with a different one of the apertures 170 in slide bar 142, thus returning the air deflection element position adjustment assembly 136 to a locked position. Thereafter, the user may disengage the adjusting pole 186 from O-ring 134 and aperture 190.

The use of adjusting pole 186 to actuate the manual drive components for retraction of the air deflection elements 36 is also illustrated, primarily in FIGS. 14 and 17-22, and as will be apparent to those of ordinary skill in the art, is similar to the deployment of those components using that implement, except that it involves movement of the air deflection element in the reverse direction. The user first re-engages the adjusting pole 186 with O-ring 134 and aperture 190, as described hereinbefore, but now with knob 216 on knobbed hook element 212 engaging with the inner surface of tongue 188, as shown best in FIG. 14, so as to prevent knobbed hook element from sliding out of engagement with aperture 190. The user then unlocks the air deflection element position adjustment assembly 136, as described hereinbefore, as shown by the arrows E in FIG. 14, and thereafter, appropriate manipulation of the adjusting pole by the user (upward and forward for upper air deflection element 36a, as indicated by arrow G in FIG. 14), while maintaining pressure on lever 222, causes the air deflection element 36 to move towards the front of the vehicle and inwards towards the vehicle body.

However, when the air deflection element 36 is being retracted, in order simultaneously to cause carriage 140 to travel along slide bar 142 towards the front of the vehicle, in the direction opposite that indicated by arrow F in FIG. 19, the manual drive components preferably further comprise an additional mechanical linkage, illustratively a connector strut 230 which is shown in FIGS. 15-22, strut 230 having a distal end 230a and a proximal end 230b, and a first aperture 232 formed adjacent the distal end 230a thereof, the first aperture 232 being adapted to receive a conventional hinge pin 234 that rotatably couples strut 230 at its distal end 230a to one of the driven pair of front pivot arms 50 (as shown best in FIG. 21); a second aperture 236 is formed adjacent the proximal end 230b of strut 230, the second aperture 236 being adapted to receive a conventional hinge pin 238 that rotatably couples strut 230 to carriage 140 (as shown best in FIGS. 16-20). Although only a single connector strut 230 is shown in the drawings, it is to be understood that a symmetrically situated pair of such connector struts, each with its own set of apertures and associated hinge pins, could be used.

As shown best by comparing the position of strut 230 as depicted in FIG. 15 with its several positions as depicted in solid lines and in phantom lines in FIG. 21, and in solid lines in FIG. 22, the travel of carriage 140 along slide bar 142 during the deployment of air deflection element 36, in the direction indicated by arrow F in FIG. 17, exerts a force on strut 230, such that the latter begins to rotate about hinge pin 238 (in a counterclockwise fashion, from the perspective shown in the drawings), thus constraining the distal end 230a to describe an arc (initially moving away from the vehicle body, and as the deployment continues, back towards the vehicle body again). However, during retraction of the air deflection element 36, the movement of front pivot arm 50 causes strut 230 to rotate about hinge pin 238 such that distal end 230a describes same arc as during deployment, but in the opposite direction (in a clockwise fashion, from the perspective of the drawings), and such that strut 230 exerts a force on carriage 140 which in turn compels the latter to travel along slide bar 142 in the direction opposite that indicated by arrow F in FIG. 17, returning the manual drive components eventually to the positions shown in FIG. 17 when the air deflection element 36 returns to the fully retracted position (illustrated for upper air deflection element 36a in FIG. 15).

When the fully retracted position is reached, the user releases lever 222 which, through the bias of spring 220, causes the curved hook element 210 to move in the direction indicated by arrow H (as shown in phantom lines) in FIG. 14 and to disengage from O-ring 134, and through the linkage of release cable 118 the bias of spring 178, causes pivot cam 148 to move from the position shown in FIG. 20 back to the position shown in FIG. 18, and thus secures lock-pin mechanism 152 by causing locking pin 176 to move from the position shown in FIG. 20 back to the position shown in FIG. 19, allowing the tip 184 of locking pin 176 to engage with the aperture 170 in slide bar 142 that is closest to the front of the vehicle, thus returning the air deflection element position adjustment assembly 136 to a locked position. Thereafter, the user may disengage the adjusting pole 186 from aperture 190 and withdraw the adjusting pole 186, as indicated by arrow I (as shown in phantom lines in FIG. 14).

Although the manual drive components and the adjusting pole for use therewith have been described and illustrated in the drawings primarily with respect to upper air deflection element 36a, it is to be understood that the same manual drive components may be provided for right side air deflection element 36b and for left side air deflection element 36c, and that the same adjusting pole (or perhaps one that is somewhat shorter than that illustrated in FIG. 12) may be used, in conjunction with those manual drive components, for manipulation of right side air deflection element 36b and left side air deflection element 36c.

Figure 23:
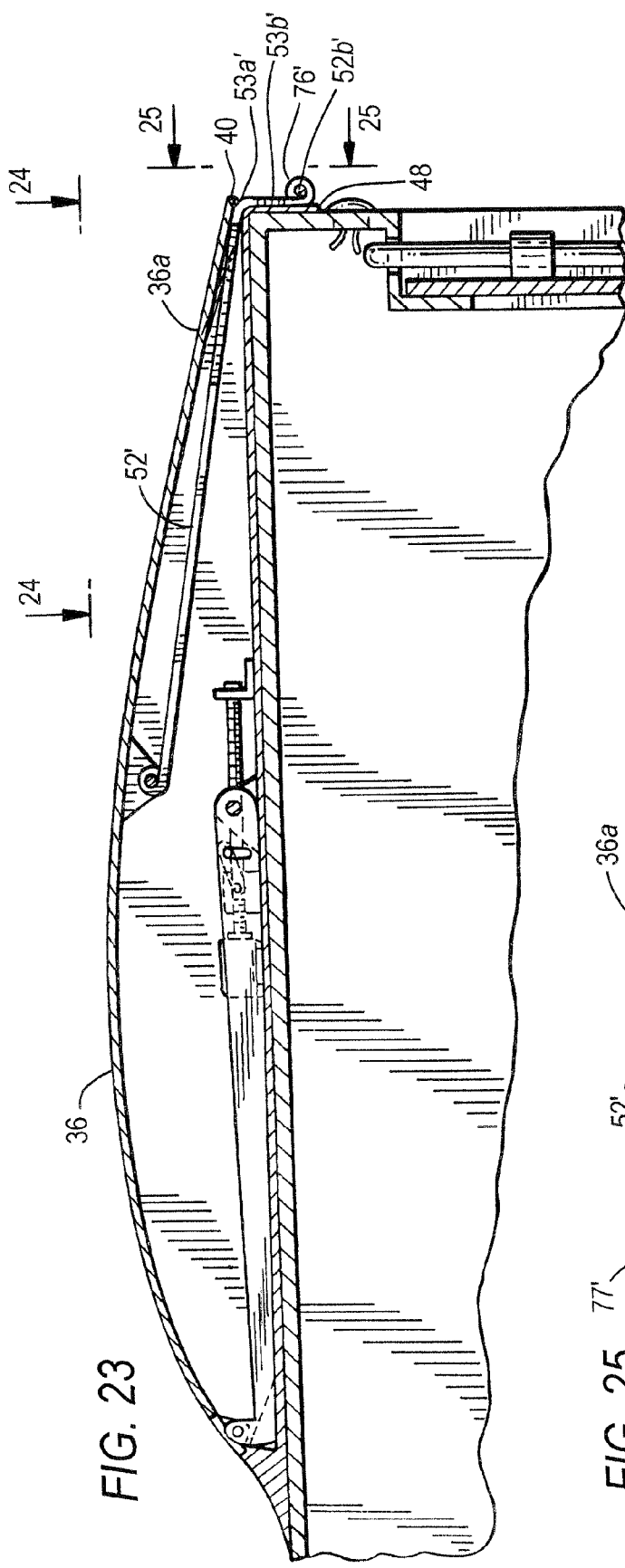
FIG. 23 is an enlarged cross-sectional view similar to that of FIG. 3, showing an alternate structure for the embodiment of the invention shown in FIGS. 1-22.
Figure 24:
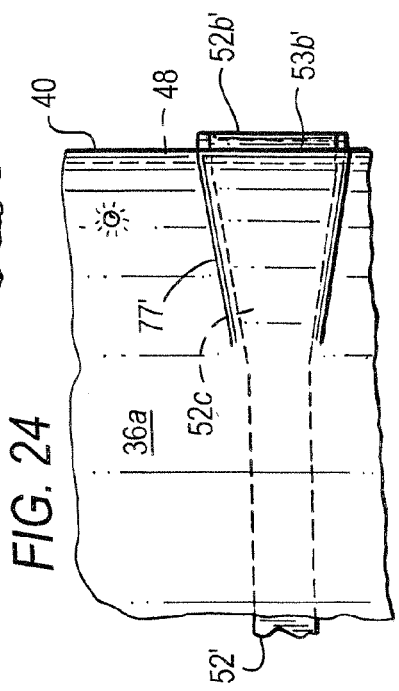
FIG. 24 is a further enlarged top plan view, taken substantially along the lines 24-24 of FIG. 23.
Figure 25:
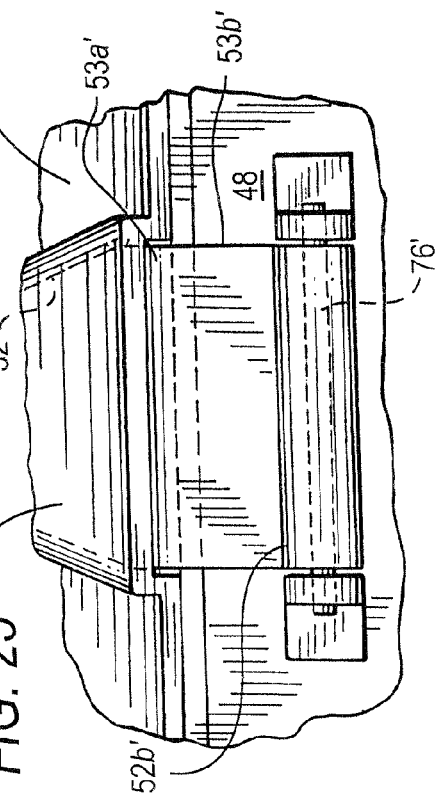
FIG. 25 is an enlarged rear plan view, taken substantially along the lines 25-25 of FIG. 23.

Turning now to FIGS. 23-25 in addition to the aforementioned FIGS. 1-22, an alternate structure comprising a different shape and attachment structure for one or more of the rear pivot arms 52 which link each air deflection element 36 to the vehicle body, and which support and help to deploy and retract each air deflection element 36, is shown illustratively in connection with upper air deflection element 36a (and illustratively also with electro-mechanical drive components, substantially as shown in FIG. 3). More specifically, an alternate rear pivot arm 52' may be provided which, as may be seen by comparing FIGS. 23 and 24 with FIGS. 3 and 4, comprises a shaft that is not as tall, i.e., is more flat (when viewed from the side, as in FIG. 23), but is wider (when viewed from above, as in FIG. 24), than the rear pivot arm 52 described hereinbefore. Moreover, as shown in FIGS. 23 and 25, the alternate rear pivot arm 52' forms an elbow 53a' which is disposed at substantially at a right angle, resulting in a tail section 53b' which encompasses the proximal end 52b' of alternate rear pivot arm 52', and which substantially overlies tail portion 48 of mounting plate 42.

In addition, as shown best in FIGS. 24 and 25, the trailing portion of the alternate rear pivot arm 52' is even wider than elsewhere along its length, having a flared shape, indicated by the numeral 52c in FIG. 24, that widens towards the rear of the vehicle (towards the right in FIG. 24) until elbow 53a' is reached. In order to accommodate this flared shape 52c when the air deflection elements 36 are in their fully retracted positions, each air deflection element 36 is provided along its trailing edge 40 with an elevated portion 77' that is correspondingly flared in shape, and that will overlie the associated rear pivot arm 52' when the air deflection element 36 is in the fully retracted position, as shown best in FIG. 25. Furthermore, and also as shown best in FIG. 25, although the alternate rear pivot arm 52' may be secured to the mounting plate 42 (and thereby to the vehicle body) in substantially the same manner as rear pivot arm 52, it will be understood that in order to accommodate the width of alternate rear pivot arm 52' at its proximal end 52b', a hinge pin 76' must be provided that will necessarily be longer than the hinge pin 76 used for rear pivot arm 52. It will also be understood that, for added stability the proximal end 52b' of alternate rear pivot arm 52' can be curled upon itself to form an opening within which hinge pin 76' may be journaled for rotation, as shown best in FIG. 23.

All of the foregoing differences serve to provide greater lateral support and resistance to cross wind stresses, thereby providing greater rigidity and helping to avoid shifting and wobbling of, the associated air deflection element, especially when the latter is deployed. It should also be understood that, in view of the foregoing differences and the increase in stability that results therefrom, it may be possible to substitute a single alternate rear pivot arm 52' for the central pair of rear pivot arms 52 described hereinbefore in connection with FIGS. 1-22. However, the design of alternate rear pivot arm 52', as shown in FIGS. 23-25, yields a larger cross-section in the direction of the airflow, leading to higher wind resistance and turbulence.

On the other hand, the rear pivot arm 52 described hereinbefore has a smaller cross-section in the direction of the airflow than the alternate rear pivot arm 52', and therefore the former presents less aerodynamic drag, although conversely it also provides less lateral support and less resistance to cross-wind stresses. While the drawings depict these two different designs for the rear pivot arms as being mutually exclusive, it should be understood that it may be possible to combine both designs into a hybrid rear pivot arm (not shown in the drawings), in which the proximal end could be wide and flat, as shown in FIGS. 23 and 24, while the distal end is tall but narrow, as shown, for example, in FIGS. 3 and 4, with a "transition" occurring, from one design to the other, at some intermediate point along the length of the pivot arm.

Figure 26:
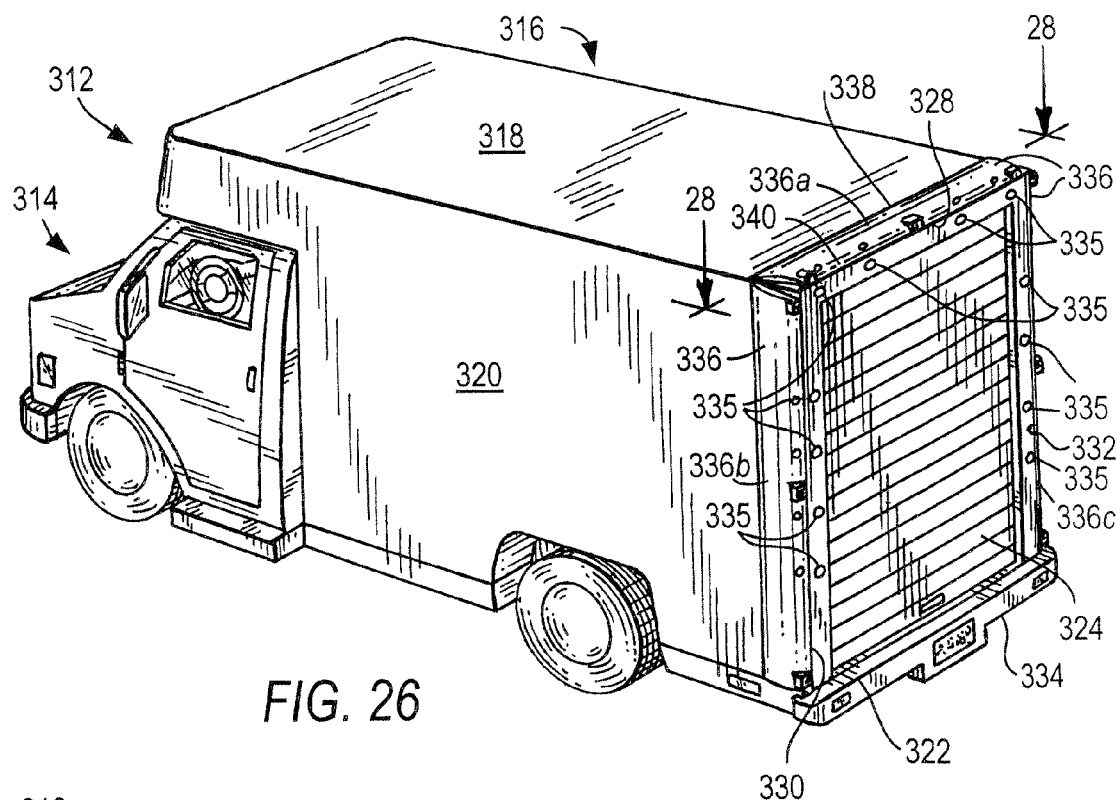
FIG. 26 is a perspective view similar to FIG. 1, but showing a typical medium-sized box truck vehicle, having a roll-up rear cargo door, and equipped with a second preferred embodiment of the retractable air deflection apparatus of the present invention, in which three air deflection elements are shown, all in their fully retracted positions.
Figure 27:
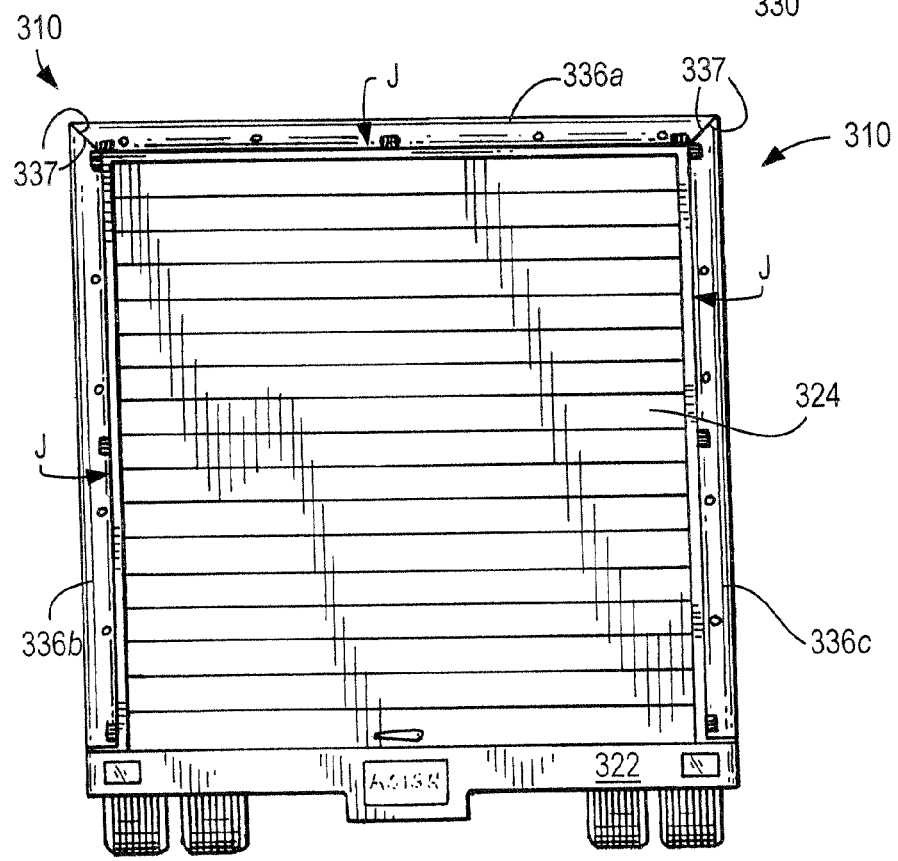
FIG. 27 is an enlarged rear elevational view of the vehicle of FIG. 26, in which the three air deflection elements are all shown in a deployed position.
Figure 28:
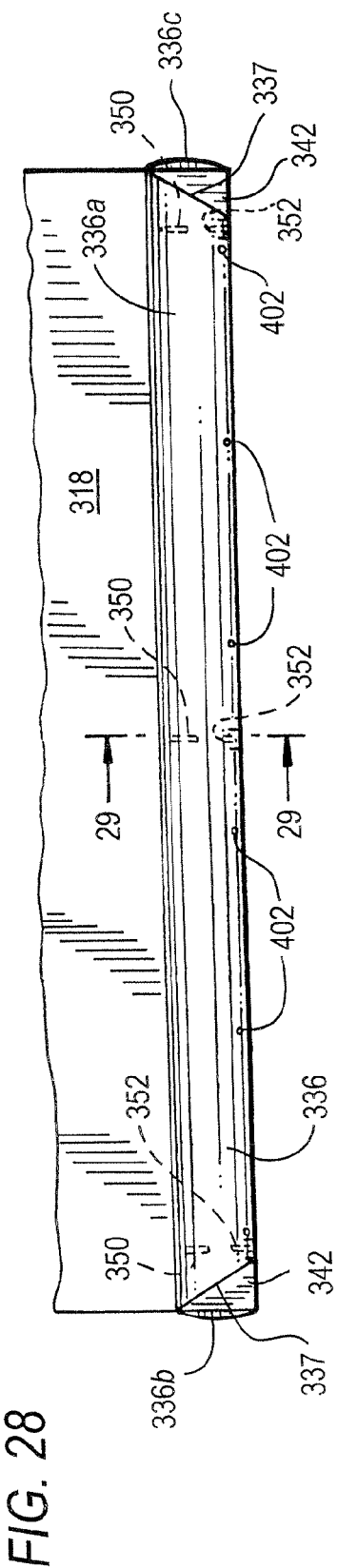
FIG. 28 is a further enlarged top plan view, taken substantially along the lines 28-28 of FIG. 26.

Turning now to FIGS. 26-28 in addition to the aforementioned FIGS. 1-25, an alternate, somewhat different (but still representative) vehicular environment is depicted, in which the retractable air deflection apparatus of the present invention might be used. This illustrative vehicular environment for the invention comprises a typical medium-sized 2-axle box truck 312 having a passenger compartment 314 and a cargo compartment 316. As with trailer 16, cargo compartment 316 is shaped fundamentally as a rectangular parallelopiped, having an upper surface 318, a left side surface 320, a right side surface (not shown in the drawings), a front-facing surface (also not shown in the drawings), a rear-facing surface 322 having an opening that is closed by a roll-up rear cargo door 324 for access to the interior of cargo compartment 316, an upper trailing corner edge 328, a left side trailing corner edge 330, a right side trailing corner edge 332, a lower trailing corner edge 334, and a plurality of electrically-energized marker lights 335 located at various positions on rear-facing surface 322, several of which are customarily aligned transversely across the upper portion of rear-facing surface 322, substantially parallel to and just below the upper trailing corner edge 328 of cargo compartment 316, and above the cargo door 324, and several of which are positioned (and customarily aligned vertically) along the side portions of rear-facing surface 322, between the cargo door 324 and the left side trailing corner edge 330 of cargo compartment 316, and/or between the cargo door 324 and the right side trailing corner edge 332 of cargo compartment 316.

As described hereinbefore in connection with tractor-trailer 12, the air deflection apparatus 310 for use with box truck 312 most preferably comprises at least one, and preferably at least three air deflection elements 336, each of which is preferably fabricated of aircraft grade aluminum; one air deflection element 336a is installed transversely across the upper surface 318 of cargo compartment 316, adjacent and substantially parallel to the upper trailing corner edge 328 and preferably extending horizontally across the entire width of cargo compartment 316, substantially from corner to corner, and two air deflection elements 336b and 336c are installed vertically, on the left side surface 320 of cargo compartment 316, adjacent and substantially parallel to the left side trailing corner edge 330, and on the right side surface, adjacent and substantially parallel to the opposite, right side trailing corner edge 332, respectively, with these two air deflection elements extending vertically and preferably spanning the overall height of the vehicle, also substantially from corner to corner.

Therefore, for a typical medium-haul vehicle such as the box truck 312 depicted in FIGS. 26 and 27, having a cargo compartment 316 that ranges from about eight feet wide to about eight feet, six inches wide, and ranges from about seven feet high to about nine feet high, upper air deflection element 336a will preferably have a transverse or lengthwise dimension ranging from about eight feet to about eight feet, six inches, while side air deflection elements 336b and 336c will both preferably have a lengthwise dimension (vertical, in these cases) ranging from about seven feet to about nine feet. Each air deflection element 336 comprises a leading edge 338 and a trailing edge 340, but in this illustrative vehicular environment, each air deflection element is dimensioned to extend widthwise, from its leading edge to its trailing edge, for a distance of twelve to fifteen inches, which is approximately three percent of the overall length of twenty-eight to thirty-four feet that is typical for a medium-haul cargo vehicle such as box truck 312.

The air deflection apparatus 310 illustrated in FIG. 26 exemplifies an alternative, but still preferred, embodiment of the present invention, as will be described in further detail hereinafter. However, FIG. 26 also serves to illustrate that any of the preferred embodiments of the retractable air deflection apparatus of the present invention, including the most preferred embodiment illustrated in FIGS. 1-25, may be used with, and will function to reduce aerodynamic drag for, squared-off or box-shaped vehicles of various lengths and heights, regardless of whether they are equipped with a pair of hinged, swinging rear cargo doors, or with a single roll-up rear cargo door, or even with no rear doors at all, as is the case with most buses and railroad cars.

FIG. 27 is a view from the rear of the air deflection apparatus 310 in the same exemplary vehicular environment as shown in FIG. 26, but with all of the air deflection elements 336 shown as having been moved, as indicated by the arrows J, into their fully extended deployed positions, while FIG. 28 is a view from above of the upper air deflection element 336a in its fully retracted position. However, FIGS. 27 and 28 also serve to illustrate that, in order to insure that the air deflection elements merely abut, but do not interfere with or strike, one another at their adjacent corners, when all of the air deflection elements are in their fully extended deployed positions, the ends 337 of the air deflection elements may be beveled or otherwise contoured, as shown best in FIG. 28, so as to enable the air deflection elements to dovetail with one another, as shown in FIG. 27.

Thus, when three air deflection elements are used, the beveling is applied to the apical ends of left side air deflection element 336b and of right side air deflection element 336c, and preferably to the left and right ends of upper air deflection element 336a as well, as shown in FIGS. 27 and 28, although less preferably, the beveling can be applied only to the apical ends of the left and right side air deflection elements 336b, 336c, and not at all to the upper air deflection element 336a. While the beveling is depicted in FIG. 27 in conjunction with air deflection apparatus 310 as used on box truck 312, it is to be understood that the same beveling may be utilized for the same purpose in conjunction with air deflection apparatus 10 as used on tractor-trailer 16, and can be utilized for the same purpose in conjunction with the invention as it is used in other vehicular environments as well.

Figure 29:
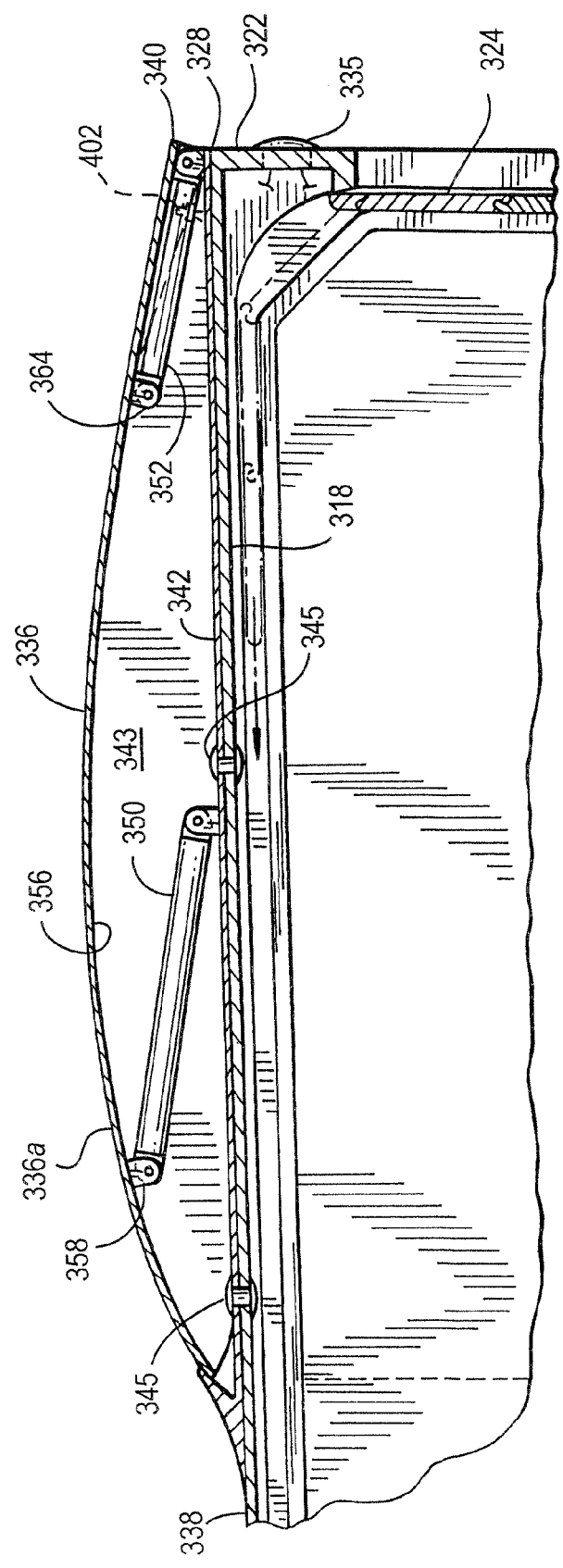
FIG. 29 is a cross-sectional view, taken substantially along the lines 29-29 of FIG. 28, depicting the upper air deflection element of FIGS. 26-28 in the fully retracted position.

Referring next to FIGS. 29-31 in addition to the aforementioned FIGS. 1-28, the alternative, but still preferred, embodiment of the retractable air deflection apparatus of the present invention, mentioned in passing hereinbefore, will now be described in further detail. In this second embodiment, the shapes of the air deflection elements 336 themselves do not differ significantly from the shapes of the air deflection elements 36 of the most preferred embodiment, such that the shapes of the air deflection elements 336 as shown in the drawings may be symbolized by the same modified four-digit NACA numbers, 9401-01 and/or 9401-11, as were used to represent the shapes of the air deflection elements 36, as illustrated in FIGS. 3-11A (and such that the same ten modified four-digit NACA numbers as are set forth above symbolize other exemplary airfoil shapes that will be acceptable for use with the this second embodiment of the present invention). However, there are significant differences in the front pivot arms 350 and the rear pivot arms 352 that link each air deflection element 336 to the vehicle body, and that support and help to deploy and retract each air deflection element 336. In addition, in this embodiment the air deflection elements 336 may be caused to assume only two discrete positions (a fully retracted position, shown in FIG. 29, and a deployed position, shown in FIG. 30), and there are no drive components to assist with the deployment and retraction; instead, the air deflection elements 336 may be deployed and retracted through direct manual manipulation of the air deflection elements themselves by a user (not shown in the drawings), without the assistance of a tool.

Thus, this second embodiment may be more suitable for use in conjunction with the medium-haul vehicular environment exemplified by box truck 312, and especially in conjunction with a short-haul vehicular environment exemplified by even smaller and/or shorter vehicles, such as short-haul delivery trucks and panel vans, for which the top rear edge of the vehicle is easily reachable from the ground, and the body is only about six feet wide. Nevertheless, although this embodiment will be described, and is illustrated in the drawings, in conjunction with the medium-haul vehicular environment exemplified by box truck 312, it is to be understood that the air deflection apparatus 310 of this embodiment may also be utilized with substantially similar advantage in conjunction with the long-haul vehicular environment exemplified by tractor-trailer 12, and that conversely, the air deflection apparatus 10 of the most preferred embodiment (described hereinbefore, and illustrated in FIGS. 1-22, in conjunction with the long-haul vehicular environment exemplified by tractor-trailer 12) may be utilized with substantially similar advantage in conjunction with the medium-haul vehicular environment exemplified by box truck 312.

As shown in FIGS. 29 and 30, the front pivot arms 350 and the rear pivot arms 352 are somewhat shorter than the counterpart front and rear pivot arms 50 and 52 described hereinbefore in connection with the most preferred embodiment of the invention, and although the underside 356 of air deflection element 336 carries leading angle brackets 358 as well as trailing angle brackets 364 for attachment to the air deflection element of the respective front and the rear pivot arms 350, 352 at their respective distal ends, the rear pivot arms 352 are coupled at their proximal ends to mounting plate 342 (which is affixed to the vehicle body illustratively via bolts or rivets 345) in a manner which differs from the way in which rear pivot arms 52 are coupled to mounting plate 42, a manner which allows rear pivot arms 352 to rotate (in a clockwise fashion, from the perspective of these drawings) from the position shown in FIG. 29 to the position shown in FIG. 30, but which does not allow rear pivot arms 352 to rotate beyond the position shown in FIG. 30.

Thus, each air deflection element 336 can be deployed no further than the position illustrated in FIG. 30, and cannot reach the fully extended deployed position illustrated for air deflection elements 36 in solid lines in FIGS. 11 and 22 (in which the forward edge of each air deflection element 36 is positioned adjacent to, and abuts, the associated trailing edge of the vehicle); however, in the medium-haul and short-haul vehicular environments for which this second embodiment of the invention may be better suited, such a fully extended deployed position is thought to be unnecessary, since the aerodynamic benefits that it can provide in long-haul vehicular environments are rarely needed in medium-haul and short-haul environments.

Preferably, front pivot arms 350 may be shaped so as to minimize the aerodynamic drag in the direction of the airflow that they themselves interpose between the vehicle body and the associated air deflection element 336 when the latter is in the deployed position (shown illustratively in FIG. 30 in connection with upper air deflection element 336a). That preferable shape, which is ellipsoidal in cross-section as shown best in FIG. 31, allows air to flow around each front pivot arm 350 in the most efficient fashion, as indicated by the arrows K in FIG. 31.

Referring next to FIGS. 32-36, in addition to the aforementioned FIGS. 1-31, this second embodiment of the invention may optionally comprise power-assisted drive components with which the air deflection elements of FIG. 26 may be caused to assume different positions, so that the air deflection elements 336 need not be deployed and retracted manually. These drive components may be remotely controlled, and may be hydraulically, pneumatically or, preferably, electro-mechanically driven, in a manner similar to that described hereinbefore in connection with the most preferred embodiment of the invention as illustrated in FIGS. 1-11A. Illustrative electro-mechanical drive components for this second embodiment of the invention preferably comprise, for each air deflection element 336, a reversible drive motor 378 adapted to impart rotational motion to a threaded spindle 380, which extends from the drive shaft (not shown) of drive motor 378, and which, at its other end distal from drive motor 378, is journaled for rotation in an angle bracket 382. The drive components also comprise a drive block 384, adapted for movement along spindle 380 via an internally threaded bore 386 adapted to accept and to allow rotation of spindle 380; drive block 384 is also adapted to slide along mounting plate 342, with feet 385 engaged with longitudinal restraining rails 347 that are affixed to mounting plate 342, illustratively via bolts or rivets 349, thus constraining the path of drive block 384 along mounting plate 342.

The drive components for this second embodiment further comprise a separate drive arm 387, which may be coupled by any suitable means to air deflection element 336 at a point approximately midway between the forward edge 338a and the trailing edge 340 of the air deflection element. Illustratively, as shown best in FIG. 32 (for upper air deflection element 336a), drive arm 387 is pierced adjacent its distal end 387a, while the under surface 356 of air deflection element 336 carries an associated projection, preferably comprising an angle bracket 389, which is also pierced and which is rotatably coupled to drive arm 387 adjacent distal end 387a in a conventional fashion via a hinge pin 391. Drive arm 387 may also be coupled by any suitable means at its other end to drive block 384; illustratively, drive arm 387 is pierced adjacent its proximal end 387b and is rotatably coupled to drive block 384 via a hinge pin 393, as shown best in FIG. 33.

When the drive motor 378 is energized by a control unit (not shown in the drawings), the spindle 380 rotates, which causes drive block 384 (starting from the position shown in FIG. 32) to begin moving towards the rear of the vehicle (to the right as shown in the drawings), sliding along mounting plate 342. This motion exerts a force on drive arm 387, as indicated by arrow M in FIG. 35, compelling drive arm 387 to exert a similar force on the associated air deflection element 336 (illustratively in FIG. 32, upper air deflection element 336a), and causing the latter to move away from the vehicle body and towards the rear of the vehicle as front pivot arms 350 and rear pivot arms 352 rotate (in a clockwise fashion, from the perspective shown in the drawings), until drive block 384 has traveled to the opposite end of spindle 380 and the drive components have reached the positions shown in FIG. 34, at which point the associated air deflection element 336 is in the deployed position (illustrated therein for upper air deflection element 336a). When the drive motor 378 is energized with the opposite rotation, the associated air deflection element 336 is pulled by drive arm 387 and begins to move towards the front of the vehicle and towards the vehicle body as front pivot arms 350 and rear pivot arms 352 rotate (in a counterclockwise fashion, from the perspective shown in the drawings), causing the associated air deflection element 336 eventually to return to the fully retracted position, illustrated (for upper air deflection element 336a) in FIG. 32.

Preferably, drive arm 385 may be shaped so as to minimize aerodynamic drag in the direction of the airflow when the associated air deflection element 336 is in the deployed position (shown illustratively in connection with upper air deflection element 336a in FIG. 34). That preferable shape, which is similar to that described as preferable hereinbefore for front pivot arm 350, is ellipsoidal in cross-section as shown best in FIG. 36, allowing air to flow around drive arm 385 in the most efficient fashion, as indicated by the arrows N in FIG. 36.

It is to be understood that the same or similar control unit/circuitry, energy source, actuator switch and limit switches, as were described hereinbefore for use in connection with (i.e., to energize and de-energize) the drive motors 78 of the most preferred embodiment of the invention (which was described hereinbefore, and illustrated in FIGS. 1-22), may be used with equal advantage in connection with (i.e., to energize and de-energize) the drive motors 378 of this second embodiment of the invention (described above, and illustrated in FIGS. 26-36).

Thus, it will be evident from the foregoing description and from the drawings of this second embodiment of the invention, that when the vehicle is moving at any speed, it is possible, by deploying the air deflection elements 336 in the manner illustrated in FIG. 30 or 34, to cause most of the airflow originating along the top and sides of the vehicle to be diverted into the area behind the vehicle, by being "ducted" or "scooped" between the air deflection elements 336 and the vehicle body, as well as by being "bent" over and around the air deflection elements 336, thus utilizing both the inner and outer surfaces of each air deflection element simultaneously, with the contribution of each component of the diversion varying, depending upon the extent of the deployment. Thus, the drag associated with the area of low pressure which develops behind the vehicle is reduced, while at the same time, the drag associated with the breakdown of the laminar air flow along the top and sides of the vehicle is also reduced, and the latter component of the drag is reduced whether the air deflection elements 336 of this second embodiment are deployed or remain fully retracted.

As shown in the drawings, it is also to be understood that this second embodiment of the invention also preferably comprises, for each air deflection element 336, end walls 343 and a plurality of LEDs 402, similar to the end walls 43 and the LEDs 102 depicted in connection with the most preferred embodiment of the invention described hereinbefore. As will be apparent to those skilled in the art, the LEDs 402 may be positioned adjacent the trailing edge 340 in an array which preferably reproduces both the number and positions of the vehicle's native marker lights 335, and which may be illuminated, either automatically or manually by the driver of the vehicle, in the same manner in which the vehicle's native marker lights 335 are normally illuminated.

Referring now to FIGS. 37-44 in addition to the aforementioned FIGS. 1-36, a number of variations and/or optional features that may be incorporated into the retractable air deflection apparatus of the present invention are illustrated. As shown in FIGS. 37 and 38, and as mentioned hereinbefore, each air deflection element may be provided at its trailing edge with a small, upturned reflex extension or tail lip, with which the laminar flow over the air deflection element can be further improved. FIG. 37 depicts this tail lip 341 in conjunction with an air deflection element 336 that is otherwise in accordance with the second embodiment of the invention shown in FIGS. 26-36, while FIG. 38 illustrates a similar tail lip 41 in conjunction with an air deflection element 36 that is otherwise in accordance with the most preferred embodiment of the invention shown in FIGS. 1-22. Tail lip 41 is preferably formed integrally with air deflection element 36, and similarly, tail lip 341 is preferably formed integrally with air deflection element 336; in both cases, the point at which the tail lip is joined to the air deflection element can exhibit either a curve or an angular bend, with the angle of the upturn being no greater than about twenty-thirty degrees.

As mentioned hereinbefore, each air deflection element is dimensioned to extend from its leading edge to its trailing edge for a distance that is preferably dependent on the length of the box-shaped portion of the vehicle on which it is mounted, ranging from two percent to four percent, and most preferably three percent, of that length. FIG. 39 illustrates these variations in the width span diagrammatically, with double-headed arrow O representing the maximum preferred width (typically approximately eighteen inches) for an air deflection element when used in the typical long-haul vehicular environment, while double-headed arrow P represents an intermediate preferred width (typically approximately twelve inches) for an air deflection element when used in the typical medium-haul vehicular environment, and double-headed arrow Q represents the minimum preferred width (typically approximately eight inches) for an air deflection element when used in the typical short-haul vehicular environment.

FIGS. 40 and 41 depict the underside 356 of a typical air deflection element 336 having an upturned tail lip 341, although FIG. 41 (along with FIG. 42) shows that the underside 356 may carry an additional optional feature, specifically an electrical heating element 365 sealed within or covered by a protective layer 367, and preferred for use with vehicles operated in colder climates so as to warm the air deflection element as necessary to melt snow and/or ice that may have accumulated on the vehicle when it is stationary (e.g., after having been parked overnight), or to prevent snow and/or ice from accumulating on the air deflection element while the vehicle is traveling (whether the air deflection element is retracted or deployed while the vehicle is in transit) during inclement weather. The heating element 365 may be energized remotely, through a control unit (not shown in the drawings) to which the heating element is connected via wires 369, the control unit having a switch that can be operated either by the driver of the vehicle, or otherwise from the passenger compartment, as is conventional for other vehicular de-icing heating elements of this type (such as those embedded in the rear windows of passenger vehicles). As shown in FIG. 41, the heating element 365 is preferably coiled or snaked such that it covers substantially the entire underside 356 of air deflection element 336, save for the areas in the vicinity of angle brackets 358, 364 and 389.

FIGS. 43-44 illustrate a feature that is preferred for inclusion in most installations of the retractable air deflection apparatus of the present invention, particularly when it is used in long-haul and medium-haul vehicular environments, but which nevertheless may be omitted in certain short-haul vehicular environments, and therefore should be considered optional. This feature relates to the provision of rear pivot arms for each air deflection element that are of variable length, thus allowing the position of the trailing edge of each air deflection element to be adjusted independently of, and without substantially changing or affecting, the position of the leading edge of that air deflection element. As a result, each air deflection element can be deployed such that its trailing edge is positioned further away from the vehicle body than its leading edge.

Specifically, and as shown schematically in FIGS. 43 and 44 (illustratively in connection with the upper air deflection element 336a of the second embodiment of the invention and, also illustratively, without any drive components, substantially as depicted in FIGS. 29 and 30), the rear pivot arm 352 may comprise an outer sleeve 357 and an inner projection 359 that is slidably disposable within outer sleeve 357 (the projection 359 having an outside dimension that is slightly less than the inside dimension of outer sleeve 357), as well as a device, generally designated 394, for extending the inner projection 359. Preferably, extension device 394 is attached to, or is positioned adjacent to, but in any event is situated externally of, rear pivot arm 352. As illustrated, extension device 394 comprises a piston rod 396 that is pneumatically or hydraulically driven, and that is adapted to extend from and return into a cylinder 398, as indicated by the double-headed arrow R in FIG. 43, in response to actuation by a control unit (not shown), with the piston rod being attached to inner projection 359 via a peg 397. However, an extension device that comprises an electrically-driven, externally-threaded shaft or screw, that can extend from and return into an internally-threaded cylindrical housing, or other arrangements that utilize a solenoid release, are also possible and are within the scope of the invention.

When this optional feature is used, it will be evident to those skilled in the art that if one of the rear pivot arms that is coupled to and supports a given air deflection element is of variable length, then all of the rear pivot arms that are coupled to and support that air deflection element must be of variable length, and must be configured such that their lengths vary in concert. Although the provision of an extension device 394 on only one of the rear pivot arms 352 may suffice to achieve this result, it is preferred that each rear pivot arm carry its own extension device 394, with the extension devices being configured such that they are actuated (and de-actuated) simultaneously, in order to reduce any resulting stresses on the air deflection element itself.

As best shown by comparing FIGS. 29 and 30 with FIG. 43, the provision of rear pivot arms that are of variable length allows upper air deflection element 336a to be deployed with a "reverse angle," such that trailing edge 340 is situated further above the upper surface of the vehicle than forward edge 338a. This "reverse angle" deployment can be achieved first by moving upper air deflection element 336a from the retracted position shown in FIG. 29 to the deployed position shown in FIG. 30, and then by actuating extension device 394 via a control unit (not shown in the drawings) so as to extend inner projection 359 of rear pivot arm 352 while at the same time moving upper air deflection element 336a back towards its retracted position, the movements of the front and rear pivot arms 350, 352 being indicated by double-headed arrows S and T, respectively. Thereafter, the position of trailing edge 340 can be adjusted more precisely, in the manner indicated by double-headed arrow U, by using extension device 394 to modify the length of rear pivot arm 352 still further.

Preferably, rear pivot arm 352 may also be shaped so as to minimize aerodynamic drag in the direction of the airflow when the associated air deflection element 336 is deployed in the "reverse angle" position. That preferable shape, which is similar to that described as preferable hereinbefore for front pivot arm 350, is ellipsoidal in cross-section, allowing air to flow around rear pivot arm 352 in the most efficient fashion, and as shown best in FIG. 44, both outer sleeve 357 and inner projection 359 would be fashioned such that they have that same ellipsoidal shape.

The "reverse angle" deployment of upper air deflection element 336a serves to alleviate the problems caused by the lifting force that is normally exerted on the vehicle body (in accordance with Bernoulli's Principle, as mentioned hereinbefore) when it is traveling at high speeds, by providing a counteracting downward force that results in added stability for the vehicle, especially when adverse weather conditions are prevalent. Hence, the optional provision of rear pivot arms having variable lengths would be most useful in long-haul and medium-haul vehicular environments, and even then, only for the upper air deflection element of the vehicle. Thus, it would be unnecessary to provide rear pivot arms having variable lengths on the side air deflection elements except, as will now be described, in vehicular environments comprising multiple box-shaped container units, such as combination or "tandem" tractor-trailer assemblies comprising a cab hauling two or even three box-shaped trailers in "daisy chain" fashion, as well as a succession of adjacent, squared-off railroad cars (regardless of whether those rail cars are used for carrying passengers or freight); these types of vehicular environments will be referred to collectively hereinafter as a "tandem" vehicular environment.

Figure 45:
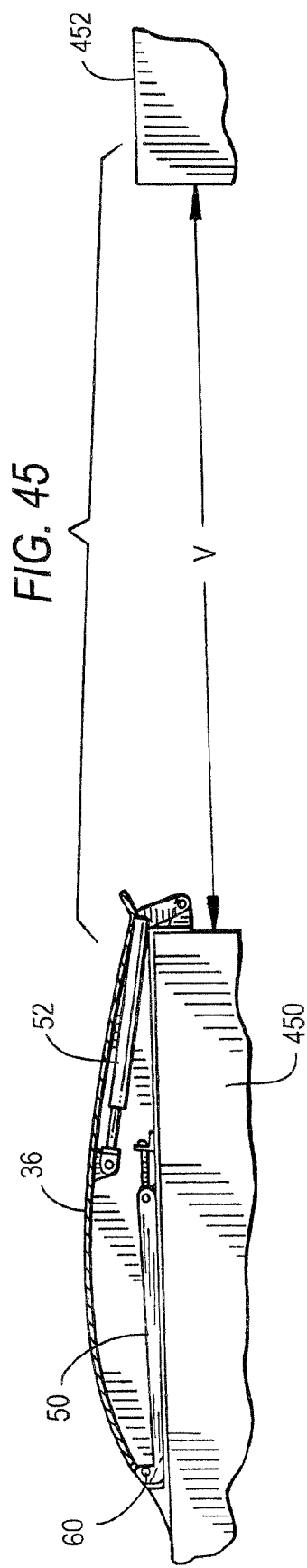
FIG. 45 is a plan view, partially in cross-section, depicting a retractable air deflection element in accordance with the most preferred embodiment of the present invention in a fully retracted position, and illustrating its use in the context of a succession adjacent container bodies.
Figure 46:
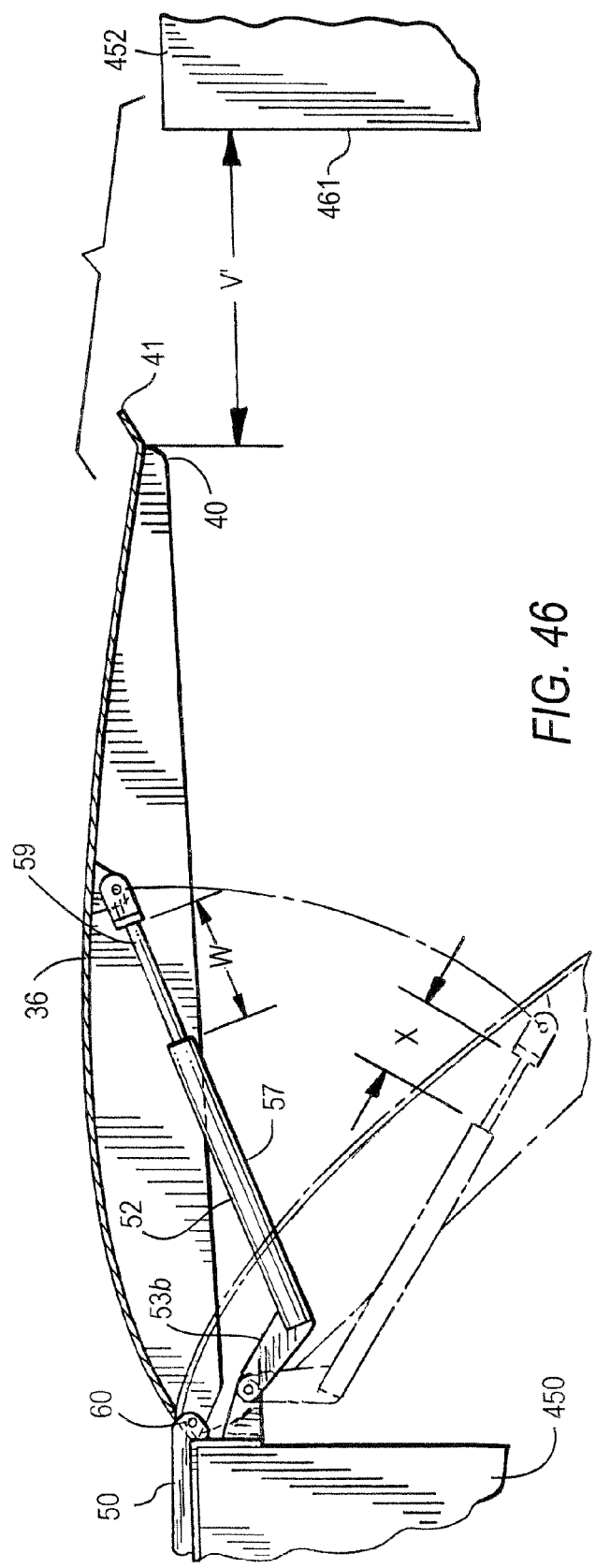
FIG. 46 is an enlarged plan view similar to that of FIG. 45, also partially in cross-section, depicting the air deflection element of FIG. 45 in a fully deployed position.

Referring now to FIGS. 45 and 46 in addition to the aforementioned FIGS. 1-44, the provision of variable length rear pivot arms on the upper air deflection element, as well as on both of the side air deflection elements, in a tandem vehicular environment, is depicted in connection with an air deflection element 36 of the most preferred embodiment of the invention (illustratively with electro-mechanical drive components, substantially as shown in FIGS. 1-11A, but also with an upturned tail lip 41, as shown in FIG. 38). Specifically, FIGS. 45-46 depict how the variable length rear pivot arms allow the air deflection elements on the rear edges of the first (or one of the intermediate) units, of a vehicle having multiple successive adjacent box-shaped container units, to be deployed for the most aerodynamic benefit during travel, it being understood that FIGS. 45-46 can be taken either as views, from the side, of an upper air deflection element, or as views, from above, of the right side air deflection element.

In FIG. 45, air deflection element 36 is shown in the fully retracted position, with dimension V representing the typical distance or "gap" between one box-shaped container unit 450 (the leading container unit) and an adjacent, box-shaped, trailing container unit 452; the value of dimension V varies depending on the particular tandem vehicular environment, with twenty-four inches being typical for tandem tractor-trailer assemblies, while thirty inches is more typical for freight-carrying rail boxcars.

In order to reach the position shown in FIG. 46, air deflection element 36 is first deployed in the fashion described hereinbefore in connection with FIGS. 1-11A, but some time before the position is reached that is shown in phantom lines in FIG. 46 (which corresponds substantially to the position shown in solid lines in FIG. 11), the extension device (not shown in FIGS. 45 and 46) is actuated by a control unit (which again is not shown in the drawings) so as to extend inner projection 59 of rear pivot arm 52, while at the same time further deployment is continued, thereby moving the trailing edge 40 (and the tail lip 41) of air deflection element 36 further outwards from the leading container unit 450 as compared with its position as shown in phantom lines in FIG. 46, such that the imaginary chord (not shown) of each air deflection element (when considered as an airfoil) is substantially parallel either to the top or to one of the sides of both the leading container unit 450 and the trailing container unit 452. As a result of a relatively small change in the length of the variable length rear pivot arm 52, illustratively represented in FIG. 46 by the difference between the dimension W and the distance between the arrows X, the air deflection element 36 is thus essentially caused to pivot about the hinge pin 60.

As shown in solid lines in FIG. 46, each air deflection element is thereby caused to span a substantial portion of the "gap" (represented by the dimension V in FIG. 45) between the adjacent container bodies, except for a narrow opening (represented by the dimension V in FIG. 46) which is needed in order to avoid potentially damaging contact between the air deflection element 36 and the front edge 461 of the trailing container unit 452, as the air deflection element is being deployed or retracted. Such damaging contact is also possible, in the case of the side air deflection elements only, when during the course of travel the vehicle turns to that same side, thus temporarily reducing (for the duration of the turn) the separation between the adjacent container bodies on the side that constitutes the "inside" of the turn, while temporarily increasing that separation on the side that constitutes the "outside" of the turn.

However, optionally, and most preferably, the risk of contact between one of the side air deflection elements and the trailing container unit 452, even during a relatively sharp turn, can be eliminated by allowing for a slight additional or further extension and then a slight contraction or shortening of the rear pivot arms (of only one side air deflection element or the other), in a dynamic fashion (and preferably automatically) as the vehicle turns, and only for the duration of the turn, so as to briefly force further outwards the trailing edge 40 of the air deflection element that is on the "inside" of the turn.

In any event, the result of the deployment of the air deflection elements 36 as shown in FIG. 46 is that the body of each air deflection element shields the "gap" (represented by the dimension V in FIG. 45), with the air deflection elements thus serving to avoid or reduce the turbulence normally attributable to the breakdown in laminar air flow between adjacent container bodies in the tandem vehicular environment, by maintaining that laminar air flow over most of the dimension V, with the tail lip 41 serving to deflect the air flow and to direct it slightly away from the remaining opening between the container bodies (represented by the dimension V'), such that as the air flow continues past the trailing edge 40 of the air deflection element, it will not be directed into that opening. In those installations not including a tail lip 41, the variable length rear pivot arms can alternatively be extended slightly further than as shown in FIG. 46, such that the imaginary chord (not shown) of each air deflection element is oriented slightly beyond parallel to the vehicle body, and so that the air deflection elements themselves deflect the air flow outwardly and away from the remaining opening (represented by the dimension V') between the container bodies.

As mentioned hereinbefore in conjunction with the control units (not shown in the drawings) for power-assisted deployment and retraction of the air deflection elements in a remote fashion from the cab of the vehicle, optionally, but more preferably, sensors are used to provide a remote indication in the cab of the current positions of each of the air deflection elements. In order to determine the position of each air deflection element precisely, two sensors are needed, one angular or rotary sensor and one linear position sensor, although the latter is needed only if a particular air deflection element is provided with variable length rear pivot arms. While these sensors are too small to be seen in the drawings, the most preferred locations for them are indicated below, illustratively for the rotary sensor in connection with the most preferred embodiment of the invention shown in FIGS. 1-22, and illustratively for the linear position sensor in connection with the second embodiment of the invention shown in FIGS. 26-36 and 43-44; however, it is to be understood that these sensors may be situated in the respective corresponding locations in connection with either of the embodiments of the invention described thus far and illustrated in FIGS. 1-46.

Specifically, in order to determine the extent of deployment of any of the air deflection elements described thus far, a commercially-available rotary sensor may be placed adjacent the proximal end 50b of one of the front pivot arms 50, where the latter is coupled to mounting plate 42, such that the angle between the front pivot arm and the upper surface 18 is measured, although it is also possible to place the rotary sensor adjacent the proximal end 52b of one of the rear pivot arms 52, where the latter is coupled to angle bracket 74. A preferred rotary sensor for use with the present invention is available from Novotechnik U.S., Inc. of Southborough, Mass., U.S.A., which markets a several such sensors under the model designation AW360 ZE. Furthermore, in order to determine the extent to which the variable length rear pivot arms have been extended, a commercially-available linear position sensor may be placed on or adjacent the extension device 394. A preferred linear position sensor for use with the present invention is available, also from Novotechnik U.S., Inc., which markets such sensors under the model designation TLM. The output of the rotary sensor can be utilized alone or, in cases in which at least one air deflection element is equipped with variable length rear pivot arms, in combination with the output of the linear position sensor, in a manner which is well known in the art, to provide an indication (either analog or digital) of the position of the air deflection element, on a suitably calibrated readout device (not shown in the drawings) located in the cab of the vehicle, preferably in the vicinity of the actuator switch (which is also not shown in the drawings).

Referring next to FIGS. 47-50 in addition to the aforementioned FIGS. 1-46, another alternative, but also still preferred, embodiment of the retractable air deflection apparatus of the present invention will now be described, illustratively in conjunction with a long-haul vehicular environment exemplified by the same tractor-trailer 12 as shown in FIGS. 1-22. In this third embodiment, there are significant differences in the air deflection elements themselves, and in the structures that support and link each air deflection element to the vehicle body, as well as in the manner in which each air deflection element is deployed and retracted, as compared with the embodiments described previously. However, this embodiment preferably does include drive components to assist with the deployment and retraction of the air deflection elements.

In this embodiment, the air deflection apparatus 510 comprises at least one, and preferably at least three, air deflection elements 536 (one upper air deflection element and two side air deflection elements, as with the embodiments described hereinbefore). As shown in FIGS. 47-49, each air deflection element 536 comprises an outer housing member 537, which is closed except for a rear transverse opening 537b, and an inner elongating member 539. Both the housing member 537 and the elongating member 539 generally have an airfoil geometry, the shapes of which, when the elongating member 539 is positioned as shown in FIG. 49, may be symbolized by the modified four-digit NACA numbers 7504-01 and/or 7504-11. Elongating member 539 is slidably disposed within housing member 537 in a "nested" fashion (the elongating member 539 generally having outside dimensions that are slightly less than the corresponding inside dimensions of housing member 537), as best shown in FIGS. 47 and 49, illustratively in connection with upper air deflection element 536a.

Housing member 537 comprises an outer wall 571 and an inner wall 573, which are shaped so as to maintain substantially the same distance between them, but to converge towards one another at the rear, such that housing member 537 tapers gradually near its trailing edge (the latter being located adjacent opening 537b). Along both ends, which are closed by end walls 543, housing member 537 is provided with a guide element 595, having a channel 599 with which the sides of elongating member 539 engage, as shown best in FIG. 48. Elongating member 539 preferably further comprises an upturned tail lip 541, and as with the embodiments described hereinbefore, each air deflection element 536 is preferably associated with a mounting plate 542 that is affixed to the vehicle body.

As illustrated in FIGS. 47-49 in connection with upper air deflection element 536a (installed transversely across the upper surface 518 of the vehicle, adjacent and substantially parallel to the upper trailing corner edge 528, and preferably extending horizontally across the entire width of the vehicle, substantially from corner to corner), each air deflection element 536 is coupled to the vehicle body (either directly, or more preferably, through mounting plate 542) by a plurality of leading support legs 550 and a plurality of trailing support legs 552, each of which can be of fixed length, but each of which is, more preferably, of variable length. Each support leg 550, 552 of variable length comprises an outer sleeve element 557 and a inner extendable element 559 that is slidably disposable within outer sleeve element 557 (the extendable element 559 having an outside dimension that is slightly less than the inside dimension of outer sleeve element 557), as well as a device (not shown in the drawings) for elongating the inner extendable element 559 in a sectional, "telescoping" fashion, in a manner that is well known in the art.

The leading and trailing support legs 550, 552 may be coupled by any suitable means to air deflection element 536 at points near the leading edge 538 and the trailing edge 540, respectively, of the air deflection element. Illustratively, as shown best in FIG. 49 in connection with upper air deflection element 536a, the inner extendable element 559 of each leading support leg 550 is pierced adjacent its distal end, while the under surface 556 of air deflection element 536a (which is also the inner surface of inner wall 573) carries an associated leading projection, preferably comprising an angle bracket 558, which is also pierced and which is coupled to extendable element 559 of leading support leg 550 in a conventional fashion via a connecting pin 560. Similarly, the inner extendable element 559 of each trailing support leg 552 is pierced adjacent its distal end, while the under surface 556 of air deflection element 536a (which, again, is also the inner surface of inner wall 573) carries an associated trailing projection, preferably comprising an angle bracket 564, which is also pierced and which is coupled to extendable element 559 of trailing support leg 552 in a conventional fashion via a connecting pin 566. As shown best in FIG. 49, the aforementioned gradual convergence of outer wall 571 and inner wall 573 towards one another preferably encompasses only the region of housing member 537 near its trailing edge, most preferably only between support leg 552 and opening 537b.

Each support leg 550, 552 may also be shaped so as to minimize aerodynamic drag in the direction of the airflow. As illustrated in FIG. 50 in connection with a leading support leg 550, that preferable shape, which is similar to that described as preferable hereinbefore, is ellipsoidal in cross-section, allowing air to flow around each support leg in the most efficient fashion, as indicated by the arrows Y, and as shown best in FIG. 50, outer sleeve element 557 and each section of inner extendable element 559 are fashioned such that they have that same ellipsoidal shape.

Turning now to FIGS. 51-54 in addition to the aforementioned FIGS. 1-53, the air deflection apparatus 510 of this third embodiment of the invention may optionally comprise power-assisted drive components with which the elongating member 539 of each air deflection element 536 may be deployed and retracted, and caused to assume differing positions of deployment. These drive components may be remotely controlled, and may be hydraulically, pneumatically or, preferably, electro-mechanically driven, in a manner that is generally similar to that described hereinbefore in connection with the most preferred embodiment of the invention, as illustrated in FIGS. 1-11A, and also generally similar to that described hereinbefore in connection with the second embodiment of the invention, as illustrated in FIGS. 32-36, but with somewhat different drive components than those described in connection with either of those embodiments.

Figure 51:
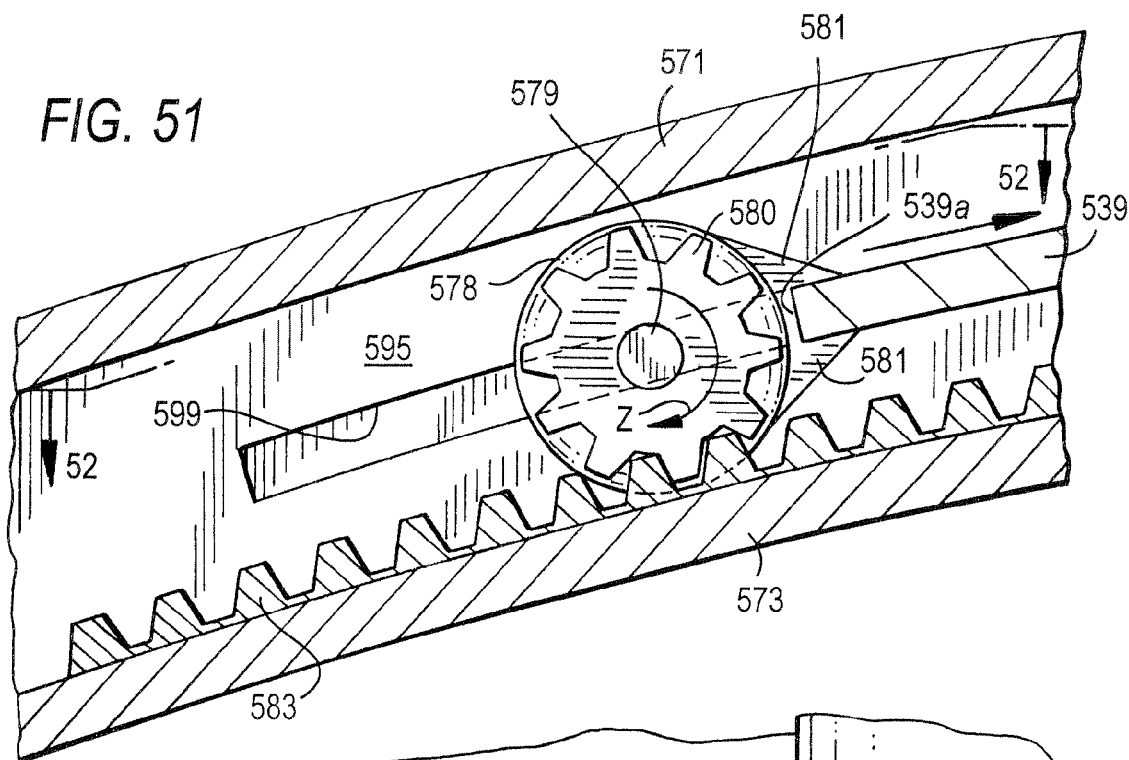
FIG. 51 is a further enlarged cross-sectional view of some of the drive components of the embodiment shown in FIG. 49.
Figure 52:
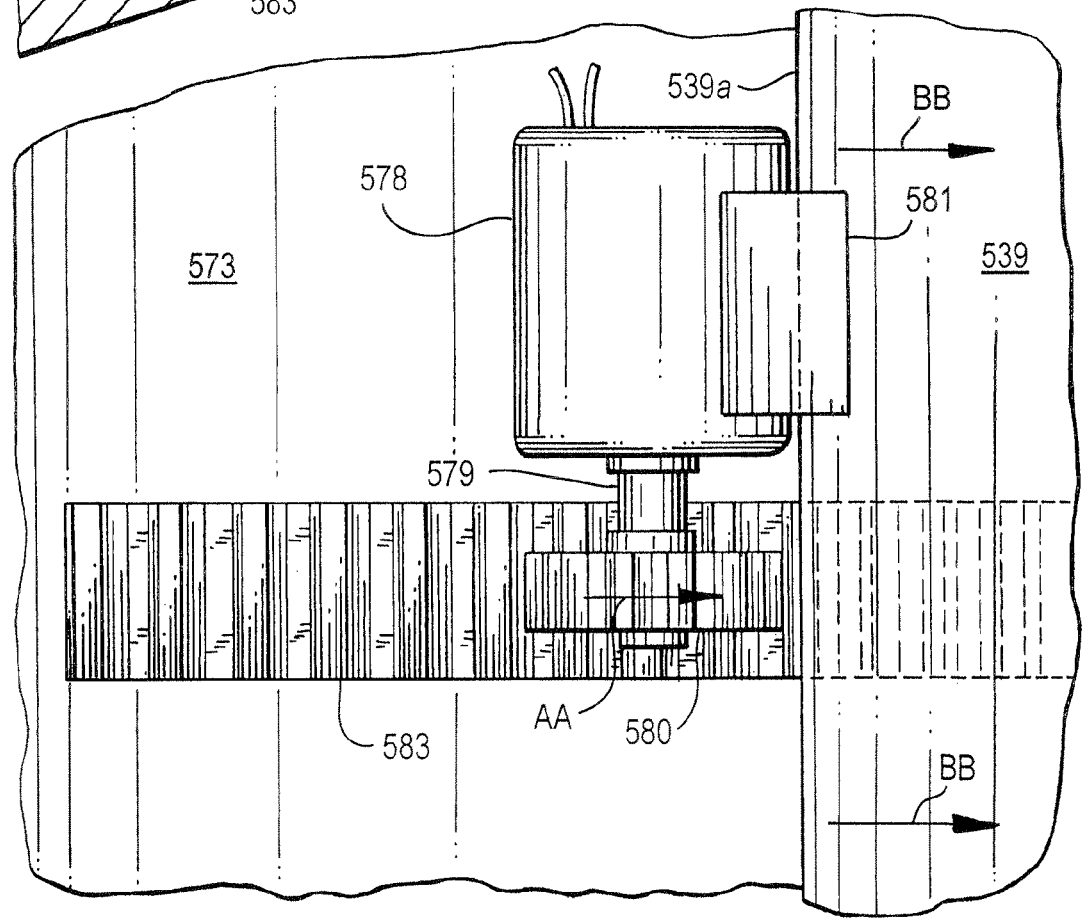
FIG. 52 is a cross-sectional view, taken substantially along the lines 52-52 of FIG. 51, showing additional drive components of the embodiment shown in FIG. 49.

Illustrative electro-mechanical drive components for this third embodiment of the invention preferably comprise, for each air deflection element 536, a reversible drive motor 578 situated within housing member 537, and adapted to impart rotational motion to toothed drive gear 580, which extends from the drive shaft 579 of drive motor 578. As best shown in FIGS. 51 and 52, drive motor 578 is attached to the leading edge 539a of elongating member 539 via a supporting bracket 581, and the drive components further comprise a gear track 583 mounted on the inside surface of inner wall 573 of housing member 537 and preferably positioned substantially along the imaginary center line of each air deflection element 536, oriented along the direction of travel of the vehicle (as shown in phantom lines in FIG. 47). Gear track 583 is adapted for mating engagement with drive gear 580 in a well known manner.

FIGS. 51-52 depict the configuration of the aforementioned drive components when the associated air deflection element is in the fully retracted position, which position is illustrated, for upper air deflection element 536a, in FIGS. 47-49. When drive motor 578 is energized by a control unit (not shown in the drawings), the drive gear 580 rotates (in a clockwise manner, from the perspective shown in FIG. 51, as indicated by the arrow Z), which causes drive gear 580 to begin to travel or "walk" along gear track 583, moving towards the rear of the vehicle (to the right from the perspective shown in FIG. 52, as indicated by the arrow AA) and constraining elongating member 539 to move in that direction as well, as indicated by the arrows BB in FIGS. 51-54, thereby deploying elongating member 539 from the rear of housing member 537 through opening 537b and increasing the overall size of associated air deflection element 536 to any desired degree, up to the fully deployed position (illustrated in FIGS. 53 and 54 for upper air deflection element 536a). Since the deployment of elongating member 539 changes the overall shape or geometry of air deflection element 536, it will be apparent to those skilled in the art that the modified four-digit NACA numbers set forth above as symbolizing the shape of air deflection element 536 when elongating member 539 is fully retracted (as illustrated in FIG. 49), can not also be used to represent that shape when elongating member 539 is deployed; in the latter configuration, when the elongating member 539 is fully deployed, particularly as illustrated in FIG. 54, the shape of air deflection element 536 may be symbolized by the modified four-digit NACA numbers 2503-01 and/or 2503-11.

As will be evident to those skilled in the art, when the drive motor 578 is thereafter energized with the opposite rotation, the movements of the drive components as described above will be reversed, thus causing the elongating member 539 to begin to move towards the front of the vehicle and to retract into housing member 537, such that it eventually returns to the fully retracted position illustrated in FIGS. 47-49 for upper air deflection element 536a, thereby resulting in an overall diminution in the size of air deflection element 536. It will also be evident to those skilled in the art that it may be necessary to provide a roller or guide or some other element within housing member 537 in order to prevent drive gear 580 from disengaging from gear track 583 as the former travels or "walks" along the latter during these operations.

As stated above, the air deflection elements 536 of this third embodiment of the invention are preferably coupled to the vehicle body via support legs 550, 552, each of which, by virtue of its "telescoping" inner extendable element 559, is of variable length. However, it is to be understood that for a given air deflection element 536, most preferably the inner extendable elements 559 of all of the leading support legs 550 are extendable in concert with one another, and the inner extendable elements 559 of all of the trailing support legs 552 are also extendable in concert with one another, although separately from, i.e., not necessarily in concert with, the extendable elements 559 of the leading support legs 550. As illustrated in FIG. 54, this arrangement enables the trailing support legs 552 to be extended (in the direction indicated by arrow CC in FIG. 54) without extending leading support legs 550, but as illustrated in FIG. 53, this arrangement also enables both the leading support legs 550 and the trailing support legs 552 to be extended at the same time (and substantially to the same degree, in the direction indicated by the arrows CC in FIG. 53). Thus, by varying the degree of extension of the leading support legs 550 and the trailing support legs 552, the angle at which the air deflection element 536 may be deployed may be varied somewhat by the user.

It will therefore be evident from the foregoing description and from the drawings of this third embodiment of the invention, that when the vehicle is moving at low and moderate speeds, it is still possible, by deploying the air deflection elements 536 in the manner illustrated in FIG. 53, with both the leading support legs 550 and the trailing support legs 552 extended, to cause most of the airflow originating along the top and sides of the vehicle to be diverted into the area behind the vehicle, by being "ducted" or "scooped" between the air deflection elements 536 and the vehicle body, as well as by being "bent" over and around the air deflection elements 536, thus utilizing both the inner and outer surfaces of each air deflection element simultaneously, with the contribution of each component of the diversion varying, depending upon the degree to which the leading support legs 550 are extended.

On the other hand, when the vehicle is moving at high speeds, it is still possible, by deploying the air deflection elements 536 in the manner illustrated in FIG. 54, with only the trailing support legs 552 extended, to cause most of the airflow originating along the top and sides of the vehicle to be diverted into the area behind the vehicle, by being "bent" over and around the air deflection elements 536, thus utilizing primarily the outer surface of each air deflection element. However, once again, in all cases the drag associated with the area of low pressure which develops behind the vehicle is reduced, while at the same time, the drag associated with the breakdown of the laminar air flow along the top and sides of the vehicle is also reduced, and the latter component of the drag is reduced whether the air deflection elements 536 of this third embodiment are deployed or remain fully retracted (with none of the support legs extended, as illustrated in FIG. 49). In addition, with this third embodiment of the invention it is also still possible, when the upper air deflection element 536a is deployed in the manner illustrated in FIG. 54, to provide a moderate downward force that results in the added stability for the vehicle discussed hereinbefore in connection with FIG. 43.

FIGS. 53 and 54 also illustrate how the gradual tapering of housing member 537 near its trailing edge, between support leg 552 and opening 537b as mentioned hereinbefore, minimizes any disruption in the airflow over (and, in the case of FIG. 53, under) air deflection element 536 that might otherwise occur at the juncture of housing member 537 and elongating member 539 (when the latter is extended or deployed) in the absence of such tapering. Although the minimization of any such disruption in the airflow by means of this gradual tapering of housing member 537 is most preferred, it is to be understood that the airflow disruption at the juncture of housing member 537 and elongating member 539 (when the latter is extended or deployed) can be minimized in other ways. For example, if housing member 537 is constructed without any such tapering, then a preferred alternative is to construct elongating member 539 with a gradual taper, specifically, so that its thickness gradually increases towards the edge nearest the front of the vehicle (this taper is not shown in the drawings), so as to provide the necessary smooth (rather than abrupt) transition from the outer surface of housing member 537 to the outer surface of elongating member 539 when elongating member is fully extended (as illustrated in FIGS. 53 and 54).

Another preferred alternative would be to provide a transitional flexible, tapering extension (also not shown in the drawings), which would preferably be fabricated of the synthetic fibers marketed by E. I. du Pont de Nemours and Company of Wilmington, Del., U.S.A. under the trademark KEVLAR, although other materials having similar characteristics could be used instead. This flexible extension would preferably overlap, and would be attached in a permanent fashion to, the rear portion of housing member 537, near its trailing edge and adjacent to opening 537b, and would extend rearwardly, such that when elongating member 539 is deployed, the flexible extension would also overlap elongating member 539, and would thereby provide the necessary smooth (rather than abrupt) transition from the outer surface of housing member 537 to the outer surface of elongating member 539, and thus minimize any disruption in the airflow.

Referring now to FIGS. 55-59 in addition to the aforementioned FIGS. 1-54, this third embodiment of the invention may instead comprise drive components with which the air deflection elements 536 may be deployed and retracted (and caused to assume differing positions of deployment) through manual manipulation, using a tool that is specially designed for that purpose.

Figure 55:
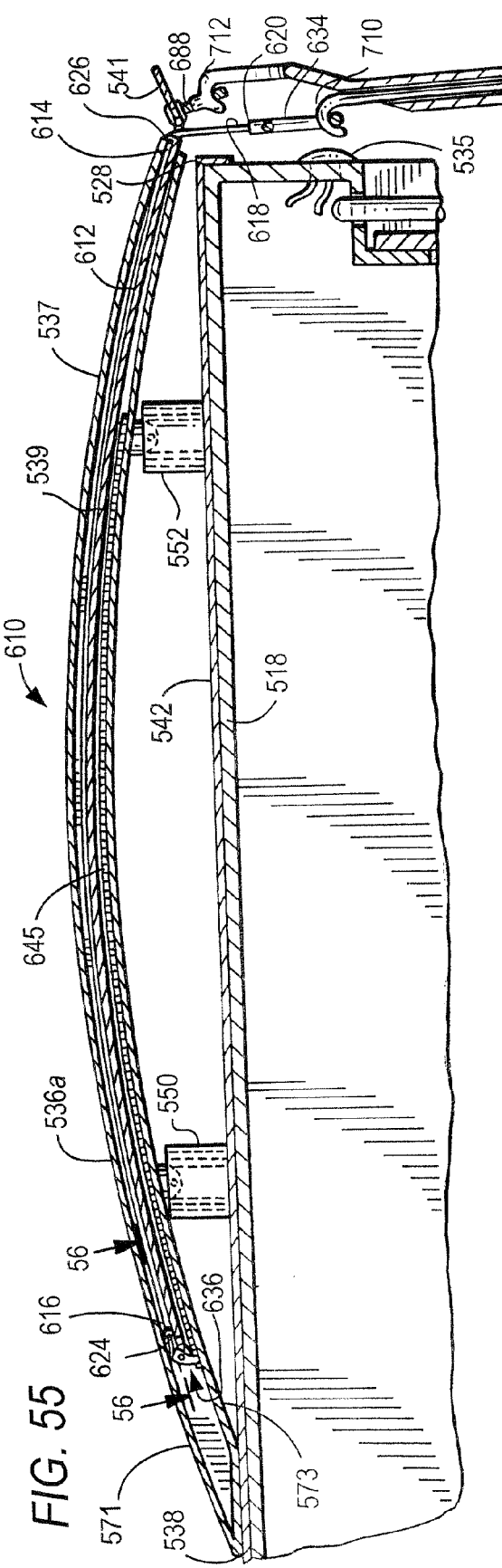
FIG. 55 is a cross-sectional view similar to that of FIG. 49, but showing alternative drive components for the embodiment of the invention depicted in FIG. 49, and showing the preferred structure for a tool for use with those alternative drive components.

As shown best in FIG. 55, the drive components for manual deployment are preferably situated within housing member 537. More particularly, these drive components are preferably positioned substantially along the imaginary center line of each air deflection element 536, oriented along the direction of travel of the vehicle, and they illustratively comprise, for each air deflection element 536, as shown in FIGS. 55-59 (illustratively for upper air deflection element 536a), a pulley system 610 including a pulley cable 112, having a trailing end 614 and a leading end 616, and enclosing a release cable 618, having a trailing end 620 and a leading end 622. Release cable 618 is slidably disposed coaxially within pulley cable 612, with sufficient clearance therebetween to allow each cable to be moved longitudinally, independently of one another. Release cable 618 may be fabricated of a flexible metal wire or chain, or sturdy rope or twine, or of another natural or synthetic material, as is well known in the art.

At its leading end 616, pulley cable 612 terminates at an end guide 624, and at its trailing end 614, pulley cable 612 terminates at an end guide 626. As shown best in FIG. 59, end guide 626 is mounted on the outer surface 628 of elongating member 539, slightly forward of tail lip 541, and has an aperture (not shown) so as to allow release cable 618 to pass therethrough and to emerge from pulley cable 612, extending beyond the trailing end 614 thereof. End guide 626 is preferably positioned adjacent an aperture 631 in elongating member 539, through which release cable 618 extends, such that release cable 618 is accessible and manipulable from the rear of the vehicle, as will be described hereinafter; for this purpose, release cable 618 terminates at its trailing end 620 in an O-ring 634. End guide 624 is also mounted on the outer surface 628 of elongating member 539, slightly rearward of its leading edge 539a. As shown best in FIGS. 57 and 58, an aperture 633 located in end guide 624 is adapted to receive the leading end 616 of pulley cable 612, and to allow release cable 618 to pass therethrough and to emerge from pulley cable 612, extending beyond the leading end 616 thereof.

Release cable 618, at its leading end 622, is tethered to an air deflection element position adjustment assembly 636, which is adapted to reciprocate between a locked position, depicted most clearly in FIG. 57, and a released or unlocked position, depicted most clearly in FIG. 58, in a manner to be described in further detail hereinafter. The air deflection element position adjustment assembly 636 illustratively includes a tapering cam 635 that is pivotally attached to the leading edge 539a of elongating member 539 via a hinge pin 637 that journaled for rotation in brackets 639; at its tapered extremity 635a, tapering cam 635 carries an illustratively circular locking peg 641. An aperture 643, located in tapering cam 635, is adapted to receive the leading end 622 of release cable 618.

Figure 56:
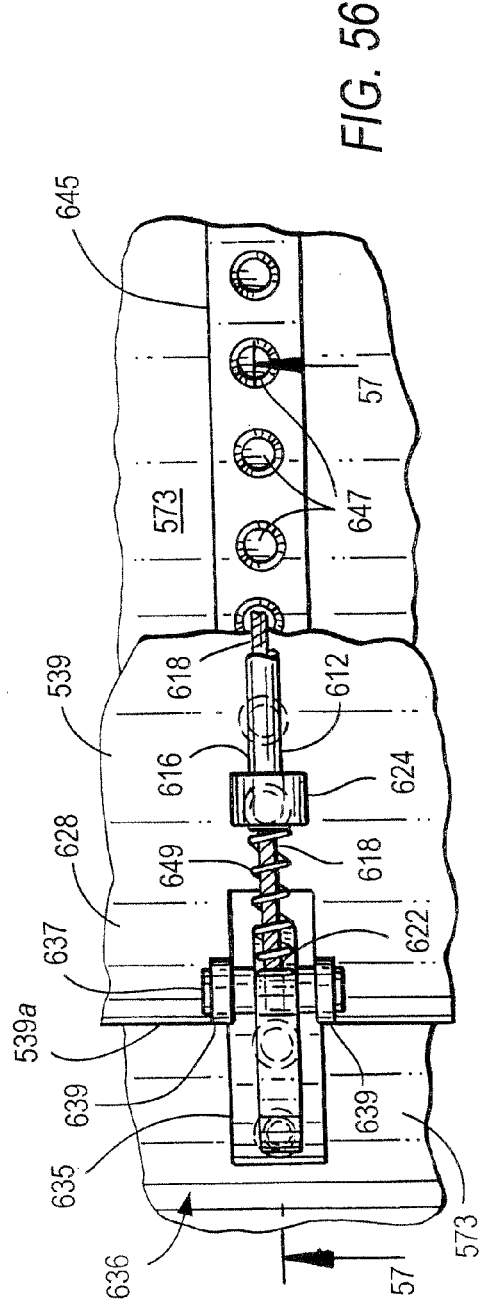
FIG. 56 is an enlarged cross-sectional view, taken substantially along the lines 56-56 of FIG. 55, of the alternate drive components of FIG. 55.
Figure 57:
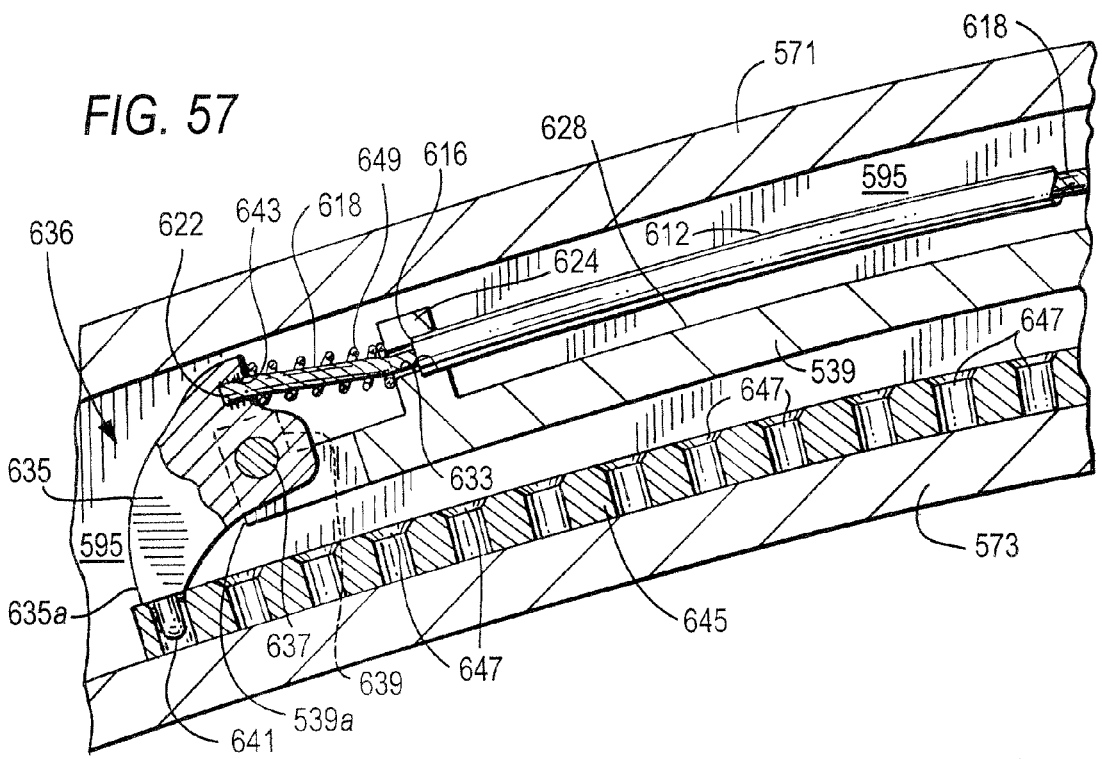
FIG. 57 is a cross-sectional view, taken substantially along the lines 57-57 of FIG. 56, showing the alternate drive components in an engaged position.
Figure 58:
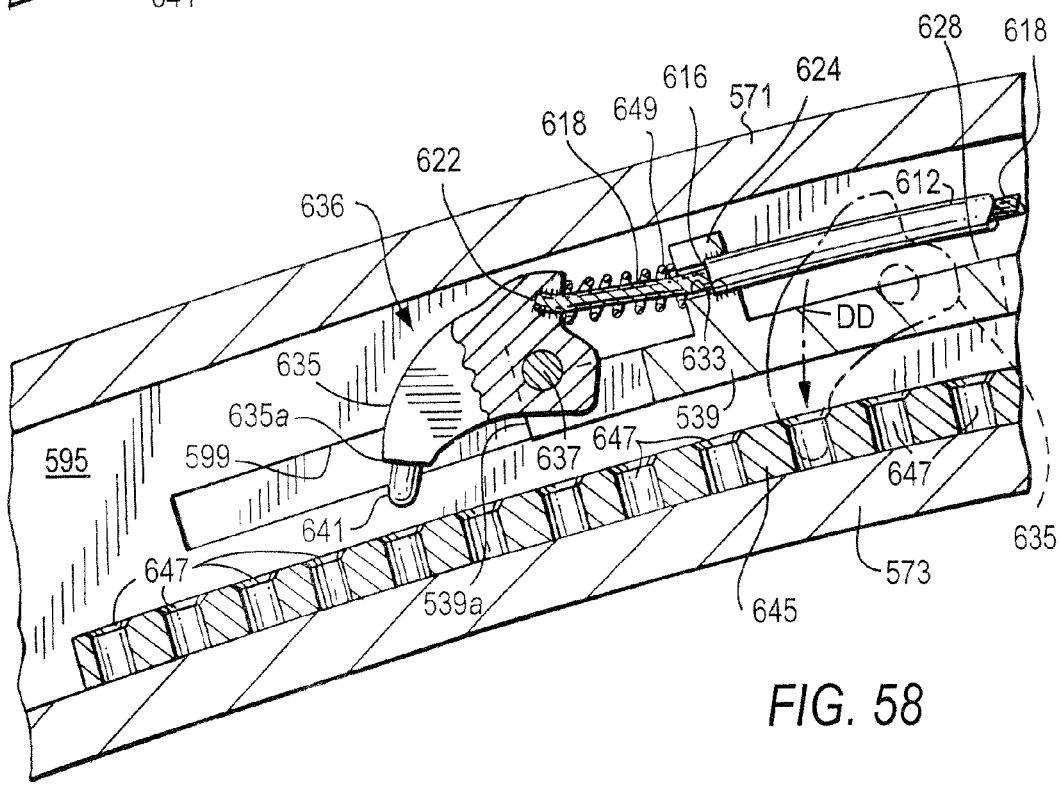
FIG. 58 is a view similar to that of FIG. 57, showing the alternative drive components in a disengaged position.

The air deflection element position adjustment assembly 636 also illustratively includes a locking track 645, disposed on the inner wall 573 of housing member 537 and carrying a plurality of illustratively circular locking apertures 647, all substantially of the same diameter, provided at regular intervals along locking track 645 for substantially its entire length and positioned substantially along its center line in an aligned fashion, as shown best in FIG. 56; each locking aperture 647 is adapted for engagement with locking peg 641, as shown best in FIG. 57. The number of locking apertures 647 can be chosen to correspond to the number of discrete positions that are desired for manual deployment of the elongating member 539 of the associated air deflection element 536; preferably, as illustrated in FIGS. 56-58, there are a multiplicity of such apertures 647. The bias of return spring 649 urges tapering cam 635 in the direction indicated by arrow DD in FIG. 58, towards locking track 645, such that locking peg 639 is urged into engagement with one of the locking apertures 647, as shown in solid lines in FIG. 57 and in phantom lines in FIG. 58. The air deflection element position adjustment assembly 636 further includes a return spring 649, coiled around the portion of release cable 618 that is disposed between end guide 626 and tapering cam 635.

Figure 59:
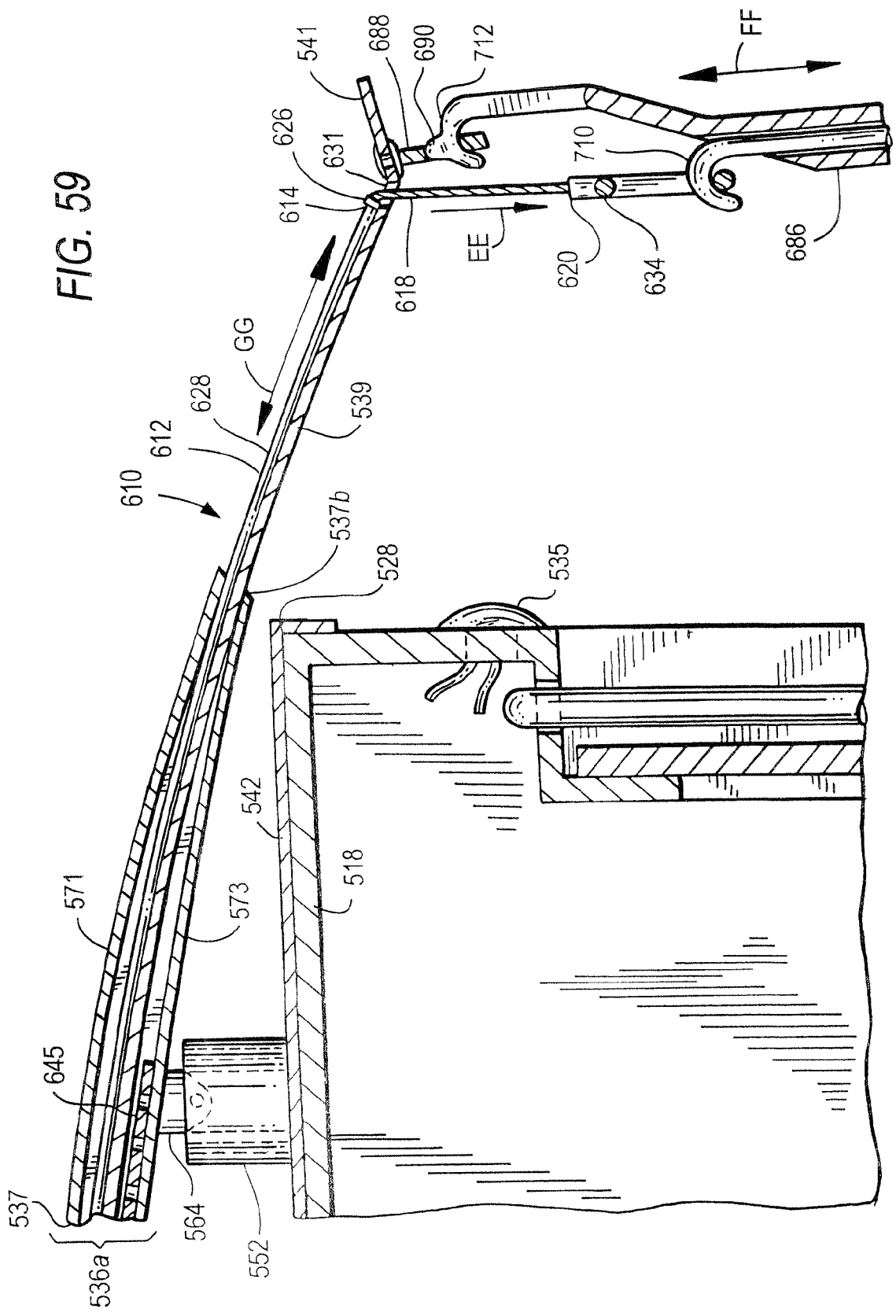
FIG. 59 is a cross-sectional view similar to that of FIG. 55, but further enlarged and showing only a portion of the upper air deflection element of FIG. 55, with the elongating member of that air deflection element being moved into a deployed position using the tool to manipulate the alternate drive components.

The special tool, that is designed for use with the manual drive components just described, comprises an adjusting pole 686, shown in FIGS. 55 and 59, carrying a curved hook element 710 and a knobbed hook element 712 which together enable substantially simultaneous manipulation not only of the release cable 618, but also the elongating member 539 of the associated air deflection element 536; for this purpose, an illustrative extension 688 is provided, which depends from the tail lip 541 of each air deflection element 536, with an aperture 690 in extension 688 that is preferably positioned substantially along the imaginary center line of the air deflection element 536. Curved hook element 710 is adapted for engagement with the O-ring 634 at the trailing end 620 of release cable 618, while knobbed hook element 712 is adapted for engagement with the aperture 690 in extension 688 of tail lip 541.

The adjusting pole 686 is substantially identical to the adjusting pole 186 illustrated in FIGS. 12-14 and described hereinbefore for use in conjunction with the most preferred embodiment of the invention, and is used in substantially the same way so as to actuate the manual drive components for deployment (or retraction) of the air deflection elements 536, first by manipulating adjusting pole 686 so as to displace release cable 618 (as indicated by the arrow EE in FIG. 59), so that the tapering cam 635 is caused to pivot against the return spring 649, thereby unlocking or releasing air deflection element position adjustment assembly 636 and causing locking peg 641 to be withdrawn from engagement with one of the locking apertures 647 (as shown in solid lines in FIG. 58), then by further manipulating adjusting pole 686 (as indicated by double-headed arrow FF in FIG. 59) so as to impart deploying (or retracting) motion (as indicated by the double-headed arrow GG in FIG. 59) to the elongating member 539 of air deflection element 536 while maintaining the displacement of release cable 618, and thereafter by manipulating adjusting pole 686 still further so as to reverse the displacement of release cable 618 so that tapering cam 635 is urged by return spring 649 to pivot in the opposite direction, thereby forcing locking peg 641 into engagement with one of the other locking apertures 647 and consequently re-locking air deflection element position adjustment assembly 636 when the desired degree of deployment (or retraction) is reached.

Although not shown in the drawings, it is to be understood that this third embodiment of the invention also preferably includes, for each air deflection element 536 (specifically, for each elongating member 539), a plurality of LEDs similar to those depicted in connection with the earlier embodiments of the invention described hereinbefore. As will now be evident to those skilled in the art, these LEDs may be positioned adjacent the trailing edge 540 in an array which preferably reproduces both the number and positions of the vehicle's native marker lights 535, and which may be illuminated, either automatically or manually by the driver of the vehicle, in the same manner in which the vehicle's native marker lights 535 are normally illuminated.

As mentioned previously, the invention preferably encompasses the use of sensors to provide a remote indication, preferably in the cab of the vehicle, of the current positions of each of the air deflection elements, so as to facilitate remote deployment and retraction thereof. In the case of this third embodiment of the invention, in order to determine the position of each air deflection element precisely, three sensors are needed, all of which are linear position sensors. Although these sensors are too small to be seen in the drawings, the most preferred locations for them will be described.

Specifically, in order to determine the degree to which elongating member 539 is extended from the opening 537b at the rear of housing member 537, one such linear position sensor may be situated within housing member 537, between outer wall 571 and inner wall 573, adjacent to and slightly forward of the position occupied by leading edge 539a of elongating member 539 when the latter is fully retracted within housing member 537. A preferred linear position sensor for use with this aspect of the present invention is available from Celesco Transducer Products, Inc. of Chatsworth, Calif., U.S.A., which markets such a sensor (also called a "compact string encoder") under the model designation SE1. Similarly, in order to determine the extent to which the variable length support legs 550, 552 have been extended, a linear position sensor such as the TLM product of Novotechnik U.S., Inc. described hereinbefore may be placed on or adjacent the device (not shown in the drawings) for elongating the inner extendable element 559 of each support leg in a "telescoping" fashion, although the use of a "telescoping" mechanism that is integrally equipped by the manufacturer with position length sensing is preferable; such mechanisms are widely available commercially from several manufacturers. The output of these sensors can be utilized in a manner which is well known in the art, to provide an indication (either analog or digital) of the position of the air deflection element, on a suitably calibrated readout device (not shown in the drawings) located in the cab of the vehicle, preferably in the vicinity of the actuator switch (which is also not shown in the drawings).

Each of the embodiments of the invention has thus far been described as preferably comprising three air deflection elements (one upper air deflection element and two side air deflection elements). However, although not shown in the drawings, it will be evident to those skilled in the art that for each embodiment described hereinbefore, it is within the scope of the invention to include a fourth air deflection element, substantially identical to the other air deflection elements, and displaceable in unison with them between a retracted position and at least one deployed position, but mounted beneath the body of the vehicle and positioned adjacent its lower rear trailing edge (that edge is illustratively designated by the reference numeral 34 in connection with the tractor-trailer 12 of FIGS. 1-2, and by the reference numeral 334 in connection with the box truck 312 of FIGS. 26-27). The use and operation of such a lower air deflection element to divert the airflow along the underside of the vehicle body would essentially be no different than the use and operation of the counterpart upper and side air deflection elements previously described.

Nevertheless, and referring now to FIGS. 60-66 in addition to the aforementioned FIGS. 1-59, because many land transportation vehicles have a rear bumper and/or other features or equipment that may interfere with the deployment of such a lower air deflection element, or that may make the positioning of such a lower air deflection element on the underside of the vehicle body adjacent its lower trailing corner edge impractical, an alternative structure for such an element will now be described.

Figure 60:
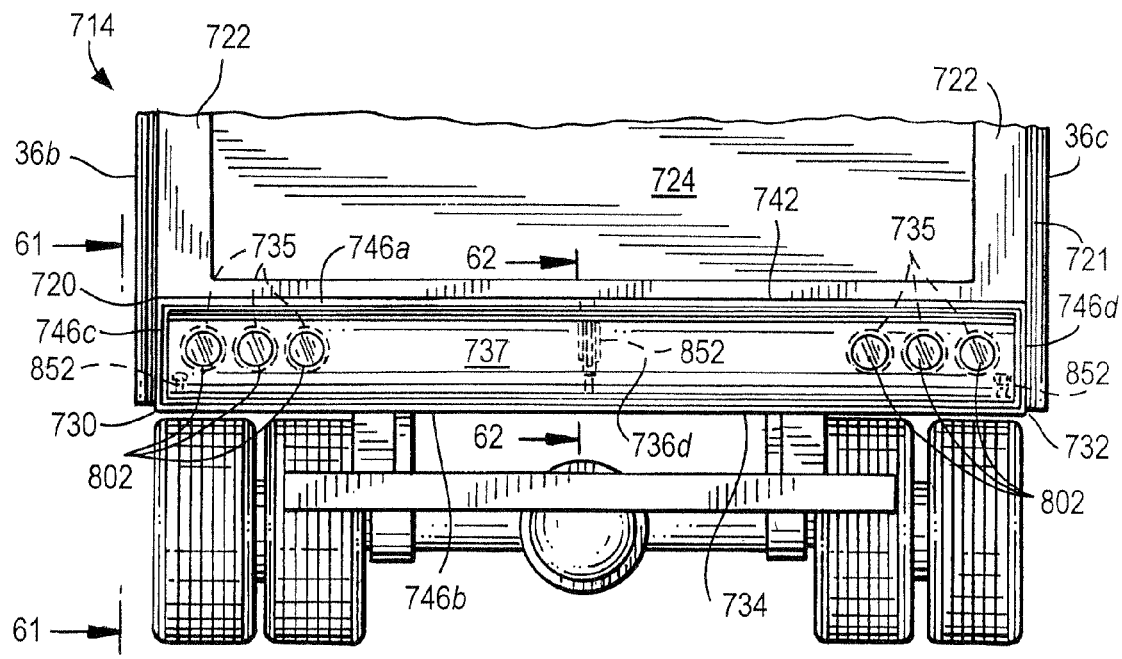
FIG. 60 is an enlarged rear elevational view of the lower portion of a typical medium-sized box truck vehicle of a somewhat different design from that of FIG. 27, equipped with an alternative structure for a lower air deflection element, and showing that lower air deflection element in a fully retracted position.

As shown in FIG. 60, the lower rear portion of a typical medium-haul vehicle 714 with which the present invention might be used (and which is similar to the vehicle 312 as shown in FIGS. 26-27) includes a left side air deflection element 36b, a right side air deflection element 36c, and a lower air deflection element 736d (vehicle 714 may or may not also carry an upper air deflection element, which is not shown in FIG. 60). For purposes of illustration, the left side and right side air deflection elements are designated by reference numerals which indicate that they are in accordance with the most preferred embodiment of the invention described hereinbefore and shown in FIGS. 1-22, but it is to be understood that the left side and right side air deflection elements may alternatively correspond with those indicated by the reference numerals 336b and 336c, respectively, in accordance with the second embodiment of the invention described hereinbefore and shown in FIGS. 26-36 and 43-44, or they may correspond with those indicated by the reference numerals 536b and 536c, respectively, in accordance with the third embodiment of the invention described hereinbefore and shown in FIGS. 47-59, and it will be understood by those skilled in the art that if the vehicle is also equipped with an upper air deflection element, that element may also be in accordance with any one of the three embodiments of the invention described thus far.

The left side and right side air deflection elements 36b and 36c are mounted vertically, along the left side surface 720 of the vehicle 714, adjacent and substantially parallel to the left side trailing corner edge 730, and on the right side surface 721, adjacent and substantially parallel to the opposite, right side trailing corner edge 732, respectively, as has been described previously. However, as shown in FIG. 60, the fourth, lower air deflection element 736d, instead of being mounted on the underside of the vehicle body adjacent its lower trailing corner edge 734, is mounted horizontally, across the lower portion of rear-facing surface 722, beneath roll-up rear cargo door 724.

Although when in the fully retracted position shown in FIG. 60, lower air deflection element 736d might cover and obscure the plurality of electrically-energized taillights 735 (e.g., brake lights, back-up lights, directional signal lights, etc.) that are typically aligned transversely across the lower portion of rear-facing surface 722 of many vehicles, lower air deflection element 736d is provided with a plurality of light sources 802, which are positioned on the outer surface 737 of lower air deflection element 736d, in an array which, as illustrated in FIG. 60, preferably reproduces both the number and positions (and most preferably even the colors) of the vehicle's native taillights 735, and which are preferably illuminated automatically, in the same manner in which the vehicle's native taillights 735 are normally illuminated. As will be apparent from the description below, when lower air deflection element 736d is deployed, the vehicle's native taillights will no longer be obscured and will be visible to the drivers of following vehicles.

Lower air deflection element 736d is preferably associated with, and when in the fully retracted position shown in FIG. 60 is disposed within, a mounting frame 742, which comprises a flat base portion 744 that is affixed to the lower portion of rear-facing surface 722, as well as an upstanding partition portion 746 disposed at right angles to the base portion 744 and oriented along the direction of travel of the vehicle, extending rearwards and substantially surrounding lower air deflection element 736d on four sides i.e., the partition portion 746 comprises an upper partition segment 746a that extends across the width of the vehicle, substantially from left side trailing corner edge 730 to right side trailing corner edge 732, just above lower air deflection element 736d, a lower partition segment 746b which extends similarly across the width of the vehicle but just below lower air deflection element 736d, and two side partition elements, a left side partition segment 746c that extends from and essentially connects the left end of partition segment 746a to the left end of partition segment 746b, and a right side partition segment 746d, that extends from and essentially connects the right end of upper partition segment 746a to the right end of lower partition segment 746b, the four partition segments thus forming a substantially continuous, substantially rectangular, protective, frame-like border around lower air deflection element 736d, as shown best in FIG. 60. Lower air deflection element 736d preferably also comprises end walls 743, as well as down-turned reflex extension or tail lip 741.

In order for lower air deflection element 736d to function properly, the airflow that passes under the vehicle body (and which normally flows just underneath the floor 717 of the vehicle's cargo compartment 716) must be directed such that it can be intercepted and redirected by lower air deflection element 736d when the latter is deployed. For that purpose, the vehicle is provided with a curved wind dam or wind fairing 719 which, when the vehicle is moving, directs the underside airflow towards the lower trailing corner edge 734 of vehicle 714, as shown by the arrows HH in FIG. 61.

FIGS. 62-66 illustrate the components of the preferred drive mechanism with which lower air deflection element 736d may be deployed and retracted, and caused to assume differing positions of deployment, FIG. 62 illustrating the positions of those components when lower air deflection element 736d is in the fully retracted position; the drive components may be operated either manually or, more preferably, with powered assistance, and in the latter case, the drive components may be remotely controlled, e.g., by the driver from the cab of the vehicle, as has already been described in detail hereinbefore in connection with the side (and upper) air deflection elements, and the drive components can be hydraulically, pneumatically or electro-mechanically driven, also as has been described previously, although again as described in detail hereinbefore, the drive components are most preferably electro-mechanically driven, are remotely controlled, and are actuated by a control unit (not shown in the drawings) in unison with the drive components for any other air deflection elements that may be installed on the vehicle.

The drive components for lower air deflection element 736d are preferably situated on base portion 744 of mounting frame 742 and are preferably positioned substantially along the imaginary center line of lower air deflection element 736d. The illustrative electro-mechanical drive components preferably comprise a reversible drive motor 778 affixed to base portion 744 of mounting frame 742 via a mounting bracket 781, and adapted to impart rotational motion to a threaded spindle 780, which extends from the drive shaft (not shown) of drive motor 778, and which, at its other end distal from drive motor 778, is journaled for rotation in an angle bracket 782 that is mounted on base portion 744 of mounting frame 742. The drive components also comprise a drive block 784, adapted for movement along spindle 780 via an internally threaded bore (not shown) adapted to accept and to allow rotation of spindle 780.

The drive components further comprise a drive arm 787, which may be coupled by any suitable means to drive block 784; illustratively, drive arm 787 is pierced adjacent its proximal end 787b and is rotatably coupled to drive block 784 via a hinge pin 789. Drive arm 787 may also be coupled by any suitable means at its other end to lower air deflection element 736d at a point approximately one quarter of the way between the leading edge 738 and the trailing edge 740 of the lower air deflection element; illustratively, drive arm 787 is pierced adjacent its distal end 787a, while the inner surface 756 of lower air deflection element 736d carries an associated projection, preferably comprising an angle bracket 791, which is also pierced and which is rotatably coupled to drive arm 787 adjacent distal end 787a in a conventional fashion via a hinge pin 793.

The drive components also comprise an additional mechanical linkage, illustratively a connector strut 830 of variable length. As shown in FIGS. 62 and 63, connector strut 830 comprises an outer sleeve element 840 and a inner extendable element 842 that is slidably disposed within outer sleeve element 840 (the inner extendable element 842 having an outside dimension that is slightly less than the inside dimension of outer sleeve element 840, as shown best in FIG. 63), such that the inner extendable element 842 can be withdrawn from outer sleeve element 840, thus allowing the length of connector strut 830 to vary in a manner that is well known in the art.

Connector strut 830 has a distal end 830a and a proximal end 830b, and may be coupled, respectively, by any suitable means, to lower air deflection element 736d (at a point on its inner surface 756 situated approximately three quarters of the way between its leading edge 738 and its trailing edge 740) and to drive arm 787. Illustratively, connector strut 830 is pierced adjacent its distal end 830a, while the inner surface 756 of lower air deflection element 736d carries an associated projection, preferably comprising an angle bracket 833, which is also pierced and which is rotatably coupled to connector strut 830 adjacent distal end 830a in a conventional fashion via a hinge pin 834. The inner extendable element 842 of connector strut 830 is also illustratively pierced adjacent its proximal end, while drive arm 787 is pierced at an intermediate point along its length, allowing drive arm 787 to be rotatably coupled to the inner extendable element 842 of connector strut 830 adjacent its proximal end in a conventional fashion via hinge pin 838.

Figure 64:
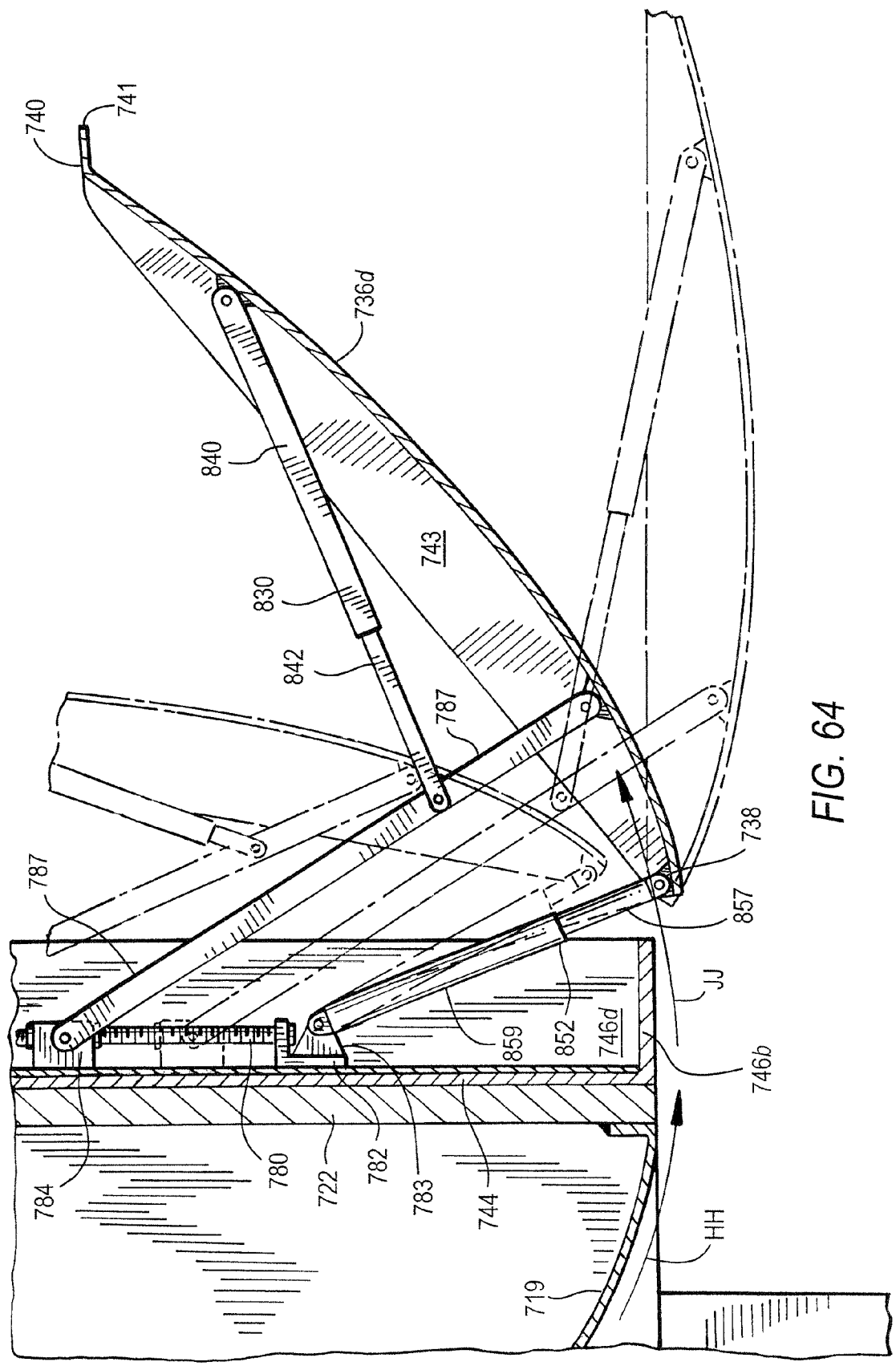
FIG. 64 is a cross-sectional view, similar to that of FIG. 62, showing the lower air deflection element of FIG. 60 in a deployed position.
Figure 65:
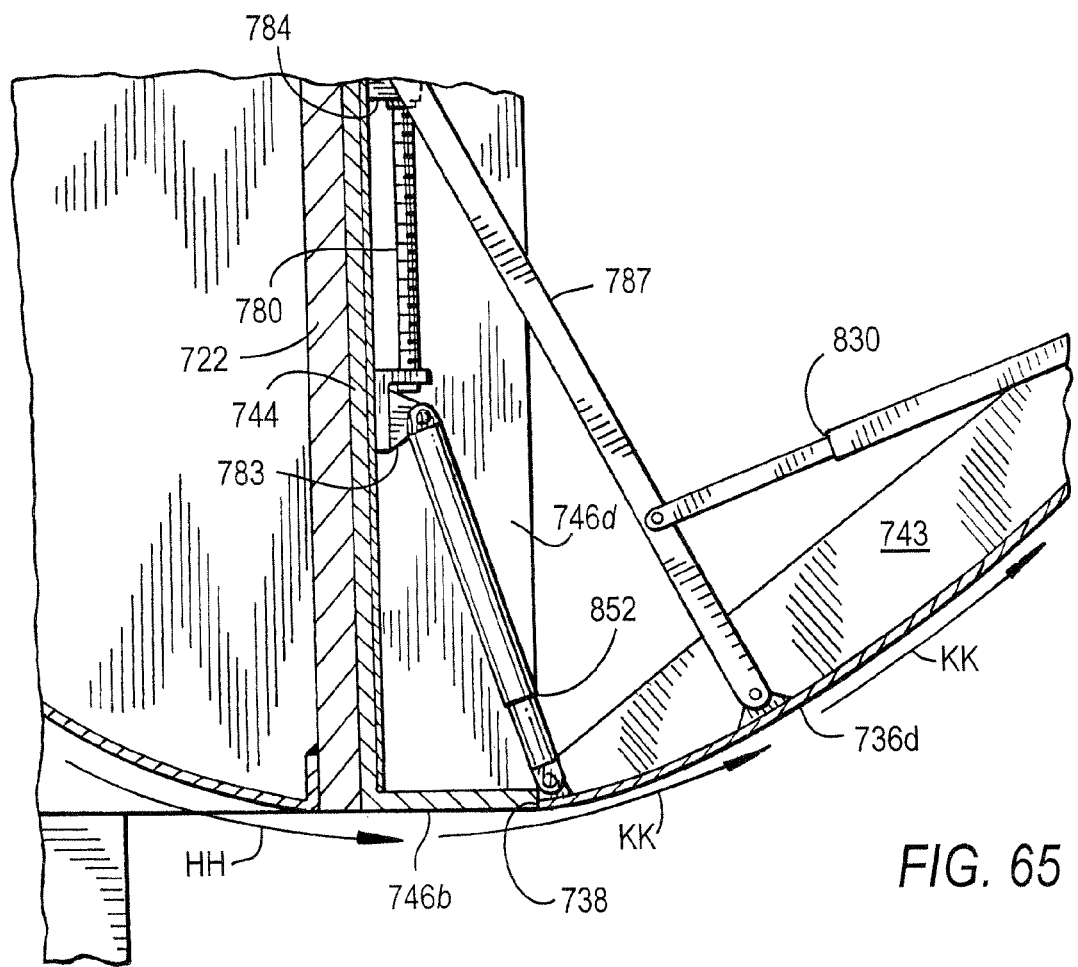
FIG. 65 is a cross-sectional view similar to FIG. 64, showing the lower air deflection element in another deployed position.
Figure 66:
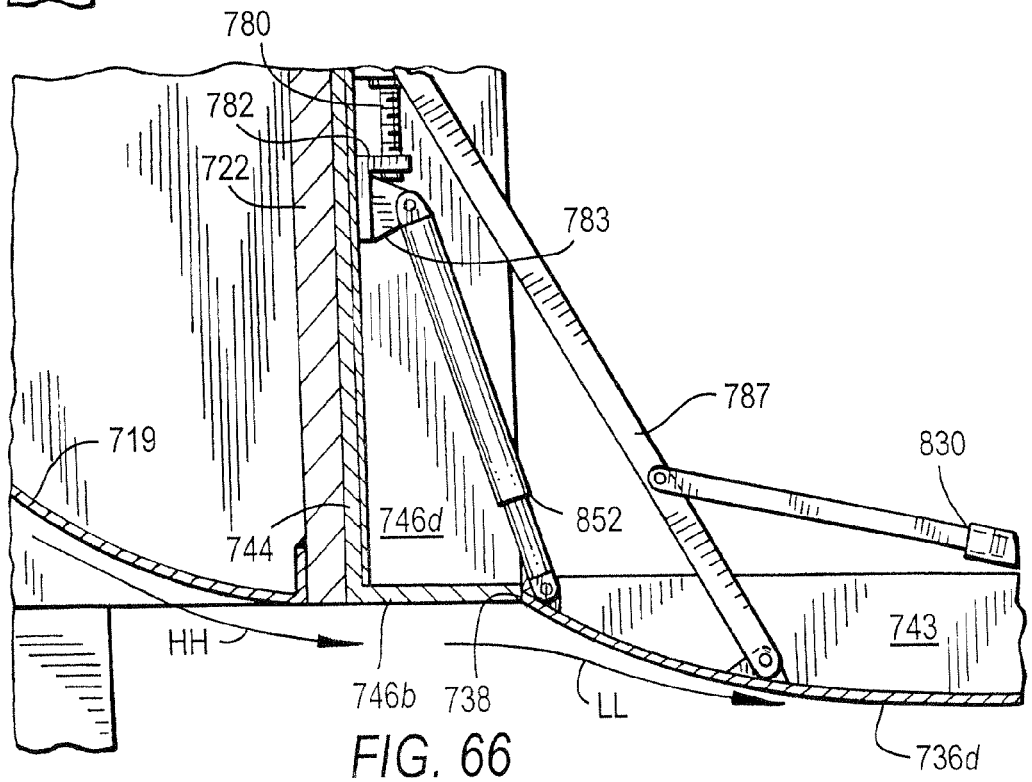
FIG. 66 is a cross-sectional view similar to FIG. 65, showing the lower air deflection element in yet another deployed position.

Apart from the drive components mentioned above, lower air deflection element 736d is also coupled to the vehicle body (through the base portion 744 of mounting frame 742) by at least one lower pivot arm 852, also of variable length, which as shown in FIGS. 64-66, comprises an outer sleeve element 857 and an inner extendable element 859 that is slidably disposed within outer sleeve element 857 (the inner extendable element 859 having an outside dimension that is slightly less than the inside dimension of outer sleeve element 857), as well as a mechanism or device (not shown in the drawings) for extending and retracting inner extendable element 859, thus allowing the length of lower pivot arm 852 to vary (in a manner that is well known in the art), and thereby allowing the position of the leading edge 738 of lower air deflection element 736d to be controlled separately, so as to vary still further the deployed positions of the lower air deflection element, as will be explained hereinafter.

Although some installations of lower air deflection element 736d may require only a single lower pivot arm 852, with that one lower pivot arm situated (together with the drive components) substantially along the imaginary center line of lower air deflection element 736d (as shown in FIGS. 62-66), other installations may require, depending upon the width of the vehicle, the enhanced support that would be provided by additional lower pivot arms 852 situated at other locations. For example, as shown in phantom lines in FIG. 60, two additional lower pivot arms 852 may be provided, one located inwardly of the left side trailing corner edge 730 of vehicle 714, and the other located inwardly of the right side trailing corner edge of vehicle 714.

As shown in FIG. 62, each lower pivot arm 852 has a distal end 852a and a proximal end 852b and may be coupled, respectively, by any suitable means, to lower air deflection element 736d (at a point on its inner surface 756 adjacent its leading edge 738) and to base portion 744 of mounting element 742. Illustratively, the inner extendable element 859 of each lower pivot arm 852 is pierced adjacent its distal end, while the inner surface 756 of lower air deflection element 736d carries an associated projection, preferably comprising an angle bracket 863, which is also pierced and which is rotatably coupled to the inner extendable element 859 of lower pivot arm 852 adjacent its distal end in a conventional fashion, via hinge pin 864. Lower pivot arm 852 is also illustratively pierced adjacent its proximal end 852b, while the base 744 of mounting element 742 carries an associated projection, preferably comprising an upstanding angle bracket 783, which is also pierced and which is rotatably coupled to lower pivot arm 852 at its proximal end 852b in a conventional fashion via hinge pin 868.

Figure 61:
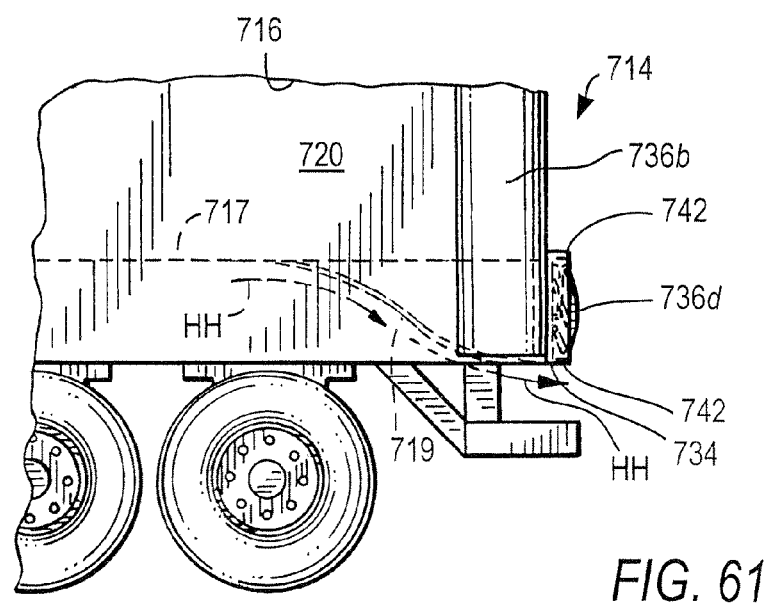
FIG. 61 is a side elevational view taken substantially along the lines 61-61 of FIG. 60, showing a baffle for use with the lower air deflection element of FIG. 60.

FIGS. 64-66 depict the manner in which lower air deflection element 736d may be deployed, as well as some of the deployed positions that it may assume. Preferably, the drive components allow lower air deflection element 736d to be displaced between a retracted position and at least one air flow diverting, deployed position, but most preferably they allow the position of lower air deflection element 736d to vary over a continuous range of positions, from a fully retracted position (as shown in FIGS. 60-62), through a number of air-flow diverting deployed positions (an illustrative two of which are shown in FIG. 64, one in solid lines and one in phantom lines, with an additional illustrative two such positions being shown in FIGS. 65 and 66—an additional position is also shown in phantom lines in FIG. 64, but this position is not air-flow diverting because in this position the lower air deflection element 736d does not intersect the air flow, and it is included merely as an illustration of an intermediate position as lower air deflection element 736d is being moved between its fully retracted position and one of its deployed positions).

It is possible, by deploying lower air deflection element 736d as shown in solid lines in FIG. 64, with its leading edge 738 spaced apart from the rear edge of partition segment 746b, to cause most of the airflow originating along the bottom of the vehicle to be diverted into the area behind the vehicle, by being "ducted" or "scooped" between lower air deflection element 736d and the vehicle body (as indicated by the arrow JJ in FIG. 64), as well as by being "bent" under and around lower air deflection element 736d, thus utilizing both the inner and outer surface of that lower air deflection element simultaneously, with the contribution of each component of the diversion varying, depending upon the degree to which the lower pivot arm(s) 852 is/are extended; as mentioned hereinbefore, such a position would be appropriate for use when the vehicle is moving at low and moderate speeds. However, it is also possible, by deploying lower air deflection element 736d as shown in FIG. 65, with its leading edge 738 abutting the rear edge of partition segment 746b, to cause the airflow originating along the bottom of the vehicle to be diverted into the area behind the vehicle only by being "bent" under and around lower air deflection element 736d (as indicated by the arrows KK in FIG. 65), thus utilizing primarily the outer surface of that lower air deflection element; as mentioned hereinbefore, such a position would be appropriate for use when the vehicle is moving at high speeds. In addition, it is possible, by deploying lower air deflection element 736d as shown in FIG. 66 (and, to a lesser extent, as illustrated by the airflow-diverting position shown in phantom lines in FIG. 64), to utilize lower air deflection element 736d to advantage in tandem vehicular environments, as described in further detail hereinbefore, the diversion of the airflow being indicated by the arrow LL in FIG. 66.

Figure 67:
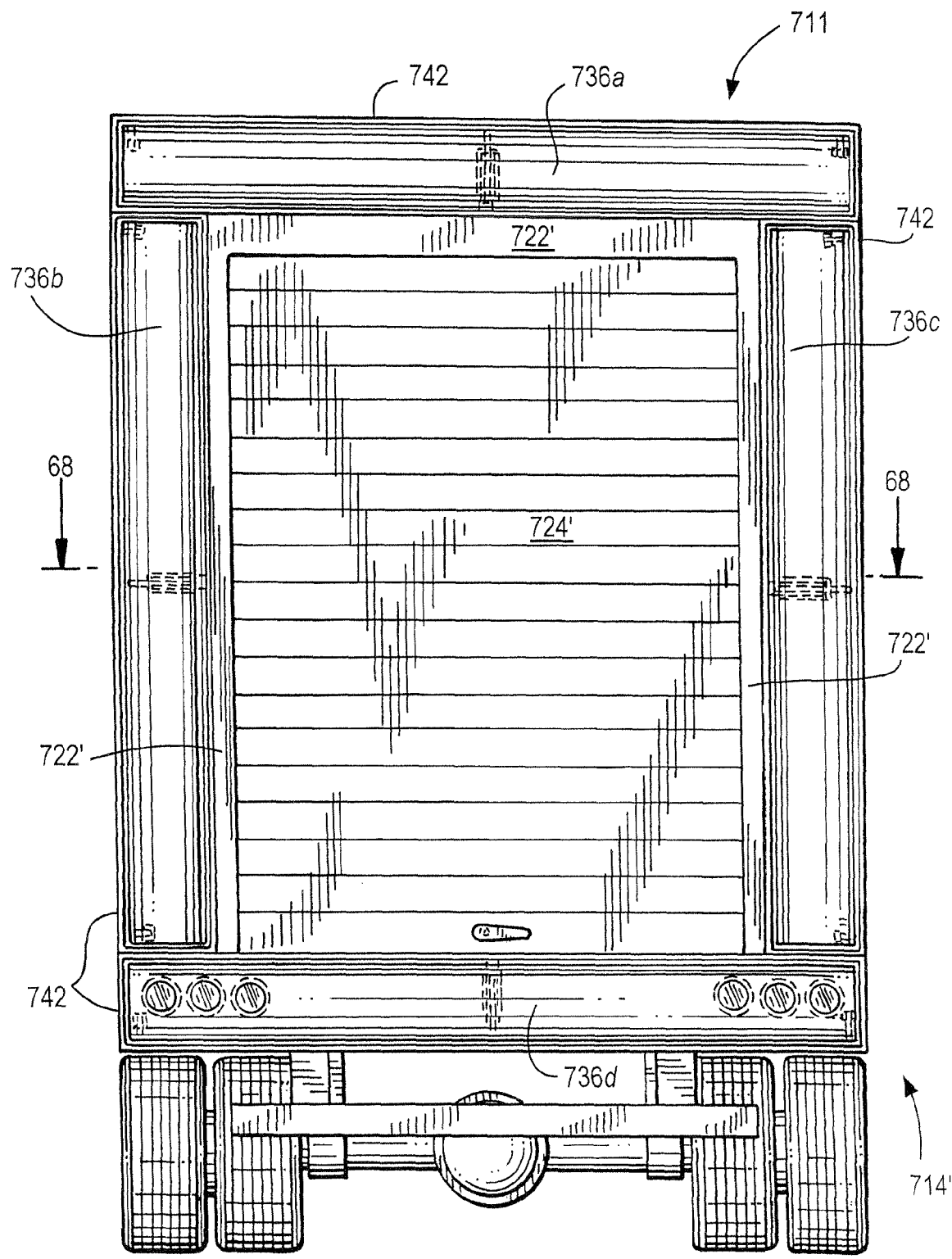
FIG. 67 is an enlarged rear elevational view of a typical, medium-sized box truck vehicle, of a substantially different design than that of FIG. 27, but having a roll-up rear door and equipped with a fourth preferred embodiment of the retractable air deflection apparatus of the present invention, in which four air deflection elements are shown, all in the fully retracted position.
Figure 68:
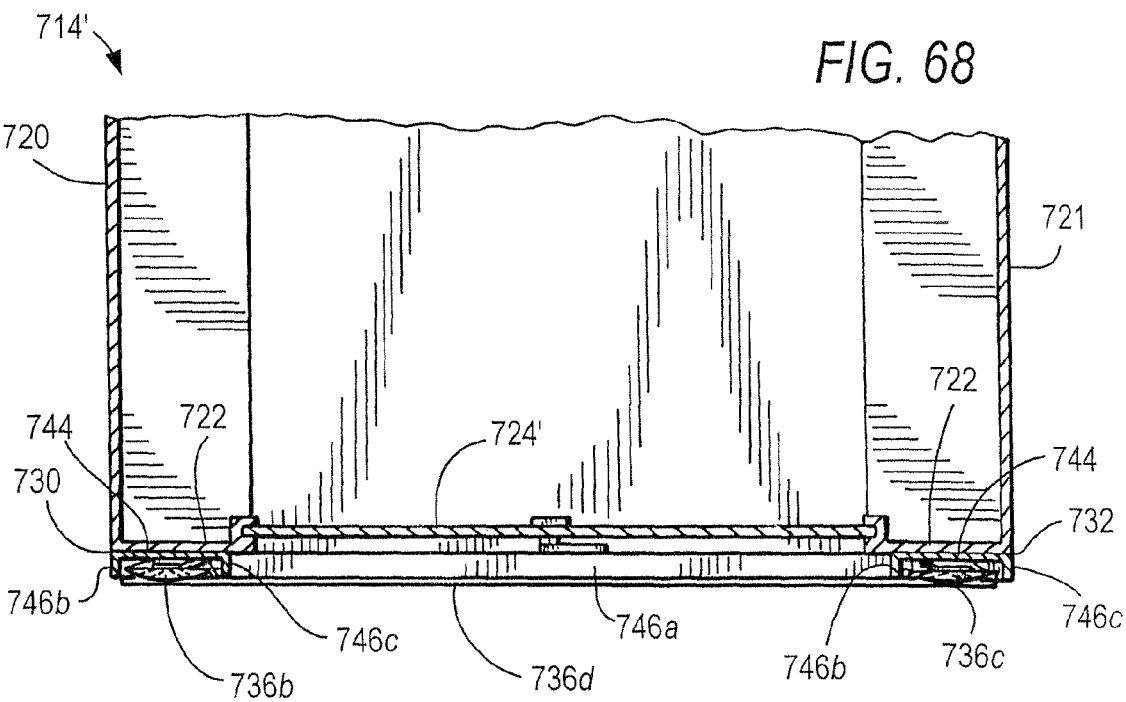
FIG. 68 is a cross-sectional view, taken substantially along the lines 68-68 of FIG. 67.
Figure 69:
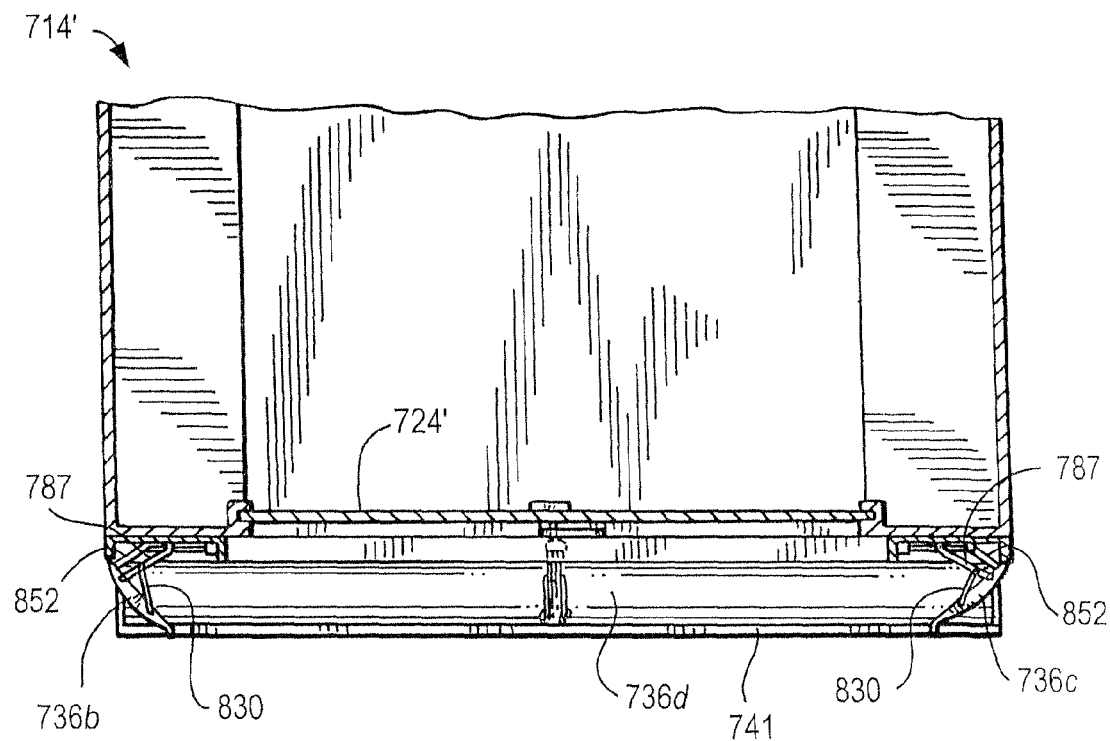
FIG. 69 is a cross-sectional view similar to FIG. 68, but showing three of the four air deflection elements in deployed positions.

As will be evident, the alternate structure for a lower air deflection element as just described may be used for the upper, left side and right side air deflection elements as well, and referring now to FIGS. 67-69 in addition to the aforementioned FIGS. 1-66, such an arrangement constitutes a fourth embodiment of the retractable air deflection apparatus of the present invention, which is generally designated by the reference numeral 711, and which will now be described, illustratively in conjunction with a medium-haul vehicular environment exemplified by a vehicle 714' which is similar to the vehicle 714 as shown in FIGS. 60-69, but which has a roll-up door 724' of smaller dimension, and consequently has a rear-facing surface 722' that encompasses greater surface area, in that it is wider on either side of that door than is shown for vehicle 714 in FIG. 60 (or for vehicle 312 in FIG. 27), and in that it extends downward further from the upper trailing corner edge of the cargo compartment than is shown for vehicle 312 in FIG. 27.

As shown best in FIG. 67, the additional surface area of rear-facing surface 722' allows for the installation and use of an upper air deflection element 736a, as well as a left side air deflection element 736b and a right side air deflection element 736c, each of which is constructed, and which operates, in the same manner as lower air deflection element 736d described hereinbefore in connection with FIGS. 60-66.

FIGS. 67-69 also show the apparatus 710 as including a lower air deflection element 736d which is substantially identical to that depicted in FIGS. 60-66.

It is to be understood that in this fourth embodiment of the invention, each of air deflection elements 736a, 736b and 736c is preferably associated with, and when in the fully retracted position shown in FIGS. 67 and 68 is disposed within, its own respective mounting frame 742, each of which comprises a flat base portion 744 that is affixed to the lower portion of rear-facing surface 722, as well as an upstanding partition portion 746 disposed at right angles to the base portion 744 and oriented along the direction of travel of the vehicle, extending rearwards and substantially surrounding the respective air deflection element 736d on four sides, the partition portion 746 in each case comprising four partition segments forming a substantially continuous, substantially rectangular, protective, frame-like border around each respective air deflection element, as shown best in FIGS. 67 and 68.

It is also to be understood that in this fourth embodiment of the invention, each of air deflection elements 736a, 736b and 736c is preferably associated with its own respective set of drive components, as well as its own respective at least one lower pivot arms 852, as shown in phantom lines in FIG. 67, all of which are substantially identical to those described hereinbefore in connection with lower air deflection element 736d and depicted in FIGS. 60-66 (but with the understanding that the drive components and lower pivot arms for air deflection elements 736a, 736b and 736c will be oriented appropriately so as to enable deployment and retraction of each, FIG. 69 showing the left side air deflection element 736b, the right side air deflection element 736c and the lower air deflection element 736d all in a deployed position substantially corresponding to the deployed position shown in greater detail in FIG. 65 for lower air deflection element 736d).

It is further to be understood that in this fourth embodiment of the invention, although not shown in the drawings, each of air deflection elements 736a, 736b and 736c may also be provided with a plurality of light sources, which are positioned on the respective outer surfaces of those air deflection elements, in an array which preferably reproduces both the number and positions of any of the vehicle's native marker lights (if any) that they may conceal, with such light sources preferably being illuminated automatically, in the same manner in which the vehicle's native marker lights are normally illuminated.

In order to eliminate the possibility (when all four air deflection elements are deployed) that the trailing edge of upper air deflection element 736a and the trailing edge of lower air deflection element 736d might interfere with (and even offer resistance to) the airflow being diverted into the area behind the vehicle from the left by left side air deflection element 736b and/or from the right by right side air deflection element 736c, the left and right ends of upper air deflection element 736a and lower air deflection element 736d may be appropriately beveled, curved or otherwise contoured. Similarly, in order to eliminate the possibility that the trailing edge of left side air deflection element 736b and the trailing edge of right side air deflection element 736c might interfere with (and even offer resistance to) the airflow being diverted into the area behind the vehicle from above by upper air deflection element 736a and/or from below by lower air deflection element 736d, the upper and lower ends of left side air deflection element 736b and right side air deflection element 736c may also be beveled, curved or otherwise contoured. For ease of illustration, this beveling (or curving or contouring) is not shown in the drawings.

For this fourth embodiment of the present invention, as well as for all of the other embodiments described hereinbefore, it will be understood that the air deflection elements, once deployed, will remain in that configuration until retracted by the operator of the vehicle. However, it is possible that, due to oversight, the operator of the vehicle may leave the air deflection elements in a deployed position when the vehicle comes to a halt or is being parked for the night, or even more problematically, when the vehicle is being maneuvered, usually in reverse gear, into a conventional loading dock or other area dedicated to the loading or unloading of cargo. The air deflection elements, if left in a deployed condition, may impede the driver's ability to monitor road conditions behind the vehicle in order to maneuver the vehicle in reverse gear and/or, even worse, may themselves be crushed or otherwise physically damaged or destroyed, due to inadvertent collision with the loading dock itself or with other nearby walls and/or objects.

In order to remedy this situation, the air deflection apparatus of the present invention preferably further comprises either a warning device, which would help to avoid damage to the air deflection elements by alerting the vehicle operator of the deployed condition when the operator seeks to implement reverse-gear operation of the vehicle, or a reverse-gear interlock, which would prevent damage to the air deflection elements by actually prohibiting reverse-gear operation of the vehicle unless and until the air deflection elements are first fully retracted.

Thus, for each of the embodiments of the invention described hereinbefore that utilize drive components with which the air deflection elements may be deployed and retracted (and caused to assume differing positions of deployment) through manual manipulation, the apparatus further comprises at least one sensor associated with each of the air deflection elements, preferably in the form of a contact/proximity switch of a type (typically magnetic) which is well known in the art, positioned such that its output will signal whether the air deflection elements are fully retracted. The output of this sensor can be wired to a device located in the passenger compartment that will provide a visual and/or audible indication of the deployed condition when reverse gear is engaged; such devices are also well known in the art, and would be similar to the back-up alarms with which most cargo vehicles are presently equipped (and which are required in most jurisdictions for safety reasons), that provide an audible warning outside the vehicle that reverse gear has been engaged, but in this case would provide a "deployed" warning within the passenger compartment of the vehicle, and would thus encourage the vehicle operator at least to consider whether the air deflection element(s) should be manually retracted before continuing to operate the vehicle in reverse gear.

More preferably, however, as a alternative to such a audible/visible warning device, the operation of the vehicle in reverse gear while the air deflection element(s) is/are still deployed can be completely prevented (La, blocked) by instead wiring the output of the sensor(s) so as to activate a powered relay (such as a solenoid) that would disallow reverse gear operation; such transmission "interlock" systems are well known in the art, and would be similar to the "power take off" interlocks with which tow trucks are typically equipped and which prevent engagement of the transmission (in any gear) while an auxiliary device (such as a power winch) is in operation, but in this case would only prevent engagement of the transmission in reverse gear until the air deflection element(s) is/are fully retracted.

The same audible/visible "deployed" warning and/or reverse gear interlock can also be implemented with those embodiments of the invention described hereinbefore that utilize power-assisted drive components; those embodiments optionally (but preferably) already include sensors, as described hereinbefore, that provide a remote indication in the cab of the current positions of each of the air deflection elements, and it is within the skill of the art to provide the warning device and/or interlock apparatus, and to direct the output of those sensors such that they can also energize the warning device and/or engage the interlock as indicated above. For those embodiments that do not already include such sensors, it is also within the skill of the art to add contact/proximity-type sensors to the apparatus, in the same manner as they would be added, as described above, to the embodiments utilizing manually-manipulated drive components.

Since there may be rare instances in which operation of the vehicle in reverse gear, despite deployment of the air deflection elements, may be desired on a temporary or intermittent basis, the air deflection apparatus may further include a switch, preferably located in the passenger compartment of the vehicle, with which the audible/visible warning, and/or the reverse gear interlock, may be overridden. Most preferably, a visible display, indicating that the override switch had been engaged, would accompany, and would be activated by, any such an override switch.

Turning now to another optional (but preferred) feature of the invention, for each of the embodiments described hereinbefore that utilize power-assisted drive components with which the air deflection elements may be deployed and retracted (and caused to assume differing positions of deployment), the apparatus preferably further comprises an automatic, microprocessor-based control system (not shown in the drawings) for automatic variable "fine-tuning" of the deployment and retraction of the air deflection elements, in order to optimize more precisely the aerodynamic drag reduction that those air deflection elements can provide, thereby maximizing fuel economy for the vehicle. This automatic control system, as a further option, can either remain permanently engaged, or can be provided such that manual engagement or disengagement at will, under driver control, is possible. Although the microprocessor used for automatic control is preferably incorporated within or forms a part of the control unit for the power-assisted drive components with which the air deflection elements may be deployed and retracted, it should be understood that any appropriate data processing element may be used, including a data processing element situated in a lap-based computational device connected to the drive components and operated either by the driver of the vehicle or otherwise from the passenger compartment, or even by a data processing element situated in a computational device that is remote from the vehicle, provided that the remote computational device is connected with the drive components through an appropriate communications device and uses an appropriate communications protocol.

The automatic control system preferably comprises a microprocessor under stored program control, an associated memory for storage of the program and other data, and at least one additional sensor which monitors transient variables that affect the airflow dynamics of the vehicle, such as ambient wind speed and direction, ambient temperature and other weather conditions such as barometric pressure, the output of which is continuously fed to the microprocessor. The microprocessor also continuously receives information as to the current speed of the vehicle and its fuel consumption, which can be provided by a truck data readout device; such devices are well known in the art, and can be added to the vehicle on an after-market basis if not included as original equipment when the vehicle is newly-manufactured. In addition, the microprocessor receives data from the position sensor(s) as to the current position(s) of each of the air deflection elements.

The optimum positioning of the air deflection elements, in terms of both the clearance of the leading and trailing edges (from the vehicle body) and the angle at which the air deflection element is disposed (relative to the vehicle body), will also vary according to the weight of the load being carried by the vehicle, which can remain constant for long periods of time, on the order of days or even weeks, particularly for long-haul vehicular environments such as those described hereinbefore, as well as according to the aerodynamic properties of the vehicle itself, that is, with variations in the shape and size of the vehicle body, which will differ from one class of vehicle to another, and which may differ from one vehicle to another within the same class, even among those of the same make and model, but which will remain constant for each particular vehicle, if not for its entire useful life then certainly for very long periods of time, most likely on the order of many years.

Thus, the memory associated with the microprocessor preferably will contain pre-determined data representing the optimal positions for the air deflection elements for the aerodynamic characteristics of that particular vehicle, most preferably combined separately with a variety of representative load weights so as to yield a set of pre-determined "profiles" for that vehicle when traveling with different loads, such that the profile that most closely approximates the actual weight may be pre-selected prior to the commencement of a trip (and once the actual weight of the load is known), although it may also be possible to avoid such approximations by allowing for input to the microprocessor (e.g., through a keyboard or keypad), prior to the commencement of a trip, of the exact loaded vehicle weight (once known), to be combined instantaneously by the microprocessor with the pre-loaded data representing the optimal positions for the air deflection elements for the aerodynamic characteristics of that particular vehicle, so as to calculate a "profile" for that particular load, which may then be utilized and at the same time stored, either permanently for future use on other trips, or only for the duration of that particular trip (or at least until the weight of the load changes).

Optionally, multiple profiles could also be pre-stored for each representative load weight, with each such profile containing pre-determined data representing the optimal positions for the air deflection elements for that load and for a given representative set of weather/driving conditions. It may even be possible to pre-store a set of profiles for each combination of representative load and weather/driving conditions, with each of the profiles in the set being calibrated for a different driving speed.

In order to create such a profile, the microprocessor could be programmed first to determine, for a given, relatively constant velocity, the average fuel consumption value for the "current" position of the air deflection elements, and then to extend (or retract) the upper air deflection element in small increments, determining the average fuel consumption value for each such position. The position of the upper air deflection element that results in the lowest fuel consumption would then be utilized and stored, and the process would then be repeated for the side air deflection elements (most preferably moving them together, in unison), with their positions that results in the lowest fuel consumption also being utilized and stored. Thereafter, the position of the upper air deflection element would once again be varied, and the position thereof resulting in the lowest fuel consumption determined and once again stored. These optimal positions for the air deflection elements would then be stored permanently in a profile, along with the speed, weather/driving conditions, and load data, and the same calibration steps could be performed for other driving speeds, yielding a separate profile, for example, for every driving speed between ten miles per hour and seventy miles per hour, taken at ten mile-per-hour intervals.

In operation, upon selection of a particular profile the microprocessor would be programmed to deliver output representing positioning data for the air deflection elements that would be sent to the control unit (not shown in the drawings) so as to automatically cause the air deflection elements to be positioned accordingly. Thereafter, the microprocessor would be programmed to receive and process continuously the data representing the speed of the vehicle and/or the weather/driving conditions, and would automatically utilize different profiles, as needed, based on any changes in such conditions.

In addition, since it might not be possible to provide and store a separate profile representing every possible speed for every given set of weather/driving conditions and load, the microprocessor would preferably also be programmed, once a particular profile were selected, to receive and process continuously the data representing the speed and fuel consumption of the vehicle, and even while utilizing that specific profile, would periodically deliver (at predetermined intervals) output representing positioning data that would be sent to the control unit so as to automatically cause the positions of the air deflection elements to change, on a dynamic basis, i.e., as needed during travel and as the speed changes, thus "fine-tuning" the positions of the air deflection elements to the particular speed and driving behavior (it is to be understood, however, that the microprocessor can be programmed to carry out this same "fine-tuning" even if no particular profile has been selected initially, prior to the commencement of a trip, and/or no profiles are available or have been stored in the associated memory, and/or the air deflection elements have been deployed and/or retracted using the actuator switch(es) rather than under microprocessor control).

As mentioned previously in connection with tandem vehicular environments, during a relatively sharp turn the risk of contact between one of the side air deflection elements mounted on a leading container unit and the front surface of a trailing container unit can be eliminated by allowing for a slight additional or further extension and then a slight contraction or shortening of the rear pivot arms (of only one side air deflection element or the other), in a dynamic fashion as the vehicle turns, and only for the duration of the turn, so as to briefly force further outwards the trailing edge of the air deflection element that is on the "inside" of the turn. Although such position adjustments can be accomplished from the cab of the vehicle remotely by the driver (or other occupant of the cab), using the position readout devices and actuator switch (es) mentioned hereinbefore, it would be preferable, as previously stated, for such adjustments to be accomplished automatically, without the need for driver intervention.

Therefore, preferably, additional sensors are provided with which vehicle turns (either to the right or the left) can be monitored, the output of which is fed continuously to the aforementioned microprocessor, and the latter can be programmed to receive and process continuously the data representing the extent of each vehicle turn, and to deliver output representing positioning data that would be sent to the control unit so as to automatically cause the positions of the air deflection elements to change appropriately, in a dynamic fashion, first as the vehicle enters each right- or left-hand turn, and again thereafter as the vehicle exits each such turn.

It should be understood that since those embodiments of the invention described hereinbefore that utilize power-assisted drive components with which the air deflection elements may be deployed and retracted (and caused to assume differing positions of deployment) augmented with a microprocessor-based automatic control system, already include sensors, as described hereinbefore, which provide indications of the current positions of each of the air deflection elements, it is within the skill of the art to provide the warning device and/or the interlock apparatus described above, and to direct the output of those sensors such that they can also energize the warning device and/or engage the interlock as indicated above, although it may alternatively be possible to program the microprocessor, upon engagement of reverse gear by the vehicle operator and receipt of output from the sensors indicating a deployed condition, to cause the air deflection element(s) to be moved to the fully retracted position(s) automatically, after which the microprocessor would cause the warning device to be silenced and/or cause the interlock device to be disengaged, thus allowing the vehicle then to be operated in reverse gear.

While there has been described what are at present considered to be the preferred embodiments of the present invention, it will be apparent to those skilled in the art that the embodiments described herein are by way of illustration and not of limitation, and that various changes and modifications may be made therein. For example, in situations in which it would be advantageous, it may be possible to utilize, on the same vehicle, a mixture of different air deflection elements from the various embodiments of the invention described above (rather than always utilizing a "matched set" of air deflection elements, as depicted in some of the drawings). Also, there are many vehicles having cargo compartments that are not truly box-shaped, i.e., the sides and/or the top and bottom of the vehicle, including the corresponding edges, are not linear (an extreme example being a typical "tanker" truck, which is conventionally used for hauling gasoline, heating oil, propane and other liquid or gaseous substances, and which has a cargo compartment that is oval or ellipsoidal in vertical cross-section), yet such vehicles are subject to the same aerodynamic drag factors that plague box-shaped vehicles as described hereinbefore (albeit perhaps to a lesser degree). The air deflection elements of the present invention can be modified for use on such vehicles, by conforming the long axis of each air deflection element to the profile of that portion of the vehicle surface or edge to which it is coupled, thereby affording to such vehicles at least some of the aerodynamic drag reduction capabilities that this invention can provide. These and other changes and modifications may be made without departing from the true spirit and scope of the present invention, as set forth in the appended claims.

The invention claimed is:

1. A drag reduction apparatus for the rear end of a cargo-carrying compartment of a cargo-hauling ground vehicle, said cargo-carrying compartment being characterized by a substantially planar rear wall formed substantially in its entirety by at least one rear door, the drag reduction apparatus comprising at least one non-planar air deflection element, and a plurality of associated support members coupling said at least one air deflection element to an associated portion of the exterior surface of said cargo-carrying compartment that is adjacent and substantially orthogonal to said rear wall, said at least one air deflection element having a leading edge and a trailing edge, said plurality of associated support members allowing selective displacement of said at least one air deflection element between a retracted position and at least one deployed position, said at least one deployed position comprising at least a first deployed position and a second deployed position, and wherein in said retracted position the leading edge of said at least one air deflection element is substantially flush with said associated portion of said exterior surface and the trailing edge of said at least one air deflection element substantially abuts said associated portion of said exterior surface.

2. A drag reduction apparatus for the rear end of a trailer unit of a tractor-trailer combination, said trailer unit being characterized by a substantially planar rear wall formed substantially in its entirety by a pair of rear doors, the drag reduction apparatus comprising at least one non-planar air deflection element, and a plurality of associated support members coupling said at least one air deflection element to an associated portion of the exterior surface of said trailer unit that is adjacent and substantially orthogonal to said rear wall, said at least one air deflection element having a leading edge and a trailing edge, said plurality of associated support members allowing selective displacement of said at least one air deflection element between a retracted position and at least one deployed position, said at least one deployed position comprising at least a first deployed position and a second deployed position, and wherein in said retracted position the leading edge of said at least one air deflection element is substantially flush with said associated portion of said exterior surface and the trailing edge of said at least one air deflection element substantially abuts said associated portion of said exterior surface.

3. A drag reduction apparatus for the rear end of a cargo-carrying compartment of a cargo-hauling ground vehicle, said cargo-carrying compartment being characterized by a substantially planar rear wall formed substantially in its entirety by at least one rear door, the drag reduction apparatus comprising at least two non-planar air deflection elements, and a plurality of support members associated with each said air deflection element and coupling each said air deflection element to a respective associated portion of the exterior surface of said cargo-carrying compartment that is adjacent and substantially orthogonal to said rear wall, each said air deflection element having a leading edge and a trailing edge, said plurality of associated support members allowing selective displacement of each said air deflection element between a retracted position and at least one deployed position, said at least one deployed position comprising at least a first deployed position and a second deployed position, and wherein in said retracted position the leading edge of each said air deflection element is substantially flush with said respective associated portion of said exterior surface and the trailing edge of each said air deflection element substantially abuts said respective associated portion of said exterior surface.

4. A drag reduction apparatus for the rear end of a trailer unit of a tractor-trailer combination, said trailer unit being characterized by a rear wall formed substantially in its entirety by a pair of rear doors, the drag reduction apparatus comprising at least two non-planar air deflection elements, and a plurality of support members associated with each said air deflection element and coupling each said air deflection element to a respective associated portion of the exterior surface of said trailer unit that is adjacent and substantially orthogonal to said rear wall, each said air deflection element having a leading edge and a trailing edge, said plurality of associated support members allowing selective displacement of each said air deflection element between a retracted position and at least one deployed position, said at least one deployed position comprising at least a first deployed position and a second deployed position, and wherein in said retracted position the leading edge of each said air deflection element is substantially flush with said respective associated portion of said exterior surface and the trailing edge of each said air deflection element substantially abuts said respective associated portion of said exterior surface.

5. A drag reduction apparatus for the rear end of a cargo-carrying compartment of a cargo-hauling ground vehicle, said cargo-carrying compartment being characterized by a substantially planar rear wall formed substantially in its entirety by at least one rear door, the drag reduction apparatus comprising at least two air deflection elements, and a plurality of support members associated with each said air deflection element and coupling each said air deflection element to a respective associated portion of the exterior surface of said cargo-carrying compartment that is adjacent and substantially orthogonal to said rear wall, each said air deflection element having a leading edge and a trailing edge, said plurality of associated support members allowing selective displacement of each said air deflection element between a retracted position and at least one deployed position, at least two of said air deflection elements being selectively displaceable between said retracted position and said at least one deployed position independently of the position of said at least one rear door, said at least one deployed position comprising at least a first deployed position and a second deployed position, and wherein in said retracted position the leading edge of each said air deflection element is substantially flush with said respective associated portion of said exterior surface and the trailing edge of each said air deflection element substantially abuts said respective associated portion of said exterior surface.

6. A drag reduction apparatus for the rear end of a trailer unit of a tractor-trailer combination, said trailer unit being characterized by a rear wall formed substantially in its entirety by a pair of rear doors, the drag reduction apparatus comprising at least two air deflection elements, and a plurality of support members associated with each said air deflection element and coupling each said air deflection element to a respective associated portion of the exterior surface of said trailer unit that is adjacent and substantially orthogonal to said rear wall, each said air deflection element having a leading edge and a trailing edge, said plurality of associated support members allowing selective displacement of each said air deflection element between a retracted position and at least one deployed position, at least two of said air deflection elements being selectively displaceable between said retracted position and said at least one deployed position independently of the position of said at least one rear door, said at least one deployed position comprising at least a first deployed position and a second deployed position, and wherein in said retracted position the leading edge of each said air deflection element is substantially flush with said respective associated portion of said exterior surface and the trailing edge of each said air deflection element substantially abuts said respective associated portion of said exterior surface.

7. The apparatus of claim 1 or 2 further comprising drive elements for power-assisted displacement of said at least one air deflection element.

8. The apparatus of claim 3, 4, 5 or 6 further comprising drive elements for power-assisted displacement of each said air deflection element.

9. The apparatus of claim 1, 2, 3, 4, 5 or 6 wherein said plurality of associated support members comprises a plurality of selectively pivotable support struts.

10. The apparatus of claim 9 wherein the length of said plurality of support struts is fixed.

11. The apparatus of claim 9 wherein said plurality of support struts comprises a plurality of leading support struts and a plurality of trailing support struts, wherein the length of said leading support struts is fixed, wherein the length of said trailing support struts is selectively variable, and wherein the length of said trailing supports varies in unison.

12. The apparatus of claim 1 or 2 further comprising drive elements for manual displacement of said at least one air deflection element.

13. The apparatus of claim 1 or 2 wherein said at least one air deflection element further comprises a selectively energizable heating element.

14. The apparatus of claim 3, 4, 5 or 6 further comprising drive elements for manual displacement of each said air deflection element.

15. The apparatus of claim 3, 4, 5 or 6 wherein each said air deflection element further comprises a selectively energizable heating element.

16. The apparatus of claim 1, 3 or 5 wherein said cargo-hauling ground vehicle is selected from the group consisting of medium-haul box trucks, short-haul vans and panel trucks.

17. The apparatus of claim 1, 3 or 5 wherein said at least one rear door comprises a roll-up door.

18. The apparatus of claim 1, 3 or 5 wherein said cargo-hauling ground vehicle comprises at least two cargo-carrying compartments.

19. The apparatus of claim 2, 4 or 6 wherein said tractor-trailer combination comprises at least two tandem trailer units.

* * * * *